(12) United States Patent
Nakabayashi et al.

(10) Patent No.: US 7,312,959 B2
(45) Date of Patent: Dec. 25, 2007

(54) MAGNETIC SENSOR HAVING ANTIFERROMAGNETIC LAYERS AND FREE MAGNETIC LAYER AND METHOD FOR MANUFACTURING MAGNETIC SENSOR

(75) Inventors: Ryou Nakabayashi, Niigata-ken (JP); Eiji Umetsu, Niigata-ken (JP); Naoya Hasegawa, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 379 days.

(21) Appl. No.: 10/946,323

(22) Filed: Sep. 21, 2004

(65) Prior Publication Data

US 2005/0068694 A1   Mar. 31, 2005

(30) Foreign Application Priority Data

Sep. 26, 2003   (JP) ............................. 2003-335050

(51) Int. Cl.
G11B 5/33    (2006.01)
G11B 5/127   (2006.01)

(52) U.S. Cl. .............................. 360/324.11; 360/324.1; 360/324.12

(58) Field of Classification Search ............. 360/324.1, 360/324.11, 324.12

See application file for complete search history.

(56) References Cited

U.S. PATENT DOCUMENTS

| | | | |
|---|---|---|---|
| 7,027,268 B1 * | 4/2006 | Zhu et al. .................... | 360/314 |
| 2001/0028541 A1 * | 10/2001 | Gill ........................ | 360/324.12 |
| 2004/0004792 A1 * | 1/2004 | Hasegawa et al. ..... | 360/324.12 |
| 2004/0067389 A1 * | 4/2004 | Hasegawa et al. .......... | 428/692 |
| 2004/0095690 A1 * | 5/2004 | Beach ..................... | 360/324.1 |
| 2005/0264956 A1 * | 12/2005 | Lee et al. .............. | 360/324.12 |
| 2005/0276997 A1 * | 12/2005 | Hasegawa et al. ....... | 428/811.3 |

FOREIGN PATENT DOCUMENTS

JP      2002-289945       10/2002

* cited by examiner

*Primary Examiner*—Andrea Wellington
*Assistant Examiner*—Adam B Dravininkas
(74) *Attorney, Agent, or Firm*—Brinks Hofer Gilson & Lione

(57) ABSTRACT

At two sides of a multilayer film including a free magnetic layer, a first non-magnetic material layer, and a fixed magnetic layer, extension portions extending from the fixed magnetic layer are formed. At lower sides of the extension portions, a pair of first antiferromagnetic layers is formed with a space therebetween in a track width direction, and in addition, at upper sides of the extension portions, a pair of second antiferromagnetic layers is formed with a space therebetween in the track width direction.

11 Claims, 40 Drawing Sheets

MAGNETIC SENSOR HAVING ANTIFERROMAGNETIC LAYERS AND FREE MAGNETIC LAYER AND METHOD FOR MANUFACTURING MAGNETIC SENSOR

This application claims the benefit of priority to Japanese Patent Application No. 2003-335050 filed on Sep. 26, 2003, herein incorporated by reference.

BACKGROUND OF THE INVENTION

1. Field of the Invention

The present invention relates to magnetic sensors used for hard disc devices, magnetic sensing devices, and the like, and more particularly, relates to a magnetic sensor and a manufacturing method thereof, the magnetic sensor being capable of improving reproduction output due to the increase in rate of change in magnetoresistance achieved by enhancing fixing forces of fixed magnetic layers.

2. Description of the Related Art

Concomitant with increase in recording density realized in recent years, in magnetic sensors used for hard disc drives, magnetic sensing devices, and the like, a spin valve type device using a giant magnetoresistive effect has become a mainstream technique.

Since having a high reproduction sensitivity, this spin valve type magnetic sensor has drawn attention as a magnetic sensor capable of satisfying the requirements for higher recording density; however, the increase in rate $\Delta R/R$ of the change of magnetoresistance must also be realized in order to decrease a track width, which decrease has been increasingly required to satisfy the trend toward further increase in recording density in the future. In addition, the decrease in distance between a lower gap layer and an upper gap layer has also been required.

Accordingly, a so-called recessed spin valve type magnetic sensor has been proposed. The structure of this magnetic sensor is shown in FIG. 40. FIG. 40 is a cross-sectional view of the magnetic sensor when viewed from a facing surface facing a recording medium.

As shown in FIG. 40, a lower shield layer 1 is formed on a substrate which is not shown in the figure. On this lower shield layer 1, a lower gap layer 2 made of $Al_2O_3$ (aluminum oxide) or the like is formed. A pair of recess portions 2a is formed in the lower gap layer 2 with a predetermined space therebetween in a track width direction, and on an upper surface of a protruding portion 2b sandwiched between the recess portions 2a, a seed layer 3 is provided.

On this seed layer 3, a free magnetic layer 4, a first non-magnetic material layer 5, and a fixed magnetic layer 6 are provided in that order from the bottom. This fixed magnetic layer 6 has a synthetic ferrimagnetic structure formed of three layers, that is, a first fixed magnetic sublayer 6a, a second non-magnetic material sublayer 6b, and a second fixed magnetic sublayer 6c in that order from the bottom. The free magnetic layer 4, the non-magnetic material layer 5, and the fixed magnetic layer 6 collectively form a multilayer film 20.

Inside the recess portions 2a provided at two sides of the multilayer film 20, insulating layers 7 are formed, and on the insulating layers 7, hard magnetic layers 8 are formed.

As shown in FIG. 40, the fixed magnetic layer 6 is formed to extend onto the hard magnetic layers 8 formed at the two sides of the multilayer film 20.

On the fixed magnetic layer 6, a pair of antiferromagnetic layers 9 is formed with a predetermined space W1 therebetween in the track width direction. As shown in FIG. 40, the antiferromagnetic layers 9 are formed on two side regions 6d of the fixed magnetic layer 6.

On the antiferromagnetic layers 9, electrode layers 11 are formed with protective layers 10 interposed therebetween, and on the electrode layers 11, protective layers 12 are formed.

In the magnetic sensor shown in FIG. 40, a track width Tw is determined by the length of the free magnetic layer 4 in the track width direction, and the space W1 between the antiferromagnetic layers 9 is formed larger than the track width Tw.

The antiferromagnetic layer 9 generates an exchange anisotropic magnetic field at the interface with the fixed magnetic layer 6 so that the magnetization direction thereof is fixed in a Y direction in the figure.

When an exterior magnetic field such as a leakage magnetic field from a recording medium is applied to the magnetic sensor shown in FIG. 40, the magnetization direction of the free magnetic layer 4 is changed, and as a result, the electrical resistance of the multilayer film 20 is changed which is composed of the free magnetic layer 4, the first non-magnetic material layer 5, and the fixed magnetic layer 6. When this change in electrical resistance is obtained as the change in voltage or the change in current, the exterior magnetic field is detected.

In the magnetic sensor shown in FIG. 40, the structure is formed in which the space W1 between the antiferromagnetic layers 9 is formed larger than the track width Tw, and in which the antiferromagnetic layer 9 is not formed in the region of the track width Tw. Accordingly, in the region of the track width Tw, current passing between the electrode layers 11 passes through the seed layer 3, the free magnetic layer 4, the first non-magnetic material layer 5, and the fixed magnetic layer 6 and does not pass through the antiferromagnetic layer 9. Hence, compared to a magnetic sensor in which the antiferromagnetic layer 9 is formed in the region of the track width Tw, the decrease in rate $\Delta R/R$ of change in resistance (shunt loss) caused by shunt of the current described above can be reduced, and hence the output can be improved.

A magnetic sensor in which hard magnetic layers are provided at two sides of a magnetoresistive film formed of the multilayer film 20 has been disclosed in Japanese Unexamined Patent Application Publication No. 2002-305338, and a magnetic sensor in which hard magnetic layers and antiferromagnetic layers are provide at two sides of a magnetoresistive film has been disclosed in Japanese Unexamined Patent Application Publication No. 2002-289945.

However, in the magnetic sensor shown in FIG. 40, the space W1 between the antiferromagnetic layers 9 is larger than the track width Tw, and in the region of the track width Tw, the fixed magnetic layer 6 and the antiferromagnetic layer 9 are not directly exchange-coupled to each other. That is, the antiferromagnetic layers 9 are directly exchange-coupled to the fixed magnetic layer 6 at the two side regions 6d thereof. Hence, fixing forces of the fixed magnetic layer 6 at the two side regions 6d are transmitted to the region of the track width Tw, and as a result, the magnetization of the fixed magnetic layer 6 in the track width region is fixed.

Accordingly, in the magnetic sensor shown in FIG. 40, the fixing force of the fixed magnetic layer 6 in the track width region cannot be sufficiently increased.

On the other hand, in order to increase the fixing force of the fixed magnetic layer 6 in the track width region, the decrease of the space W1 may be considered; however, when the space described above is decreased, it becomes difficult to ensure the accuracy of the space W1 in manufacturing, and the case may occur in some cases in which the antiferromagnetic layers extend inside the track width region. Hence, it has been difficult to accurately obtain the space W1 between the antiferromagnetic layers 9.

SUMMARY OF THE INVENTION

The present invention was made to solve the problems described above, and an object of the present invention is to provide a magnetic sensor and a manufacturing method thereof, the magnetic sensor being capable of improving reproduction output by increasing the rate ($\Delta R/R$) of change in magnetoresistance through enhancement of a fixing force of a fixed magnetic layer in a track width direction.

According to a first aspect of the present invention, there is provided a magnetic sensor which comprises: a multilayer film having a free magnetic layer, a first non-magnetic material layer, and a first fixed magnetic layer; bias layers provided at two sides of the multilayer film in a track width direction with a predetermined space therebetween, the predetermined space determining a track width; second fixed magnetic layers extending from the first fixed magnetic layer to the two sides of the multilayer film in the track width direction; a pair of first antiferromagnetic layers which are provided with a predetermined space therebetween in the track width direction and which are formed under the second fixed magnetic layers; and a pair of second antiferromagnetic layers which are provided with a predetermined space therebetween in the track width direction and which are formed on the second fixed magnetic layers.

In the magnetic sensor described above, the first fixed magnetic layer of the multilayer film and the second fixed magnetic layers may collectively form a fixed magnetic layer, and at least a part of each of the second fixed magnetic layers may be continuously and integrally formed with the first fixed magnetic layer.

In the magnetic sensor described above, at least one of the space between the first antiferromagnetic layers and the space between the second antiferromagnetic layers may be equal to the track width.

Alternatively, the space between the first antiferromagnetic layers may be equal to the track width.

In the magnetic sensor described above, the first fixed magnetic layer preferably has a first magnetic material sublayer, a second magnetic material sublayer, and a first non-magnetic intermediate sublayer provided therebetween, the first magnetic material sublayer and the second magnetic material sublayer having different magnetic moments per unit area. In addition, the second fixed magnetic layers each preferably have a third magnetic material sublayer, a fourth magnetic material sublayer, and a second non-magnetic intermediate sublayer provided therebetween, the third magnetic material sublayer and the fourth magnetic material sublayer having different magnetic moments per unit area.

In addition, the first fixed magnetic layer and the second fixed magnetic layers are preferably located at the same height.

In the case described above, the first magnetic material sublayer and the third magnetic material sublayers are preferably located at the same height, and the second magnetic material sublayer and the fourth magnetic material sublayers are also preferably located at the same height.

The magnetic sensor described above may have a top spin valve type structure in which the multilayer film is formed of the free magnetic layer, the first non-magnetic material layer, and the first fixed magnetic layer provided in that order from the bottom or may have a bottom spin valve type structure in which the multilayer film is formed of the first fixed magnetic layer, the first non-magnetic material layer, and the free magnetic layer provided in that order from the bottom.

In accordance with a second aspect of the present invention, there is provided a method for manufacturing a magnetic sensor, which comprises the steps of: (a) forming a multilayer film composed of a free magnetic layer, a first non-magnetic material layer, and a first fixed magnetic layer provided in that order from the bottom on an entire substrate, followed by the formation of a first protective layer on the multilayer film; (b) milling two sides of the first protective layer and the multilayer film; (c) forming hard magnetic layers, a pair of first antiferromagnetic layers with a space therebetween in a track width direction, second fixed magnetic layers made of the same material as that for the first fixed magnetic layer, and second protective layers at the two sides of the first protective layer and the multilayer film; (d) partly milling the first fixed magnetic layer and the second fixed magnetic layers so as to expose upper surfaces thereof after the first protective layer and the second protective layers are entirely removed by milling; and (e) after an additional first fixed magnetic layer is formed on the upper surface of the remaining first fixed magnetic layer using the same material as that therefor, and additional second fixed magnetic layers are formed on the upper surfaces of the remaining second fixed magnetic layers using the same material as that therefor, forming a solid second antiferromagnetic film on said additional first fixed magnetic layer and said additional second fixed magnetic layers, followed by milling of a part of the solid second antiferromagnetic film to form second antiferromagnetic layers at the two sides of the multilayer film with a space therebetween in the track width direction.

In the manufacturing method described above, in said step (a), the first fixed magnetic layer may be formed of a second magnetic material sublayer, a first magnetic material sublayer, and a first non-magnetic intermediate sublayer provided therebetween, the second magnetic material sublayer and the first magnetic material sublayer having different magnetic moments per unit area; and in said step (c), the second fixed magnetic layers may be each formed from a fourth magnetic material sublayer, a third magnetic material sublayer, and a second non-magnetic intermediate sublayer provided therebetween, the fourth magnetic material sublayer and the third magnetic material sublayer having different magnetic moments per unit area.

In the manufacturing method described above, in said step (c), the second fixed magnetic sublayers are preferably formed at the same height as that of the first fixed magnetic sublayer, and in said step (e), upper surfaces of said additional second fixed magnetic layers and an upper surface of said additional first fixed magnetic layer are preferably formed at the same height.

In the manufacturing method described above, in said step (d), the first magnetic material sublayer and the third magnetic material sublayers may be partly milled so as to expose upper surfaces thereof. In addition, in said step (e), an additional first magnetic material sublayer may be formed on the upper surface of the remaining first magnetic material sublayer using the same material as that therefor, and additional third magnetic material sublayers may be formed on the upper surfaces of the remaining third magnetic material sublayers using the same material as that therefor.

In the method for manufacturing a magnetic sensor, described above, the structure may be formed in which a part of the first fixed magnetic layer is formed in said step (a), parts of the second fixed magnetic layers are formed in said step (c), and the other part of the first fixed magnetic layer and the other parts of the second fixed magnetic layers are additionally formed in said step (e).

In the manufacturing method described above, after the second magnetic material sublayer is formed in said step (a), the first protective layer may be formed on the second magnetic material sublayer, and after the fourth magnetic material sublayers are formed in said step (c), the second protective layers may be formed on the fourth magnetic material sublayers. In addition, after the second magnetic material sublayer and the fourth magnetic material sublayers are partly milled so as to expose an upper surfaces thereof in said step (d), an additional second magnetic material sublayer using the same material as that for the second magnetic material sublayer and additional fourth magnetic material sublayers using the same material as that for the fourth magnetic material sublayers may be formed on the remaining second magnetic material sublayer and the remaining fourth magnetic material sublayers, respectively, in said step (e).

In accordance with a third aspect of the present invention, there is provided a method for manufacturing a magnetic sensor comprising the steps of: (a) forming a laminate composed of a free magnetic layer, a first non-magnetic material layer, a second magnetic material sublayer, and a first non-magnetic intermediate sublayer provided in that order from the bottom on an entire substrate, followed by the formation of a first protective layer on the laminate; (b) milling two sides of the first protective layer and the laminate; (c) forming hard magnetic layers, a pair of first antiferromagnetic layers with a space therebetween in a track width direction, fourth magnetic material sublayers, second non-magnetic intermediate sublayers made of the same material as that for the first non-magnetic intermediate sublayer, and second protective layers at the two sides of the first protective layer and the laminate; (d) performing low-ion energy ion milling for an upper surface of the first non-magnetic intermediate sublayer and upper surfaces of the second non-magnetic intermediate sublayers; (e) forming the first magnetic material sublayer and the third magnetic material sublayers on the first non-magnetic intermediate sublayer and the second non-magnetic intermediate sublayers, respectively, and (f) forming a solid second antiferromagnetic film on the first magnetic material sublayer and the third magnetic material sublayers, followed by milling of a part of the solid second antiferromagnetic film to form second antiferromagnetic layers at the two sides of the laminate with a space therebetween in the track width direction.

In accordance with a fourth aspect of the present invention, there is provided a method for manufacturing a magnetic sensor, comprising the steps of: (h) forming a pair of first antiferromagnetic layers on a substrate with a space therebetween in a track width direction, followed by the formation of at least one protective layer on the first antiferromagnetic layers; (i) after the protective layer is removed, forming a first fixed magnetic layer and second fixed magnetic layers on the first antiferromagnetic layers, followed by the formation of a solid second antiferromagnetic film; (j) removing a central part of the solid second antiferromagnetic film so as to form second antiferromagnetic layers with a space therebetween in the track width direction, and simultaneously removing a part of the first fixed magnetic layer and parts of the second fixed magnetic layers so as to exposed upper surfaces thereof; and (k) forming an additional first fixed magnetic layer on the upper surface of the remaining first fixed magnetic layer using the same material as that therefor and forming additional second fixed magnetic layers on the upper surfaces of the remaining second fixed magnetic layers using the same material as that therefor, followed by the formation of a first non-magnetic material layer and a free magnetic layer in that order from the bottom for forming a multilayer film.

In the manufacturing method described above, the first fixed magnetic layer may be formed from a first magnetic material sublayer, a second magnetic material sublayer, and a first non-magnetic intermediate sublayer provided therebetween in the step (i), the first magnetic material sublayer and the second magnetic material sublayer having different magnetic moments per unit area.

In addition, the second fixed magnetic layers may be each formed from a fourth magnetic material sublayer, a third magnetic material sublayer, and a second non-magnetic intermediate sublayer provided therebetween in said step (i), the fourth magnetic material sublayer and the third magnetic material sublayer having different magnetic moments per unit area.

In the case described above, in said step (k) said additional first fixed magnetic layer and said additional second fixed magnetic layers may be formed so that the upper surface of said additional first fixed magnetic layer and the upper surfaces of said additional second fixed magnetic layers are located at the same height.

The feature of the present invention is that magnetic material layers, at least parts of which are continuously and integrally formed with a fixed magnetic layer, are provided at two sides of a multilayer film including a free magnetic layer, a non-magnetic material layer, and the fixed magnetic layer. Under the magnetic material layers, first antiferromagnetic layers are formed, and on the magnetic material layers, second antiferromagnetic layers are formed. Accordingly, the fixed magnetic layer generates exchange coupling with the two antiferromagnetic layers provided in the vertical direction. By the exchange coupling generated with the two antiferromagnetic layers provided in the vertical direction, magnetization fixing forces of the magnetic material layers are transmitted to the track width region located at a central portion of the magnetic sensor, and as a result, the magnetization of the fixed magnetic layer in the track width region can be fixed.

Hence, according to the magnetic sensor of the present invention, the magnetization can be fixed by the exchange coupling with the two antiferromagnetic layers, and hence the magnetization fixing force can be improved as compared to the case in which the magnetization is fixed by exchange coupling with one antiferromagnetic layer in the vertical direction.

Accordingly, by improving the fixing force of the fixed magnetic layer in the track width region, the rate ($\Delta R/R$) of change in magnetoresistance can be increased, and hence the reproduction output can be improved.

DESCRIPTION OF THE PREFERRED EMBODIMENTS

Figure 1:
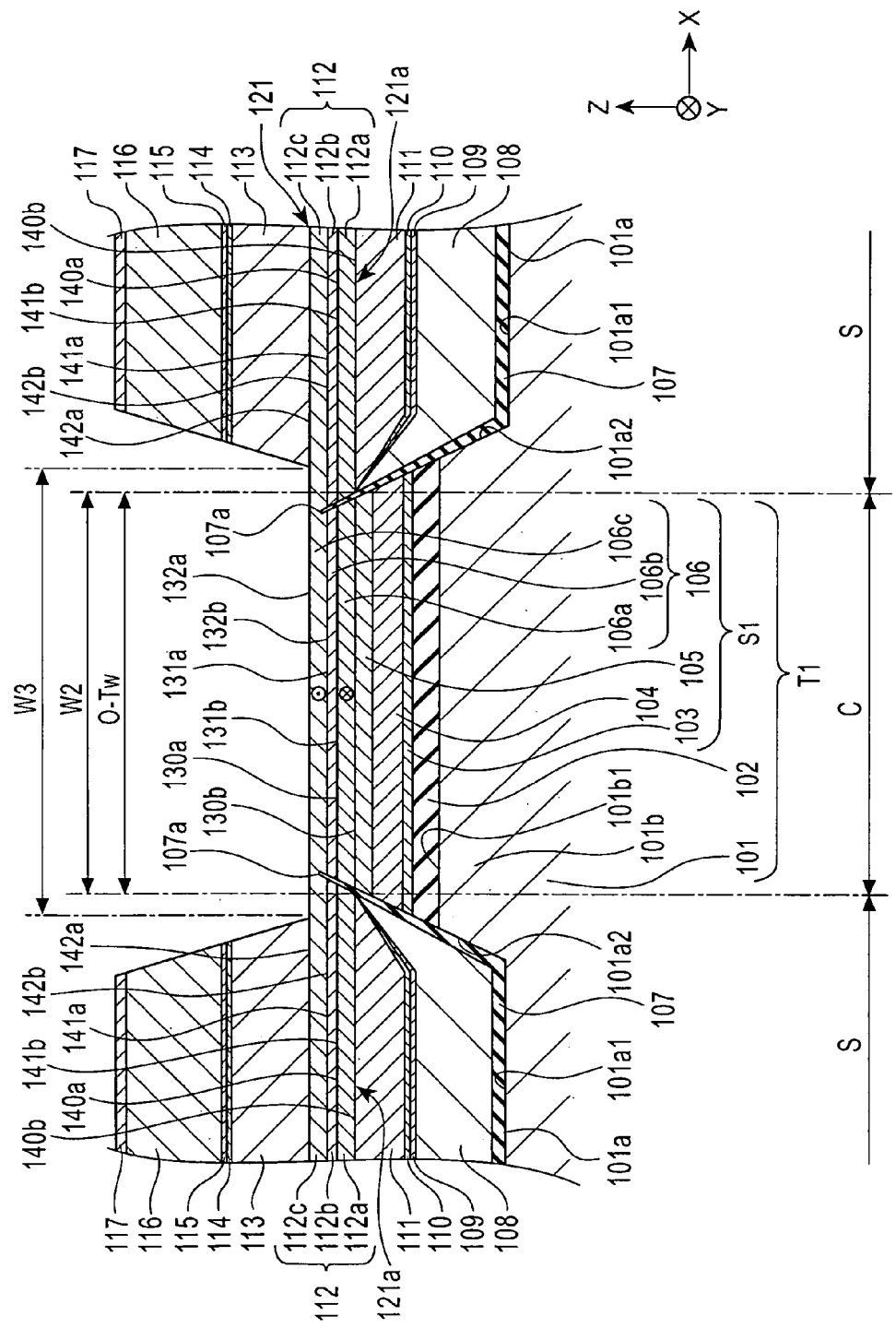
FIG. 1 is a partial cross-sectional view of a magnetic sensor according to a first embodiment of the present invention, the magnetic sensor being viewed from a facing surface facing a recording medium.

FIG. 1 is a partial cross-sectional view showing a magnetic sensor according to a first embodiment of the present invention, the magnetic sensor being viewed from a facing surface facing a recording medium. In FIG. 1, a cross-section of a central portion of the magnetic sensor extending in an X direction is only shown.

The magnetic sensor shown in FIG. 1 is an MR head for reproducing external signals recorded on a recording medium. For example, the facing surface facing a recording medium is perpendicular to surfaces of thin films forming the magnetic sensor and parallel to a magnetization direction of a free magnetic layer of the magnetic sensor when an external magnetic field is not applied. In FIG. 1, the facing surface facing a recording medium is a surface parallel to an X-Z plane.

When the magnetic sensor is used for a floating type magnetic sensor, the facing surface facing a recording medium is a so-called ABS surface.

The magnetic sensor described above is formed on a trailing end surface of a slider formed, for example, of alumina-titanium carbide ($Al_2O_3$—TiC). The slider is bonded to an elastic deformable support member made of a stainless steel material at a side opposite to the facing surface facing a recording medium, thereby forming a magnetic head device.

The track width direction is a width direction of a region in which the magnetization direction is changed by application of an external magnetic field, and for example, the track width direction is the magnetization direction of the free magnetic layer when an external magnetic field is not applied thereto, that is, is the X direction in the figure.

In addition, the recording medium faces the facing surface facing a recording medium of the magnetic sensor and travels in a Z direction in the figure. The direction of a leakage magnetic field from this recording medium is a Y direction in the figure.

The magnetic sensor shown in FIG. 1 is a so-called recessed spin valve type magnetic sensor in which an antiferromagnetic layer is not provided in an optical track width O-Tw region C, and antiferromagnetic layers are provided at two side regions S of the optical track width O-Tw region C. By exchange coupling between the fixed magnetic layer and the antiferromagnetic layers at the two side regions S of the optical track width direction O-Tw region C, the magnetizations of the fixed magnetic layer in the regions S are fixed in a predetermined direction. Hence, the magnetic fixing forces are transmitted to the fixed magnetic layer in the optical track width O-Tw region C, and hence the magnetization of the fixed magnetic layer in the optical track width O-Tw region C is fixed.

A magnetic sensor 100 shown in FIG. 1 has the structure in which a lower shield layer 101 is formed on a substrate not shown in the figure, a pair of recess portions 101a is formed in the lower shield layer 101 with a predetermined space therebetween in the track width direction, and a lower gap layer 102 and a seed layer 103 are provided in that order on an upper surface 101b1 of a protruding portion 101b sandwiched between the recess portions 101a.

On the seed layer 103, a multilayer film T1 is provided which is formed a free magnetic layer 104, a non-magnetic material layer 105, and a first fixed magnetic layer 106 in that order from the bottom.

The first fixed magnetic layer 106 has a synthetic ferrimagnetic pinned structure formed of a second magnetic material sublayer 106a, a first non-magnetic intermediate sublayer 106b, and a first magnetic material sublayer 106c.

In the recess portions 101a at the two side of the multilayer film T1, insulating layers 107 are each continuously formed on a bottom surface 101a1 and a side surface 101a2 of the recess portion 101a. Upper surfaces 107a of the insulating layers 107 are each located at an intermediate position of a third magnetic material sublayer 112c in the thickness direction (Z direction in the figure).

In the recess portions 101a, hard magnetic layers 108 are formed on the insulating layers 107. The minimum distance between the hard magnetic layers 108 in the track width direction (X direction in the figure) is the optical track width O-Tw.

On the hard magnetic layers 108, a pair of first antiferromagnetic layers 111 is formed with second non-magnetic material layers 109 and seed layers 110 interposed therebetween. The second non-magnetic material layers 109 each have a function of magnetically isolating the hard magnetic layer 108 from the first antiferromagnetic layer 111 which will be described later in detail and are each formed of Ta or the like. In addition, the seed layers 110 described above serve to align the crystal orientations of the first antiferromagnetic layers 111 and are each formed of NiFe, NiFeCr, Cr, or the like.

As shown in FIG. 1, the first antiferromagnetic layers 111 are formed with a space W2 therebetween in the track width direction.

On the first antiferromagnetic layers 111, second fixed magnetic layers 112 made of the same material as that for the first fixed magnetic layers 106 are formed. As is the first fixed magnetic layer 106, the second fixed magnetic layers 112 each have a synthetic ferrimagnetic pinned structure formed of a fourth magnetic material sublayer 112a, a second non-magnetic intermediate sublayer 112b, and a third magnetic material sublayer 112c.

The second fixed magnetic layers 112 and the first fixed magnetic layer 106 collectively form a fixed magnetic layer 121 of the present invention. That is, the fixed magnetic layer 121 of the present invention is formed of the first fixed magnetic layer 106 located inside the multilayer film T1 and the second fixed magnetic layers 112 which are extension portions 121a located at the two sides of the multilayer film T1.

Figure 2:
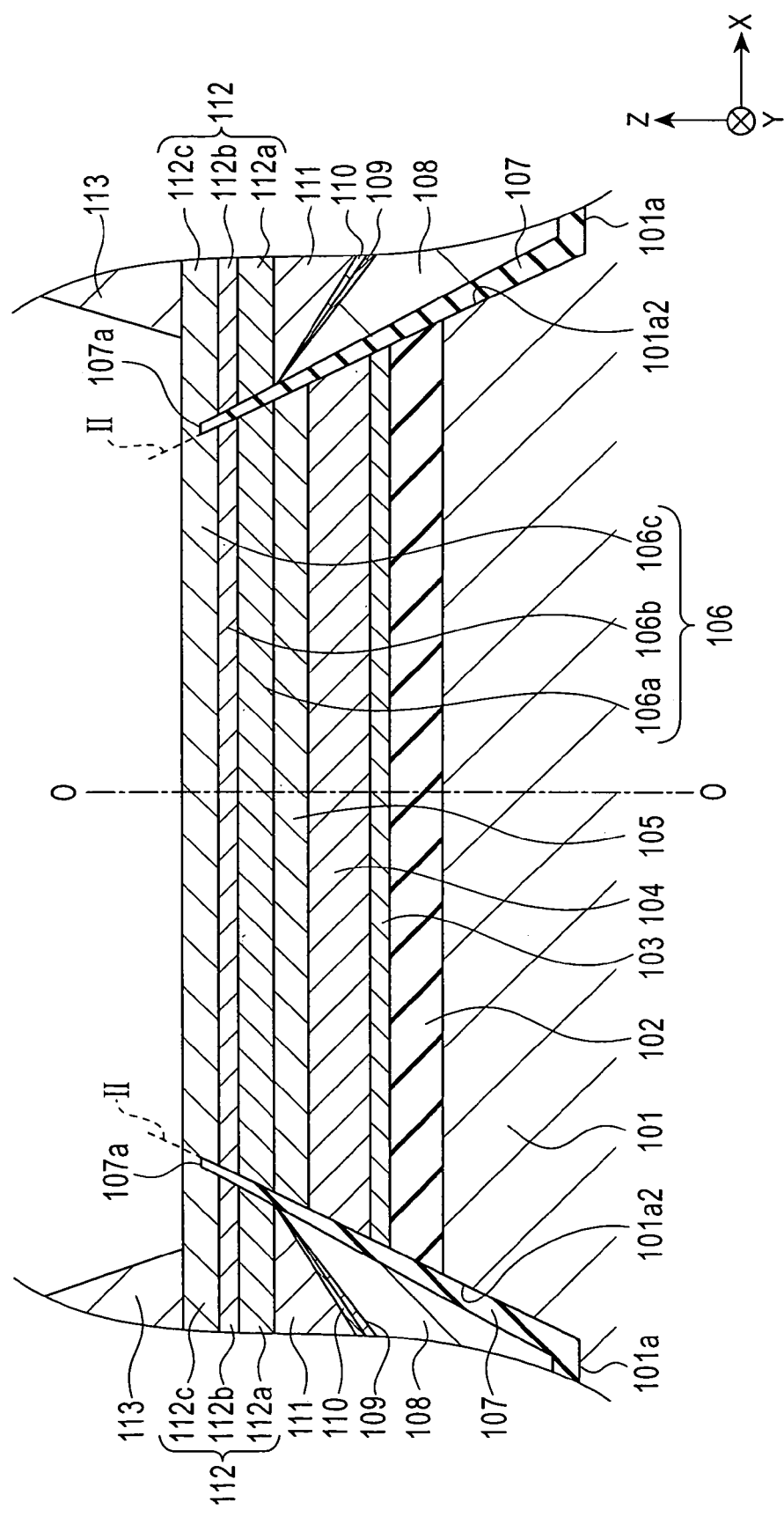
FIG. 2 is a partial enlarged view of the magnetic sensor shown in FIG. 1.

FIG. 2 is a partial enlarge view of FIG. 1. As shown in FIG. 2, in this specification, the "second fixed magnetic layers 112" each indicate a portion located at a side position from the side surface 101a2 of the recess portion 101a formed at each of the two sides of the multilayer film T1 and from a virtual plane II obtained by extending the side surface 101a2 in the thickness direction (Z direction in the figure) toward the outside (in a direction apart from a central line O-O in the figure). In addition, the first fixed magnetic layer 106 indicates a portion located at a position from the side surfaces 101a2 of the recess portions 101a and the virtual planes II toward the central portion in the figure (direction toward the central line O-O).

The third magnetic material sublayers 112c forming the second fixed magnetic layers 112 and the first magnetic material sublayer 106c forming the first fixed magnetic layer 106 are continuously and integrally formed with the virtual planes II provided therebetween.

As shown in FIG. 1, a lower surface 130b of the second magnetic material sublayer 106a and lower surfaces 140b of the fourth magnetic material sublayers 112a are formed at the same height, and an upper surface 130a of the second magnetic material sublayer 106a and upper surfaces 140a of the fourth magnetic material sublayers 112a are formed at the same height.

In addition, as shown in FIG. 1, a lower surface 131b of the first non-magnetic intermediate sublayer 106b and lower surfaces 141b of the second non-magnetic intermediate sublayers 112b are formed at the same height, and an upper surface 131a of the first non-magnetic intermediate sublayer 106b and upper surfaces 141a of the second non-magnetic intermediate sublayers 112b are formed at the same height.

Furthermore, a lower surface 132b of the first magnetic material sublayer 106c and lower surfaces 142b of the third magnetic material sublayers 112c are formed at the same height, and an upper surface 132a of the first magnetic material sublayer 106c and upper surfaces 142a of the third magnetic material sublayers 112c are formed at the same height.

That is, the first fixed magnetic layer 106 and the second fixed magnetic layers 112 are formed at the same height.

On the second fixed magnetic layers 112, a pair of second antiferromagnetic layers 113 is formed with a space W3 therebetween in the track width direction.

On the second antiferromagnetic layers 113, stopper layers 114 are formed, and on the stopper layers 114, protective layers 115 are formed. On the protective layers 115, electrode layers 116 are formed with a space therebetween in the track width direction, and protective layers 117 are formed thereon.

Next, on the electrode layers 116 and the protective layers 117, a gap layer and an upper shield layer are formed (not shown in the figure).

Next, materials for the individual constituent elements forming the magnetic sensor 100 will be described.

The lower shield layer 101 and the upper shield layer are formed of a magnetic material such as NiFe, and the lower gap layer 102 and the upper gap layer are formed of an insulating material such as alumina ($Al_2O_3$) or $SiO_2$.

The seed layer 103 is formed of a non-magnetic material having a bcc (body-centered cubic) crystal structure such as Cr, an fcc (face-centered cubic) structure such as a NiFeCr alloy, or an amorphous-like structure such as Ta. By the presence of this seed layer 103, the crystal orientation of the free magnetic layer 104 formed thereon is aligned, and as a result, besides the improvement in soft magnetic properties of the free magnetic layer 104, the resistivity thereof can be decreased.

The free magnetic layer 104 is formed of a ferromagnetic material, such as a NiFe alloy, Co, a CoFeNi alloy, a CoFe alloy, or a CoNi alloy, and in particular, is preferably formed of a NiFe alloy, a CoFe alloy, or a CoFeNi alloy. The thickness of the free magnetic layer 104 is preferably in the range of from approximately 30 to 50 Å. In addition, when the free magnetic layer 104 is formed using a CoFe alloy, the composition thereof is, for example, 90 atomic percent of Co and 10 atomic percent of Fe.

The first non-magnetic material layer 105 prevents magnetic coupling between the first fixed magnetic layer 106 and the free magnetic layer 104, serves as a layer through which a sense current primarily passes, and is preferably formed of a conductive non-magnetic material such as Cu, Cr, Au, or Ag. In particular, Cu is preferably used. The first non-magnetic material layer 105 is formed to have a thickness of approximately 18 to 30 Å.

The first magnetic material sublayer 106c and the second magnetic material sublayer 106a forming the first fixed magnetic layer 106 are formed of a ferromagnetic material such as a NiFe alloy, Co, a CoFeNi alloy, a CoFe alloy, or a CoNi alloy, and in particular, they are preferably formed of a CoFe alloy or Co. In addition, the first magnetic material sublayer 106c and the second magnetic material sublayer 106a are preferably formed of the same material.

In addition, the first non-magnetic intermediate sublayer 106b is formed of a non-magnetic material which is at least one of Ru, Rh, Ir, Cr, Re, and Cu, or an alloy containing at least two materials among those mentioned above. In particular, Ru is preferably used.

The first magnetic material sublayer 106c and the second magnetic material sublayer 106a are each formed to have a thickness of approximately 10 to 70 Å. In addition, the first non-magnetic interlayer 106b is formed to have a thickness of approximately 3 to 10 Å.

In addition, the first magnetic material sublayer 106c and the second magnetic material sublayer 106a have different magnetic thicknesses (Ms×t: product of the saturated magnetization and the film thickness) from each other, and the three layers, that is, the first magnetic material sublayer 106c, the first non-magnetic intermediate sublayer 106b, and the second magnetic material sublayer 106a, collectively function as the fixed magnetic layer 106.

In addition, the first fixed magnetic layer 106 may have a one-layered structure using one of the magnetic materials mentioned above or may have a two-layered structure composed of a layer formed of one of the magnetic materials mentioned above and a diffusion prevention layer such as a Co layer.

The second fixed magnetic layer 112 also has the same structure and is formed of the same materials as those of the first fixed magnetic layer 106.

The hard magnetic layers 108 are each formed, for example, of a NiFe alloy, Co, a CoFeNi alloy, a CoFe alloy, or a CoNi alloy, and in particular, is preferably formed of a NiFe alloy, a CoFe alloy, or a CoFeNi alloy. This hard magnetic layer 108 may be formed to have a thickness in the range of from 100 to 200 Å, such as 150 Å.

The first antiferromagnetic layers 111 and the second antiferromagnetic layers 113 are each formed of a PtMn alloy, an X—Mn alloy (where X is at least one element selected from the group consisting of Pd, Ir, Rh, Ru, Os, Ni, and Fe), or a Pt—Mn—X' alloy (where X' is at least one element selected from the group consisting of Pd, Ir, Rh, Ru, Au, Ag, Os, Cr, Ni, Ar, Ne, Xe, and Kr).

The alloys mentioned above each have a disordered face-centered cubic (fcc) structure right after the film formation and is then transformed into a CuAuI type ordered face-centered tetragonal (fct) structure by heat treatment.

The thicknesses of the first antiferromagnetic layer 111 and the second antiferromagnetic layer 113 are each in the range of from 80 to 300 Å, and for example, the thickness of the first antiferromagnetic layer 111 and the thickness of the second antiferromagnetic layer 113 are 100 Å and 160 Å, respectively.

In the present invention, even when the first antiferromagnetic layers 111 and the second antiferromagnetic layers 113 are formed of the same PtMn alloy, the same X—Mn alloy, or the same Pt—Mn—X' alloy in terms of the composition ratio thereof, the magnetization direction of the free magnetic layer 104 can be aligned perpendicular to the magnetization directions of the first fixed magnetic layer 106 and the second fixed magnetic layers 112.

The stopper layers 114 may be formed of Cr or the like, and the protective layers 115 formed on the stopper layers 114 may be formed of a non-magnetic material such as Ta.

The electrode layers 116 may be formed using Au, W, Ta, Cr, Cu, Rh, Ir, or Ru. The thickness of this electrode layer 116 is in the range of from 50 to 300 Å, such as 200 Å. The protective layers 117 provided on the electrode layers 116 may be formed using a non-magnetic material such as Ta.

As shown in FIG. 1, at lower sides (in a direction opposite to the Z direction) of the second fixed magnetic layers 112, the first antiferromagnetic layers 111 are formed, and the fourth magnetic material sublayers 112a are formed so as to be in contact with the first antiferromagnetic layers 111. When annealing in a magnetic field is performed, exchange anisotropic magnetic fields are generated by exchange coupling at the interfaces between the fourth magnetic material sublayers 112a and the first antiferromagnetic layers 111, and the magnetization directions of the fourth magnetic material sublayers 112a are fixed in the Y direction in the figure.

In addition, at upper sides (in the Z direction in the figure) of the second fixed magnetic layers 112, the second antiferromagnetic layers 113 are formed, and the third magnetic materials 112c are formed so as to be in contact with the second antiferromagnetic layers 113. When annealing in a magnetic field is performed, exchange anisotropic magnetic fields are generated by exchange coupling at the interfaces between the third magnetic material sublayers 112c and the second antiferromagnetic layers 113, and the magnetization directions of the third magnetic material sublayers 112c are fixed in the direction antiparallel to the Y direction in the figure.

In this case, when the magnetic moment per unit area of the fourth magnetic material sublayer 112a is larger than that of the third magnetic material sublayer 112c, the magnetization direction of the second fixed magnetic layer 112 on the whole is to be fixed in the Y direction in the figure. On the other hand, when the magnetic moment per unit area of the fourth magnetic material sublayer 112a is smaller than that of the third magnetic material sublayer 112c, the magnetization direction of the second fixed magnetic layer 112 on the whole is to be fixed in the direction antiparallel to the Y direction in the figure. In this specification, the case in which the magnetizations of the second fixed magnetic layers 112 are fixed in the Y direction in the figure will be described by way of example.

In the magnetic sensor 100, the magnetization directions of the first fixed magnetic layer 106 and the second fixed magnetic layers 112 are appropriately fixed in the direction parallel to the Y direction in the figure. In addition, the magnetization of the free magnetic layer 104 is aligned in the X direction in the figure by a bias magnetic field applied from the hard magnetic layers 108 so as to be placed in a single domain state, and the magnetization of the first fixed magnetic layer 106 and the magnetization of the free magnetic layer 104 intersect each other or preferably orthogonally intersect each other. The leakage magnetic field from a recording medium enters the magnetic sensor 100 along the Y direction in the figure, and the magnetization of the free magnetic layer 104 in the optical track width O-Tw region C is sensitively changed. By the relationship between this change in magnetization direction and the fixed magnetization direction of the first fixed magnetic layer 106, the electrical resistance is changed, and due to the change in voltage or current caused by this change in electrical resistance, the leakage magnetic field from the recording medium is detected.

However, the change (output) in electrical resistance is directly influenced by a relative angle formed between the magnetization direction of the first fixed magnetic layer 106a and the magnetization direction of the free magnetic layer 104, and the relative angle is preferably a right angle in the state in which a sense current is applied and in which a signal magnetic field is not applied.

When the fourth magnetic material sublayer 112a and the third magnetic material sublayer 112c, which form the second fixed magnetic layer 112, are in a ferrimagnetic state in which the magnetization directions thereof are antiparallel to each other, since the fourth magnetic material sublayer 112a fixes the magnetization direction of the third magnetic material sublayer 112c, and vice versa, the magnetization direction of the second fixed magnetic layer 106 can be tightly fixed in a predetermined direction on the whole.

In addition, in the magnetic sensor 100 of the present invention, at the lower side of each of the second fixed magnetic layers 112, the magnetization thereof is fixed by exchange coupling with the first antiferromagnetic layer 111, and at the upper side of each of the second fixed magnetic layers 106, the magnetization thereof is fixed by exchange coupling with the second antiferromagnetic layer 113. That is, since forces which contribute to fixing magnetization are given to the second fixed magnetic layer 112 from the upper and the lower sides thereof, the magnetization of each of the second fixed magnetic layers 112 can be tightly fixed.

As described above, in the magnetic sensor 100 of the present invention, the third magnetic material sublayers 112c forming the second fixed magnetic layers 112 and the first magnetic material sublayer 106c forming the first fixed magnetic layer 106 are continuously and integrally formed with the virtual planes II provided therebetween. Accordingly, the magnetization fixing forces of the second fixed magnetic layers 112 are transmitted to the first fixed magnetic layer 106 through the respective virtual planes II. In particular, as described above, since the first fixed magnetic layer 106 and the second fixed magnetic layers 112 are formed at the same height, the magnetization fixing forces generated in the second fixed magnetic layers 112 tend to be easily transmitted to the first fixed magnetic layer 106.

For example, when the antiferromagnetic layers are only provided at one of the upper and the lower sides of the second fixed magnetic layers 112 as is the case of a related magnetic sensor, the forces which contribute to fixing magnetization is given to the second fixed magnetic layers 112 only from one of the upper and the lower sides thereof, and hence the magnetization fixing forces generated in the second fixed magnetic layers 112 are not strong. In addition, when the magnetization fixing forces are transmitted from the second fixed magnetic layers 112 to the first fixed magnetic layer 106, the magnetization fixing force in the first fixed magnetic layer 106 is further decreased. Hence, the rate ($\Delta R/R$) of change in magnetoresistance is small, and the reproduction output cannot be improved.

However, according to the magnetic sensor 100 of the present invention, forces which contribute to fixing magnetization are generated from the upper and the lower sides as described above, the magnetization fixing forces of the second fixed magnetic layers 112 can be increased. Hence, the rate ($\Delta R/R$) of change in magnetoresistance can be increased, and the reproduction output can be improved.

In addition, in order to increase the magnetization fixing forces of the second fixed magnetic layers 112 in the optical track width O-Tw region C, an antiferromagnetic layer may not be provided in the optical track width O-Tw region C, and hence the effective thickness dimension (dimension in the Z direction in the figure) in the optical track width O-Tw region C can be decreased. As a result, due to the improvement in positional resolution, the requirement for higher recording density can be appropriately satisfied.

In addition, in the magnetic sensor 100 described above, the space W2 between the first antiferromagnetic layers 111 is the same as the optical track width O-Tw. Hence, as described in a manufacturing method which will be introduced later, the first antiferromagnetic layers 111 and the hard magnetic layers 108 can be formed in the same manufacturing step, and as a result, in addition to facilitation of the manufacturing, it becomes possible to enable the space W2 to accurately coincide with the optical track width O-Tw determined by the space between the hard magnetic layers 108.

In addition, since the first antiferromagnetic layer 111 is formed between the hard magnetic layer 108 and the second fixed magnetic layer 112, static magnetic coupling between the hard magnetic layer 108 and the second fixed magnetic layer 112 can be suppressed, and hence the rotation of the magnetization direction of the second fixed magnetic layer 112, which is caused by the static magnetic field of the hard layer 108, can also be suppressed.

As shown in FIG. 1, the hard magnetic layers 108 are provided in the recess portions 101a formed in the lower shield layer 101. However, in the present invention, instead of forming the recess portions 101a in the lower shield layer 101, the structure may be formed in which the lower gap layer 102 is formed to extend to the side regions S of the optical track width O-Tw, a pair of recess portions is formed in the lower gap layer 102 with a predetermined space therebetween in the optical track width O-Tw direction, and the hard magnetic layers 108 are then formed in the recess portions.

Figure 3:
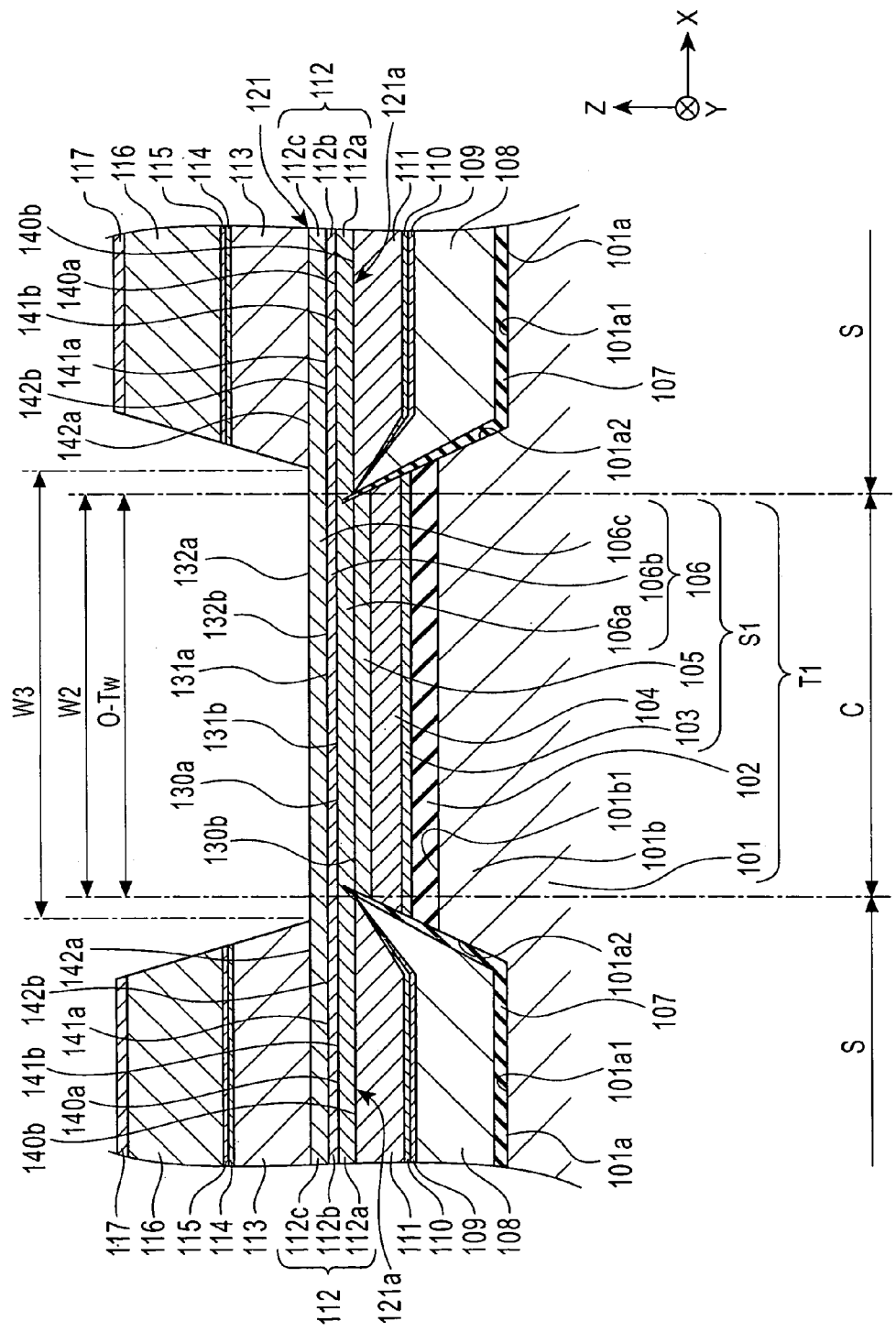
FIG. 3 is a partial cross-sectional view of a magnetic sensor according to a second embodiment of the present invention, the magnetic sensor being viewed from a facing surface facing a recording medium.

FIG. 3 is a partial cross-sectional view of a magnetic sensor 200 of a second embodiment of the present invention and is a view corresponding to FIG. 1, the magnetic sensor 200 being viewed from the facing surface facing a recording medium.

The magnetic sensor 200 shown in FIG. 3 has the structure approximately equivalent to that of the magnetic sensor 100 shown in FIG. 1. Accordingly, the same reference numerals of the constituent elements of the magnetic sensor 100 shown in FIG. 1 designate the same constituent elements of the magnetic sensor 200 shown in FIG. 3, and descriptions thereof in detail will be omitted. Points different from the magnetic sensor 100 shown in FIG. 1 will be mainly described.

Figure 4:
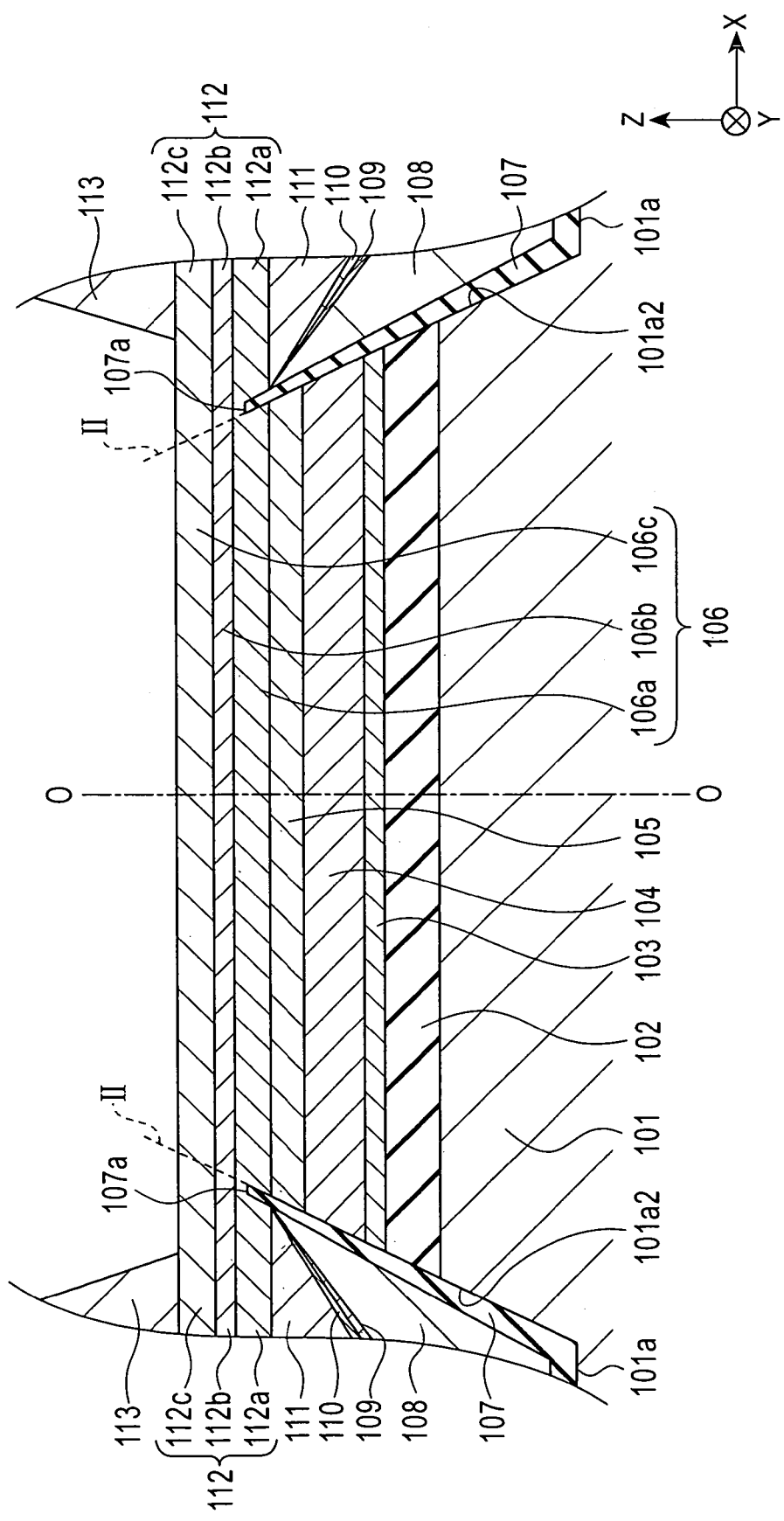
FIG. 4 is a partial enlarged view of the magnetic sensor shown in FIG. 3.

FIG. 4 is a partial enlarged view of FIG. 3 and corresponds to FIG. 2. In the magnetic sensor 200 shown in FIG. 3, as shown in FIG. 4, the upper surfaces 107a of the insulating layers 107 are each located at an intermediate position of the fourth magnetic material sublayer 112a in the thickness direction (Z direction in the figure).

As shown in FIG. 4, the fourth magnetic material sublayers 112a and the second magnetic material sublayer 106a, the second non-magnetic intermediate sublayers 112b and the first non-magnetic intermediate sublayer 106b, and the third magnetic material sublayers 112c and the first magnetic material sublayer 106c are continuously and integrally formed with the virtual planes II provided therebetween.

Also in the magnetic sensor 200 shown in FIG. 3 or 4, since the second fixed magnetic layers 112 and the first fixed magnetic layer 106 are continuously and integrally formed with the virtual planes II provided therebetween, the magnetization fixing forces of the second fixed magnetic layers 112 are transmitted to the first fixed magnetic layer 106 through the virtual planes II.

Figure 5:
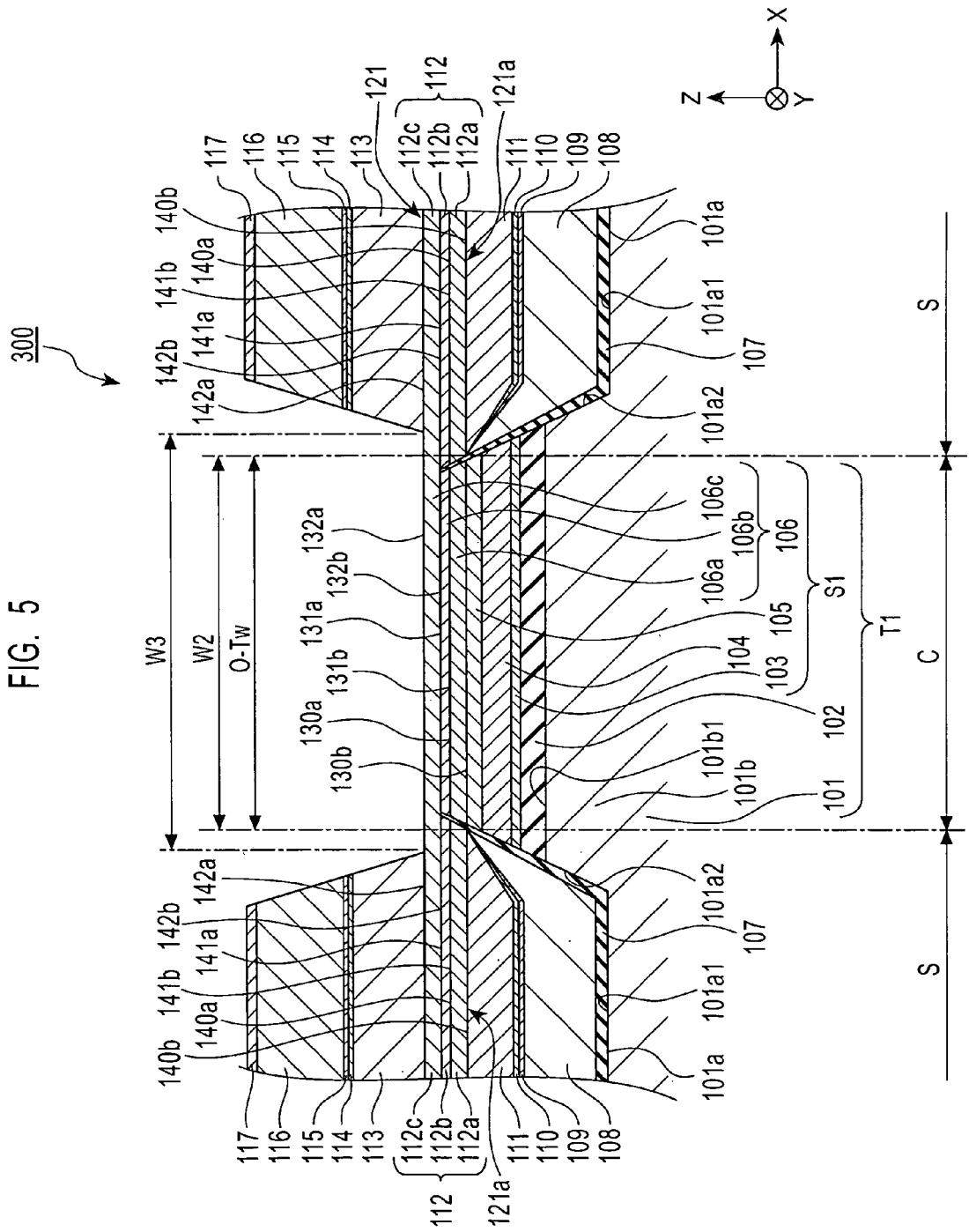
FIG. 5 is a partial cross-sectional view of a magnetic sensor according to a third embodiment of the present invention, the magnetic sensor being viewed from a facing surface facing a recording medium.

FIG. 5 is a partial cross-sectional view of a magnetic sensor 300 of a third embodiment of the present invention and is a view corresponding to FIG. 1, the magnetic sensor 300 being viewed from the facing surface facing a recording medium.

The magnetic sensor 300 shown in FIG. 5 has the structure approximately equivalent to that of the magnetic sensor 100 shown in FIG. 1. Accordingly, the same reference numerals of the constituent elements of the magnetic sensor 100 shown in FIG. 1 designate the same constituent elements of the magnetic sensor 300 shown in FIG. 5, and descriptions thereof in detail will be omitted. Points different from the magnetic sensor 100 shown in FIG. 1 will be mainly described.

Figure 6:
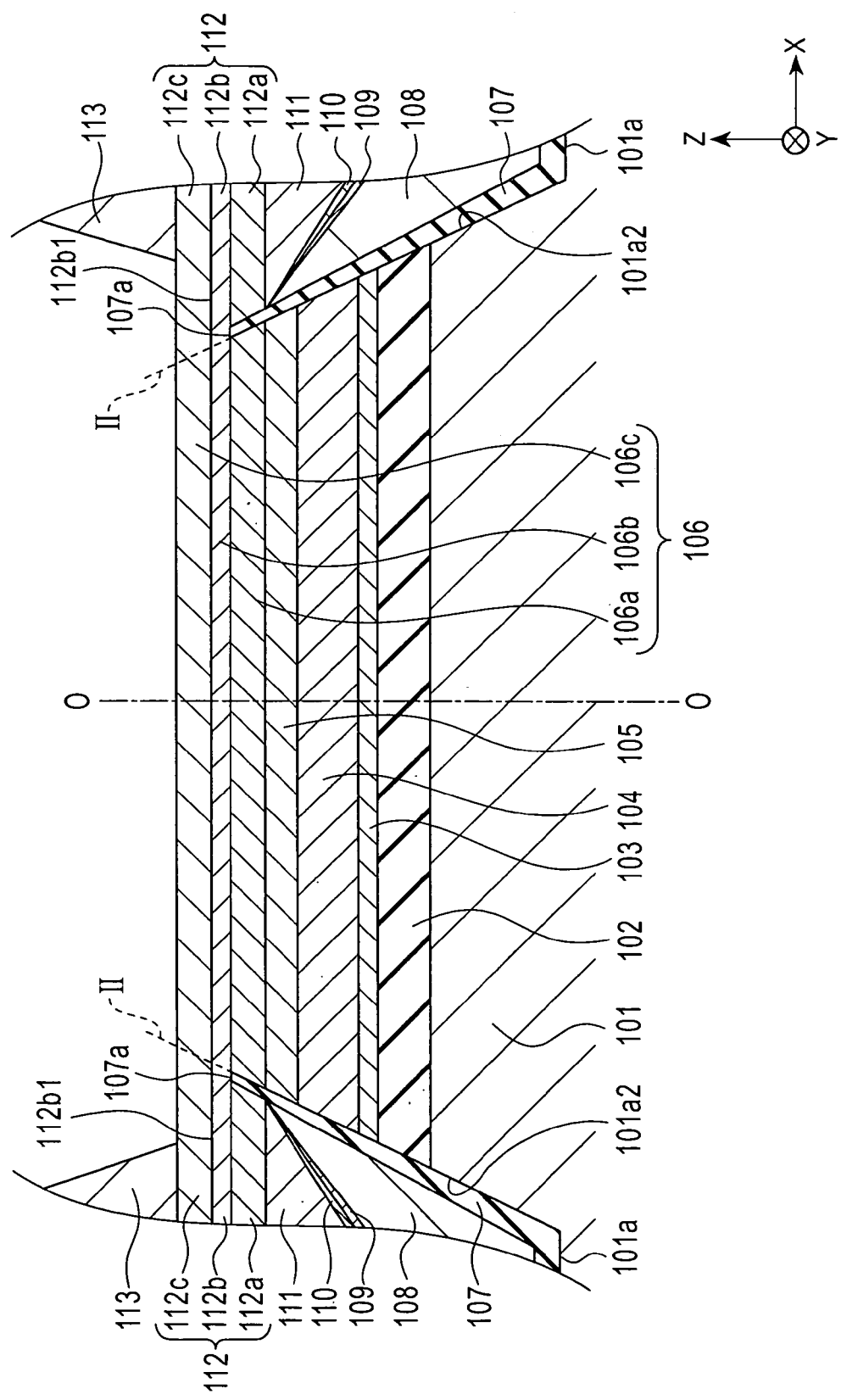
FIG. 6 is a partial enlarged view of the magnetic sensor shown in FIG. 5.

FIG. 6 is a partial enlarged view of FIG. 5 and corresponds to FIG. 2. In the magnetic sensor 300 shown in FIG. 5, as shown in FIG. 6, the upper surfaces 107a of the insulating layers 107 are located at the same height as that of the upper surfaces 141a of the second non-magnetic intermediate sublayers 112b.

As shown in FIG. 6, the third magnetic material sublayers 112c and the first magnetic material sublayer 106c are continuously and integrally formed with the virtual planes II provided therebetween.

In the magnetic sensor 300 shown in FIG. 5 or 6, since the second fixed magnetic layers 112 and the first fixed magnetic layer 106 are also continuously and integrally formed with the virtual planes II provided therebetween, the magnetic fixing forces of the second fixed magnetic layers 112 are transmitted to the first fixed magnetic layer 106 through the virtual planes II.

Figure 7:
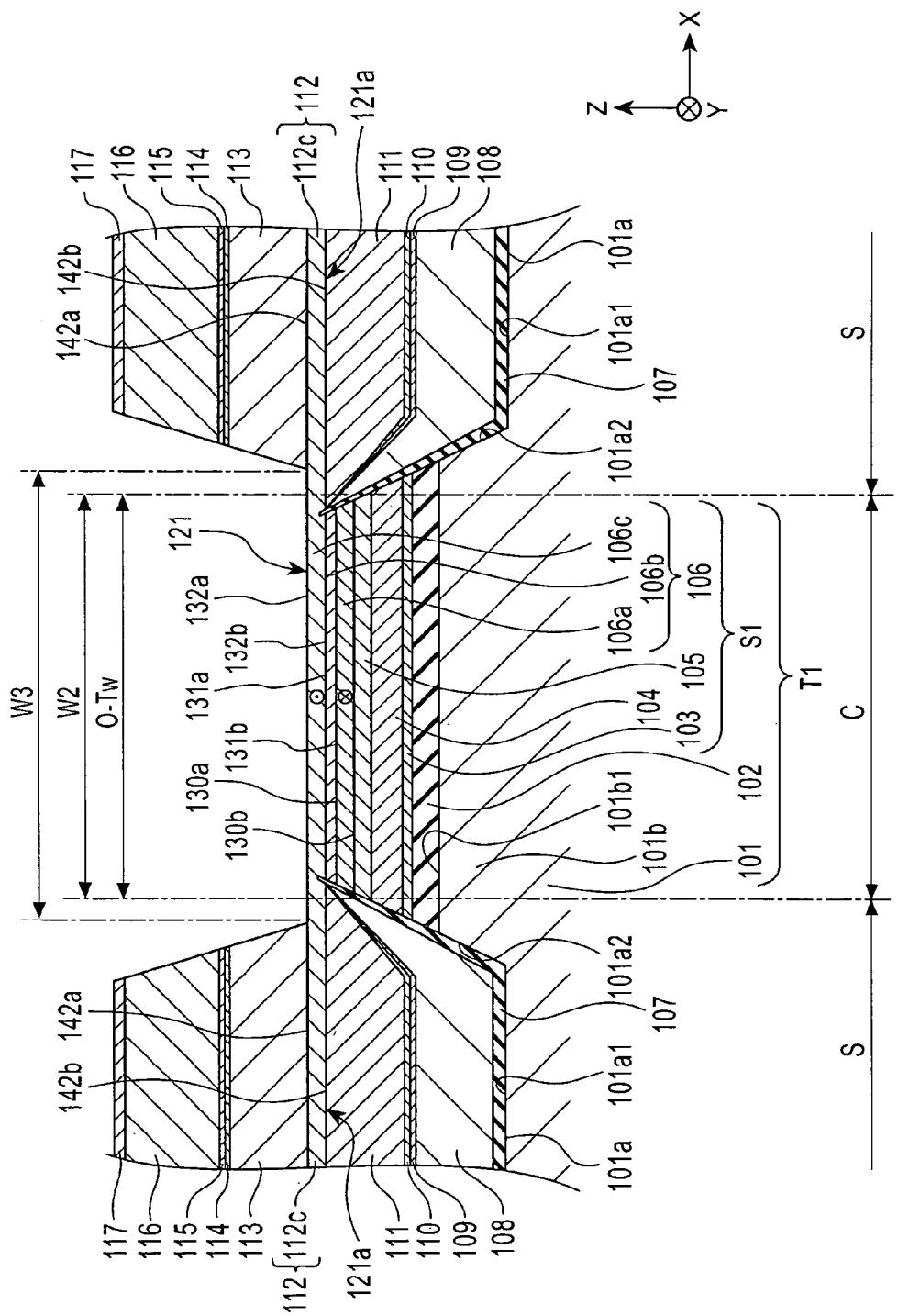
FIG. 7 is a partial cross-sectional view of a magnetic sensor according to a fourth embodiment of the present invention, the magnetic sensor being viewed from a facing surface facing a recording medium.

FIG. 7 is a partial cross-sectional view of a magnetic sensor 400 of a fourth embodiment of the present invention and is a view corresponding to FIG. 1, the magnetic sensor 400 being viewed from the facing surface facing a recording medium.

The magnetic sensor 400 shown in FIG. 7 has the structure approximately equivalent to that of the magnetic sensor 100 shown in FIG. 1. Accordingly, the same reference numerals of the constituent elements of the magnetic sensor 100 shown in FIG. 1 designate the same constituent elements of the magnetic sensor 400 shown in FIG. 7, and descriptions thereof in detail will be omitted. Points different from the magnetic sensor 100 shown in FIG. 1 will be mainly described.

In the magnetic sensor 400 shown in FIG. 7, the second fixed magnetic layer 112 are each formed only of one layer, that is, the third magnetic material sublayer 112c, and the rest of the structure of the magnetic sensor 400 is the same as that of the magnetic sensor 100 shown in FIG. 1. By this magnetic sensor 400, particular advantages equivalent to those of the magnetic sensor 100 shown in FIG. 1 can also be obtained.

Figure 8:
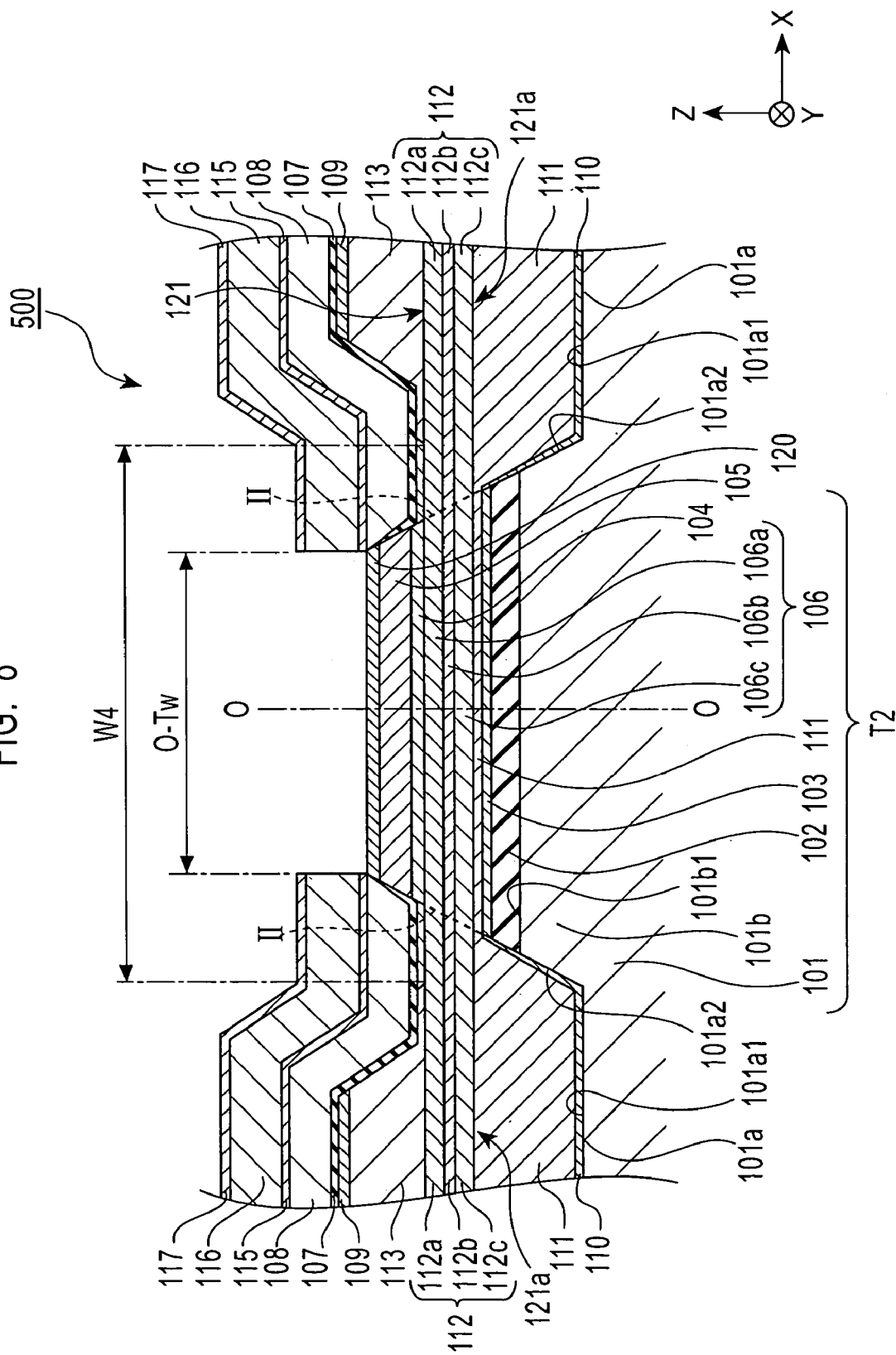
FIG. 8 is a partial cross-sectional view of a magnetic sensor according to a fifth embodiment of the present invention, the magnetic sensor being viewed from a facing surface facing a recording medium.

FIG. 8 is a partial cross-sectional view of a magnetic sensor 500 of a fifth embodiment of the present invention and is a view corresponding to FIG. 1, the magnetic sensor 500 being viewed from the facing surface facing a recording medium.

The magnetic sensor 500 shown in FIG. 8 has the structure approximately equivalent to that of the magnetic sensor 100 shown in FIG. 1. Accordingly, the same reference numerals of the constituent elements of the magnetic sensor 100 shown in FIG. 1 designate the same constituent elements of the magnetic sensor 500 shown in FIG. 8, and descriptions thereof in detail will be omitted.

The magnetic sensor 500 shown in FIG. 8 is a so-called bottom spin valve type GMR magnetic sensor in which the free magnetic layer 104 is provided above the first fixed magnetic layer 106 and the second fixed magnetic layers 112.

In the magnetic sensor 500 shown in FIG. 8, a pair of the recess portions 101a is formed in the lower shield layer 101 with a predetermined space therebetween in the track width direction, and on the upper surface 101b1 of the protruding portion 101b sandwiched between the recess portions 101a, the lower gap layer 102 and the seed layer 103 are formed in that order from the bottom.

On the seed layer 103, a multilayer film T2 is provided which is formed of the antiferromagnetic layer 111, the first fixed magnetic layer 106, the first non-magnetic material layer 105, the free magnetic layer 104, and a third non-magnetic material layer 120.

The first fixed magnetic layer 106 has a synthetic ferrimagnetic pinned structure composed of the second magnetic material sublayer 106a, the first non-magnetic intermediate sublayer 106b, and the first magnetic material sublayer 106c.

In the recess portions 101a formed at the two sides of the multilayer film T2, the seed layers 110 are each continuously formed on the bottom surface 101a1 and the side surface 101a2 of the recess portion 101a, and the first antiferromagnetic layer 111 is continuously formed on the seed layer 103 and the seed layers 110.

As shown in FIG. 8, the antiferromagnetic layer 111 is continuously formed inside the recess portions 101a and on the protruding portion 101b.

On the antiferromagnetic layer 111, the first fixed magnetic layer 106 and the second fixed magnetic layers 112 are formed, each of the fixed magnetic layers having a synthetic ferrimagnetic pinned structure.

The second fixed magnetic layers 112 each indicate a portion located at a side position from the side surface 101a2 of the recess portion 101a formed at each of the two sides of the multilayer film T1 and from the virtual plane II obtained by extending the side surface 101a2 in the thickness direction (Z direction in the figure) toward the outside (in a direction apart from a central line O-O in the figure). In addition, the first fixed magnetic layer 106 indicates a portion located at a position from the side surfaces 101a2 of the recess portion 101a and the virtual planes II toward the central portion in the figure (direction toward the central line O-O).

As shown in FIG. 8, two types of fixed magnetic layers, that is, the fixed magnetic layer 106 and the second fixed magnetic layers 112, are continuously and integrally formed with the virtual planes II provided therebetween.

On the second fixed magnetic layers 112, a pair of the second antiferromagnetic layers 113 is formed with a space W4 therebetween in the track width direction.

On the second antiferromagnetic layers 113, the hard magnetic layers 108 are formed with the second non-magnetic material layers 109 and the insulating layers 107 provided therebetween. The minimum distance between the hard magnetic layers 108 in the track width direction (X direction in the figure) is the optical track width O-Tw.

The protective layers 115 are formed on the hard magnetic layers 108, the electrode layers 116 are formed on the protective layers 115 with a space therebetween in the track width direction, and the protective layers 117 are formed on the electrode layers 116.

Also in the magnetic sensor 500, at the lower sides of the second fixed magnetic layers 112, the magnetizations are fixed by exchange coupling with the first antiferromagnetic layer 111, and at the upper sides of the second fixed magnetic layers 112, the magnetizations are fixed by exchange coupling with the second antiferromagnetic layers 113. That is, since the forces which contribute to fixing magnetization are given to the second fixed magnetic layers 112 from the upper and the lower sides, the magnetizations of the second fixed magnetic layers 112 can be tightly fixed.

As described above, in the magnetic sensor 500 of the present invention, the second fixed magnetic layers 112 and the first fixed magnetic layer 106 are continuously and integrally formed. Accordingly, the magnetization fixing forces of the second fixed magnetic layers 112 are transmitted to the first fixed magnetic layer 106 through the virtual planes II. In particular, as described above, since the first fixed magnetic layer 106 and the second fixed magnetic layers 112 are formed at the same height, the magnetization fixing forces generated in the second fixed magnetic layers 112 are likely to be transmitted to the first fixed magnetic layer 106.

For example, as is a related magnetic sensor, when the antiferromagnetic layers are only provided at one of the lower sides and the upper sides of the second fixed magnetic layers 112, since forces which contribute to fixing magnetization are given to the second fixed magnetic layers 112 only from one of the lower sides and the upper sides thereof, the magnetization fixing forces generated in the second fixed magnetic layers 112 are small, and when the magnetization fixing forces are transmitted to the first fixed magnetic layer 106, the magnetization fixing force in the first fixed magnetic layer 106 is further decreased. Hence, the rate ($\Delta R/R$) of change in magnetoresistance is small, and the reproduction output cannot be improved.

However, in the magnetic sensor 500 of the present invention, as described above, since the forces which contribute to fixing magnetization are given to the second fixed magnetic layers 112 from the upper sides and the lower sides thereof, the magnetization fixing forces of the second fixed magnetic layers 112 can be increased. Hence, the rate ($\Delta R/R$) of change in magnetoresistance can be increased, and the reproduction output can be improved.

In addition, in order to increase the magnetization fixing forces of the second fixed magnetic layers 112 in the optical track width O-Tw region C, an antiferromagnetic layer may not be provided in the optical track width O-Tw region C, and hence the effective thickness dimension (dimension in the Z direction) in the optical track width O-Tw region C can be decreased. As a result, due to the improvement in positional resolution, the requirement for higher recording density can be appropriately satisfied.

In addition, since the second antiferromagnetic layers 113 are each formed between the hard magnetic layer 108 and the second fixed magnetic layer 112, static magnetic coupling between the hard magnetic layer 108 and the second fixed magnetic layer 112 can be suppressed, and the rotation of the magnetization direction of the second fixed magnetic layer 112 caused by the static magnetic field of the hard magnetic layer 108 can be suppressed.

Figure 9:
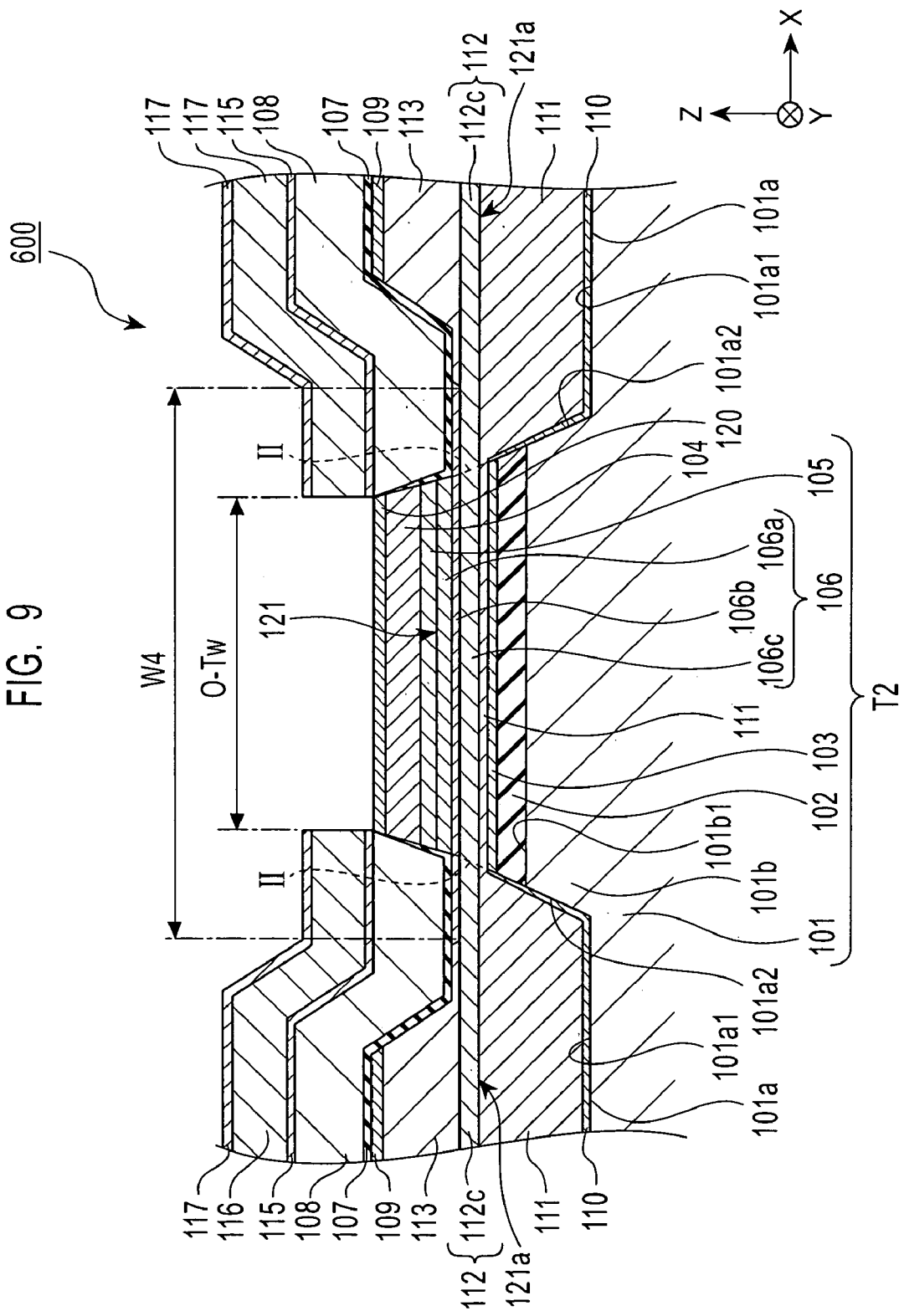
FIG. 9 is a partial cross-sectional view of a magnetic sensor according to a sixth embodiment of the present invention, the magnetic sensor being viewed from a facing surface facing a recording medium.

In the magnetic sensor 500 shown in FIG. 8, the second fixed magnetic layers 112 each have a three-layered synthetic ferrimagnetic pinned structure; however, the present invention is not limited thereto, and as is a magnetic sensor 600 of a sixth example of the present invention shown in FIG. 9, each of the second fixed magnetic layers 112 may be formed of one layer, that is, the third magnetic material sublayer. In the magnetic sensor 600 shown in FIG. 9, the same reference numerals of the constituent elements of the magnetic sensor 500 shown in FIG. 8 designate the same constituent elements, and descriptions thereof in detail will be omitted.

Next, a method for manufacturing the magnetic sensor 100 shown in FIGS. 1 and 2 will be described. FIGS. 10 to 16 are views for illustrating the method for manufacturing the magnetic sensor 100 shown in FIG. 1 and are each showing a partial cross-sectional view of a semi-finished magnetic sensor in a manufacturing step when viewed from the facing surface facing a recording medium. In addition, from FIGS. 12 to 16, a layer having the same reference numeral as that in FIG. 1 is formed so as to have the same composition and the same thickness as that in FIG. 1.

Figure 10:
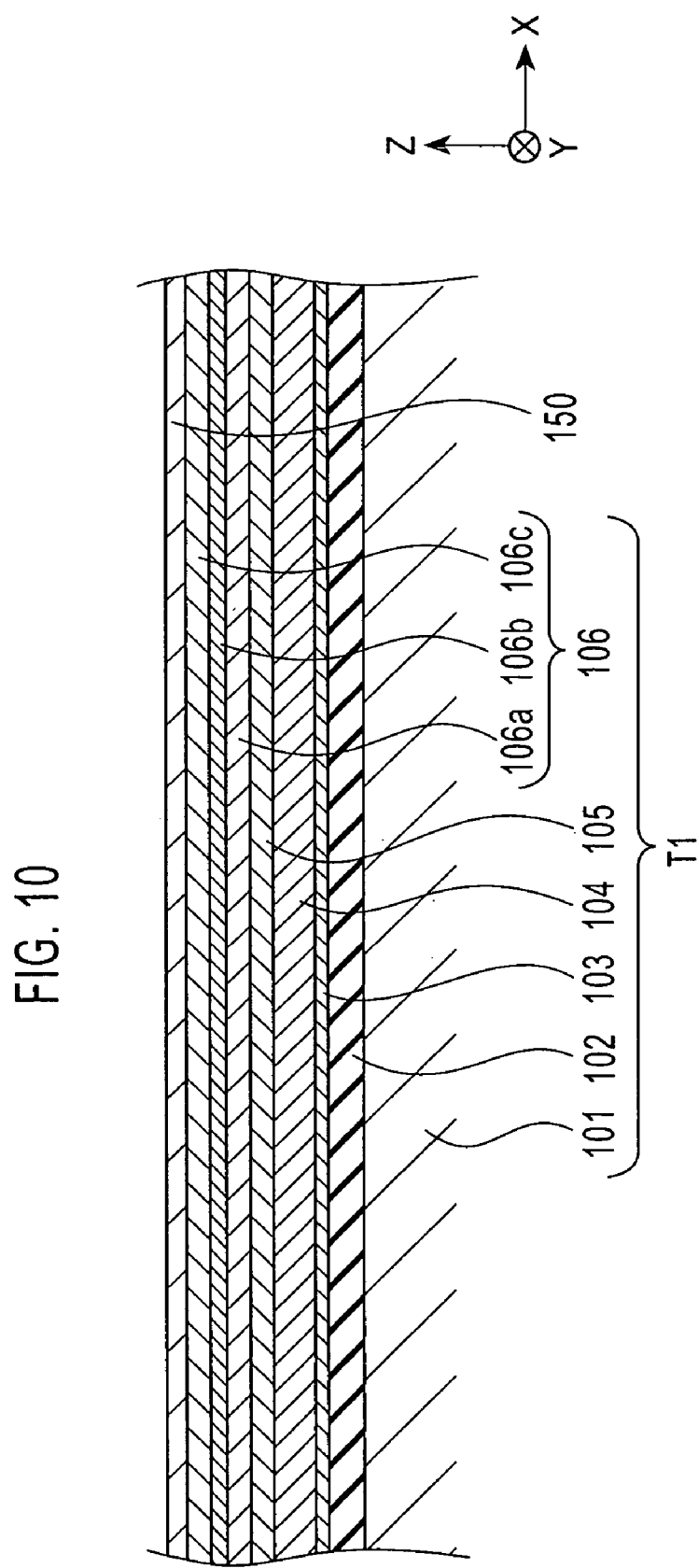
FIG. 10 is a view showing a step of manufacturing the magnetic sensor shown in FIG. 1.

In the step shown in FIG. 10, on an entire substrate not shown in the figure, the lower shield layer 101, the lower gap layer 102, the seed layer 103, the free magnetic layer 104, the first non-magnetic material layer 105, and the first fixed magnetic layer 106 are formed in that order from the bottom to form the multilayer film T1, and on this multilayer film T1, the first protective layer 150 made of Ru or the like is formed. The first fixed magnetic layer 106 forming the fixed magnetic layer 121 (see FIG. 1) is formed to have a synthetic ferrimagnetic pinned structure as described above which is composed of the second magnetic material sublayer 106a, the first non-magnetic intermediate sublayer 106b, and the first magnetic material sublayer 106c in that order from the bottom. In addition, it is preferable that the layers from the lower shield layer 101 to the first protective layer 150 be continuously formed.

Figure 11:
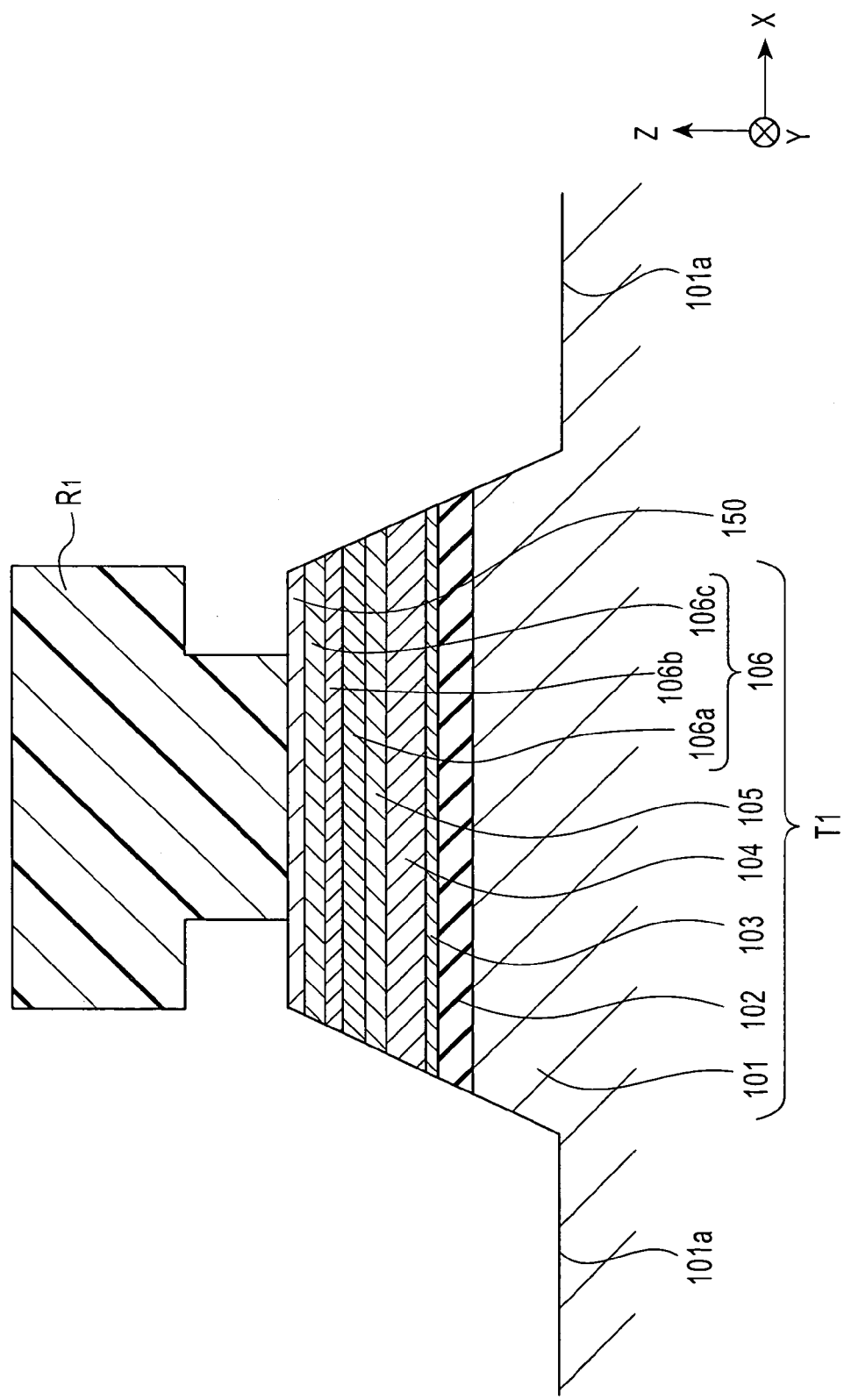
FIG. 11 is a view showing a step following the step shown in FIG. 10.

Next, as shown in FIG. 11, after a resist layer R1 for lift off is formed on the first protective layer 150, the multilayer film T1 and the first protective layer 150 are milled into the state as shown in FIG. 11. In addition, the recess portions 101a are formed in the lower shield layer 101 at the two sides of the multilayer film T1.

Figure 12:
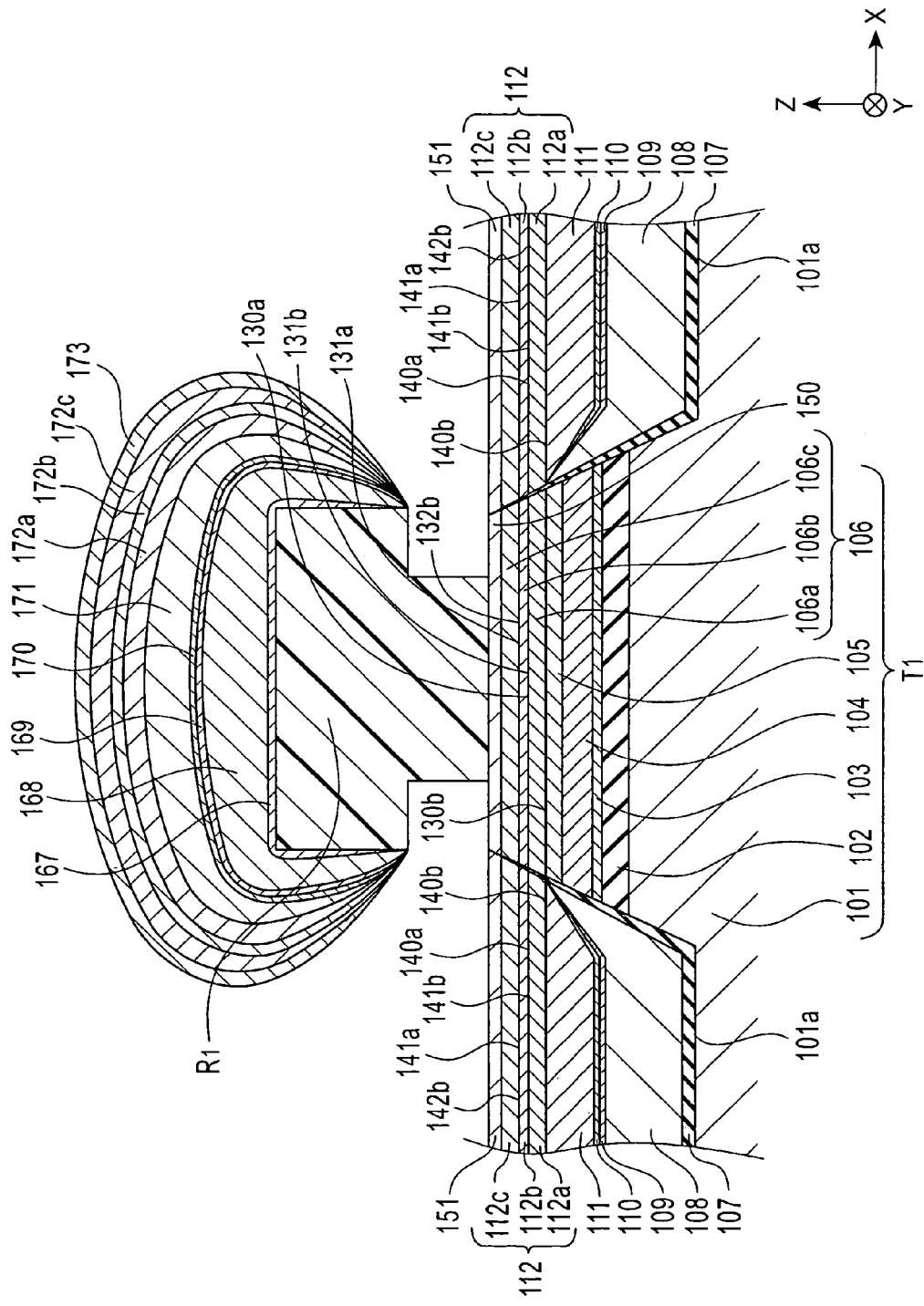
FIG. 12 is a view showing a step following the step shown in FIG. 11.

Next, in the step shown in FIG. 12, while the resist layer R1 is allowed to remain on the first protective layer 150, in the recess portions 101a, the insulating layers 107, the hard magnetic layers 108, the second non-magnetic material layers 109, the seed layers 110, the first antiferromagnetic layers 111, the second fixed magnetic layers 112, and the second protective layers 151 made of Ru or the like are continuously formed by sputtering. The second fixed magnetic layers 112 are the extension portions 121a of the fixed magnetic layer 121 (see FIG. 1) and each have a synthetic ferrimagnetic pinned structure composed of the fourth magnetic material sublayer 112a, the second non-magnetic intermediate sublayer 112b, and the third magnetic material sublayer 112c provided in that order from the bottom.

In this step, the upper surfaces 140a of the fourth magnetic material sublayers 112a and the upper surface 130a of the second magnetic material sublayer 106a forming the first fixed magnetic layer 106 are preferably located at the same height, and the lower surfaces 140b of the fourth magnetic material sublayers 112a and the lower surface 130b of the second magnetic material sublayer 106a are also preferably located at the same height. In addition, the upper surfaces 141a of the second non-magnetic intermediate sublayers 112b and the upper surface 131a of the first non-magnetic intermediate sublayer 106b forming the first fixed magnetic layer 106 are preferably located at the same height, and the lower surfaces 141b of the second non-magnetic intermediate sublayers 112b and the lower surface 131b of the first non-magnetic intermediate sublayer 106b are also preferably located at the same height. Furthermore, the lower surfaces 142b of the third magnetic material sublayers 112c and the lower surface 132b of the first magnetic material sublayer 106c forming the first fixed magnetic layer 106 are preferably located at the same height.

As sputtering, at least one known method, such as ion beam sputtering, long throw sputtering, or collimation sputtering may be used. In this step, as shown in FIG. 12, also on the resist layer R1, there are provided a layer 167 made of the same material as that for the insulating layers 107, a layer 168 made of the same material as that for the hard magnetic layers 108, a layer 169 made of the same material as that for the second non-magnetic material layers 109, a layer 170 made of the same material as that for the seed layers 110, a layer 171 made of the same material as that for the first antiferromagnetic layers 111, a layer 172a made of the same material as that for the fourth magnetic material sublayer 112a, a layer 172b made of the same material as that for the second non-magnetic intermediate sublayer 112b, a layer 172c made of the same material as that for the third magnetic material sublayer 112c, and a layer 173 made of the same material as that for the second protective layer 151.

In the step shown in FIG. 12, the first antiferromagnetic layers 111 and the hard magnetic layers 108 can be formed in the same manufacturing step. Hence, in addition to facilitation of the manufacturing, the space W2 between the first antiferromagnetic layers 111 can be accurately formed so as to coincide with the length of the optical track width O-Tw defined by the distance between the hard magnetic layers 108.

Figure 13:
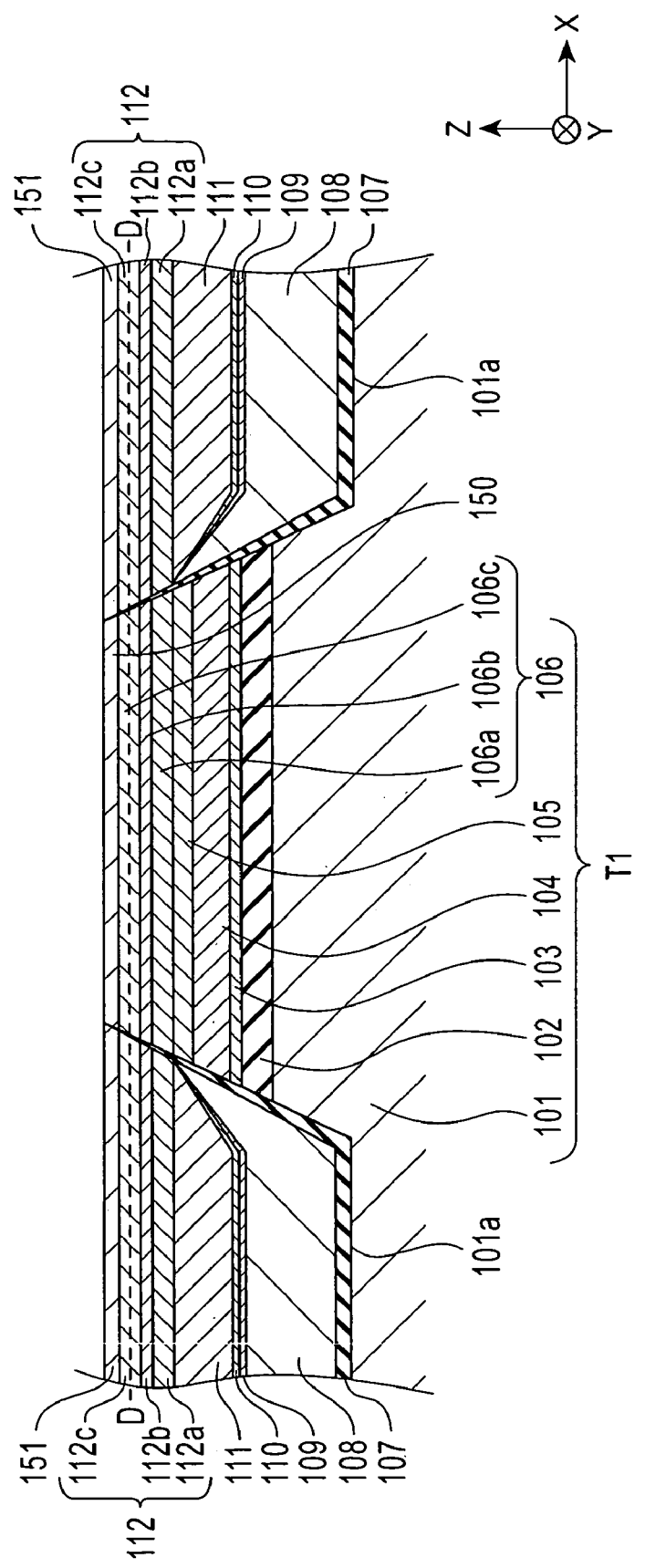
FIG. 13 is a view showing a step following the step shown in FIG. 12.
Figure 14:
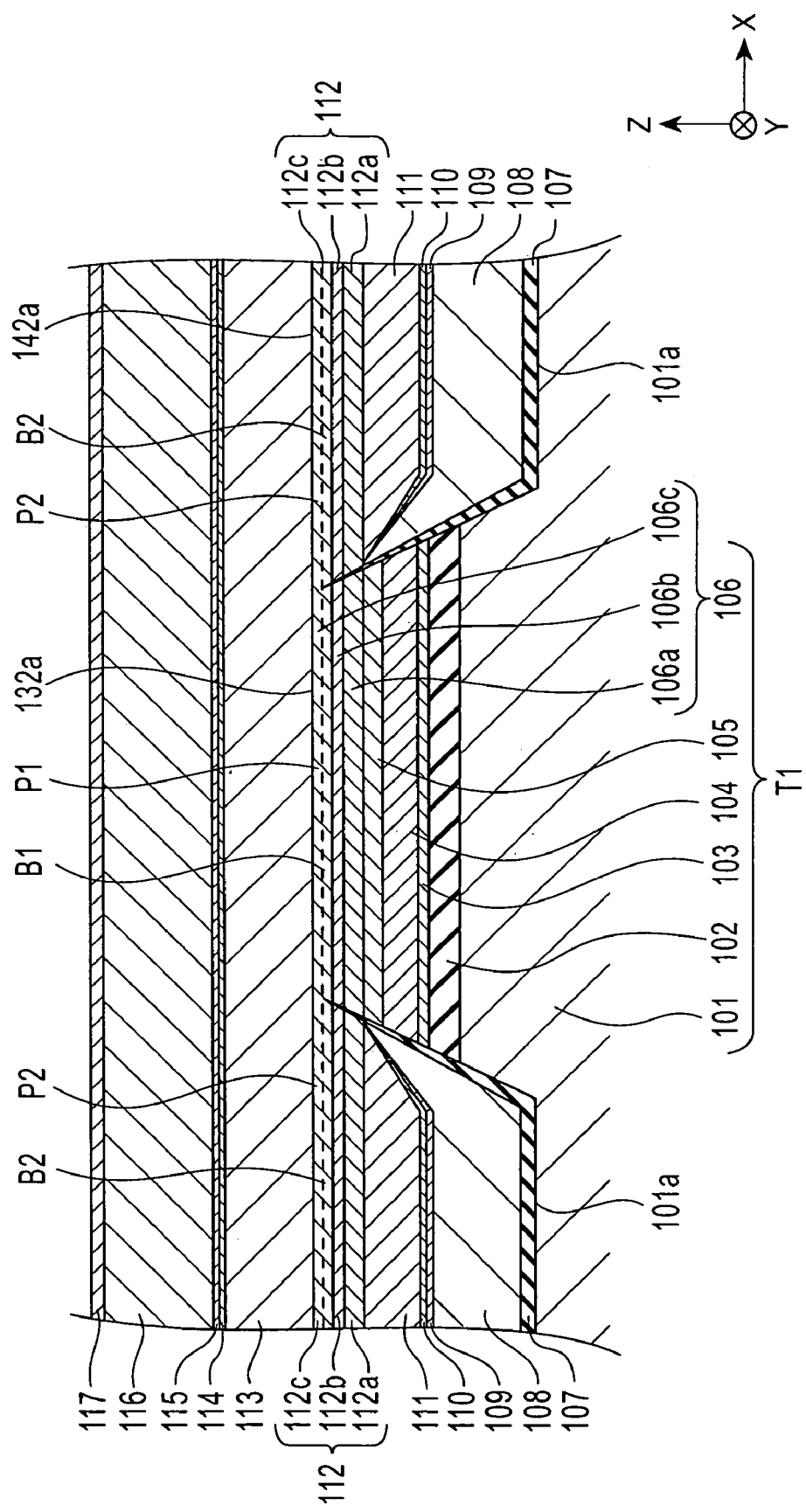
FIG. 14 is a view showing a step following the step shown in FIG. 13.

Next, as shown in FIG. 13, the resist layer R1 is removed. Subsequently, by a known method such as ion beam etching or plasma etching, the first protective layer 150 and the second protective layers 151 are removed under an evacuated state by milling, and in addition, after the first magnetic material sublayer 106c and the third magnetic material sublayers 112c are milled to a level indicated by a D-D line shown in the figure, an additional layer using the same material as that for the first magnetic material sublayer 106c and additional layers using the same material as that for the third magnetic layers 112c are formed respectively on the remaining first magnetic material sublayer 106c and the remaining third magnetic material sublayers 112c thus milled as shown in FIG. 14, thereby increasing the thickness of the first magnetic material sublayer 106c and the thicknesses of the third magnetic material sublayers 112c. The steps of the removal of the first protective layer 150 and the second protective layers 151, the milling of the first magnetic material sublayer 106c and the third magnetic material sublayers 112c, and the formation of the additional layers on the remaining first magnetic material sublayer 106c and the remaining third magnetic material sublayers 112c are continuously performed in an evacuated state.

In the steps described above, the upper surfaces 142a of the additional layers formed on the remaining third magnetic material sublayers 112c and the upper surface 132a of additional layer formed on the remaining first magnetic material sublayer 106c are preferably formed at the same height, and the lower surfaces 142b of the remaining third magnetic material sublayers 112c and the lower surface 132b of the remaining first magnetic material sublayer 106c are also preferably formed at the same height.

In FIG. 14, a part (that is, a part remaining after the milling) of the first magnetic material sublayer 106c formed in the step shown in FIG. 11 is indicated by a part B1 (a part at a lower side of a dotted line shown in the figure), and a part of the first magnetic material sublayer 106c which is additionally formed is indicated by a part P1 (a part at an upper side of the dotted line shown in the figure). In addition, a part (that is, a part remaining after the milling) of the third magnetic material sublayer 112c formed in the step shown in FIG. 12 is indicated by a part B2 (a part at the lower side of the dotted line shown in the figure) and a part of the third magnetic material sublayer 112c which is additionally formed is indicated by a part P2 (a part at the upper side of the dotted line shown in the figure).

Figure 15:
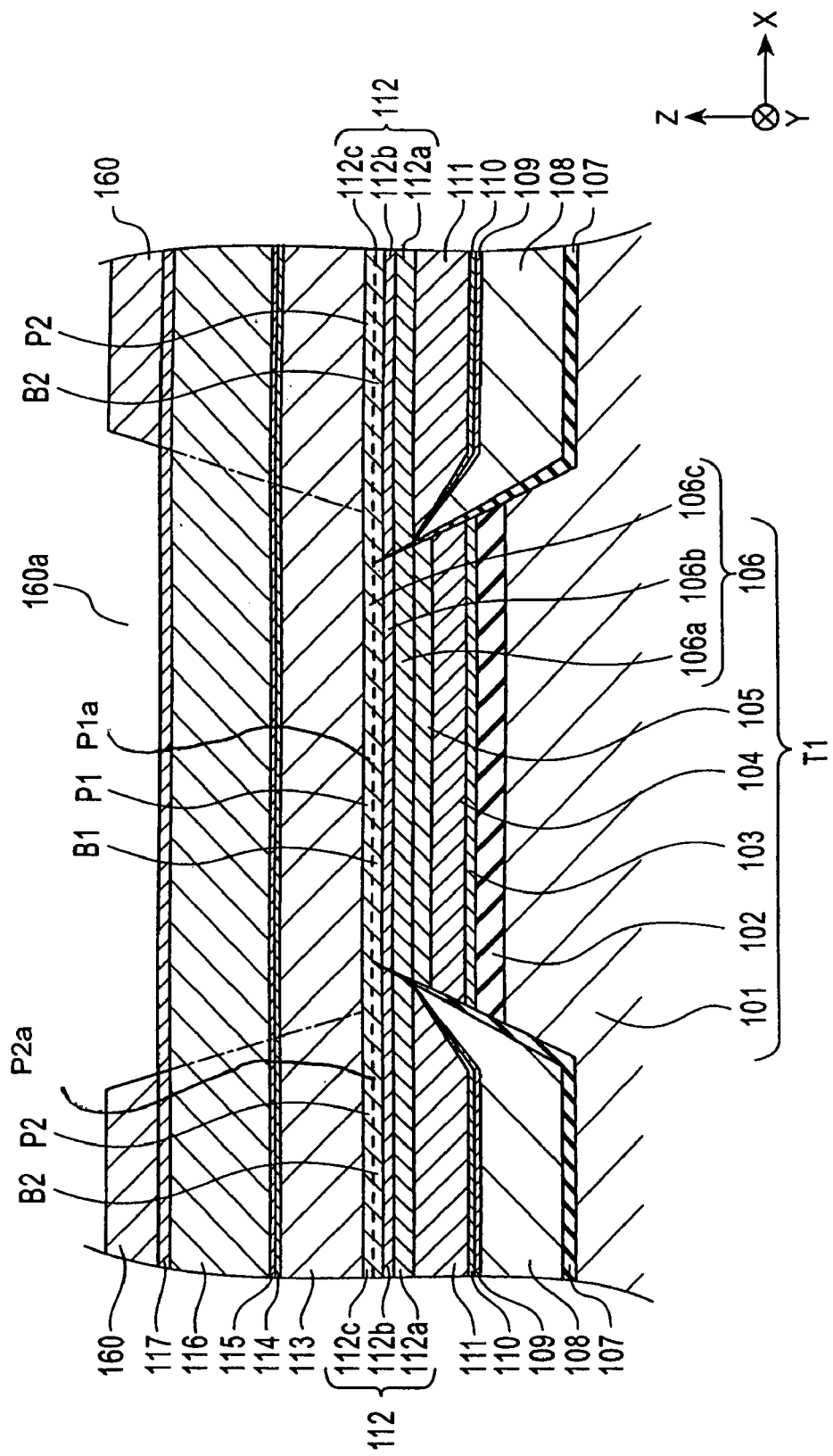
FIG. 15 is a view showing a step following the step shown in FIG. 14.

Subsequently, as shown in FIG. 15, on an upper surface P1a of the part P1 and upper surfaces P2a of the parts P2, a solid second antiferromagnetic film 113, a solid stopper film 114, a solid protective film 115, a solid electrode film 116, and a solid protective film 117 are continuously formed.

The first protective layer 150 and the second protective layers 151 have a function of protecting the first magnetic material sublayer 106c formed in the step shown in FIG. 10 from being exposed to the air from the step shown in FIG. 10 and to that shown in FIG. 13. In addition, in the step shown in FIG. 13, the reason the first magnetic material sublayer 106c and the third magnetic material sublayers 112c are milled is that by milling the layers described above, the surfaces of the part B1 and the parts B2 are activated so that the part P1 and the parts P2 are integrally formed thereon in the step shown in FIG. 13. In addition, since the steps of the removal of the first protective layer 150 and the second protective layers 151, the milling of the first magnetic material sublayer 106c and the third magnetic material sublayers 112c, and the formation of the additional layers described above are continuously performed in an evacuated state, the part B1 and the part P1 can be integrally formed as the first magnetic material sublayer 106c, and the parts B2 and the parts P2 can be integrally formed as the third magnetic material sublayers 112c.

In FIG. 14, for ease of illustration in the figure, the boundary between the part B1 and the part P1 is indicated by the dotted line; however, since being integrally formed in practice, the part B1 and the part P1 collectively form the first magnetic material sublayer 106c. As is the case described above, the boundary between the part B2 and the part P2 is shown by the dotted line; however, since being integrally formed in practice, the parts B2 and the parts P2 collectively form the third magnetic material sublayers 112c.

Through the steps described above, the synthetic ferrimagnetic pinned first fixed magnetic layer 106 is formed which is composed of the second magnetic material sublayer 106a, the first non-magnetic intermediate sublayer 106b, and the first magnetic material sublayer 106c. In addition, the synthetic ferrimagnetic pinned second fixed magnetic layers 112 are formed each of which is composed of the fourth magnetic material sublayer 112a, the second non-magnetic intermediate sublayer 112b, and the third magnetic material sublayer 112c.

Subsequently, by performing annealing in a magnetic field, exchange coupling magnetic fields are generated among the first antiferromagnetic layers 111, the solid second antiferromagnetic film 113, and the second fixed magnetic layers 112, so that the magnetizations of the fourth magnetic material sublayers 112a are fixed in the Y direction in the figure.

Next, as shown in FIG. 15, on the solid protective film 117, a pair of mask layers 160 is formed with a predetermined space therebetween in the X direction in the figure, and the solid protective film 117, the solid electrode film 116, and the solid protective film 115 exposed through a space 160a between the mask layers 160 are removed by reactive ion etching (RIE) to form the protective layers 117, the electrode layers 116, and the protective layers 115. As an etching gas, $CF_4$, $C_3F_8$, a mixed gas of Ar and $CF_4$, or a mixed gas of Ar and $C_3F_8$ may be used. Accordingly, the electrode layers 116 are allowed to remain only at two side portions of the magnetic sensor 100 in the track width direction, that is, the electrode layers 116 are formed with a predetermined space therebetween in the optical track width direction. The RIE step is stopped when the solid stopper film 114 is exposed.

Figure 16:
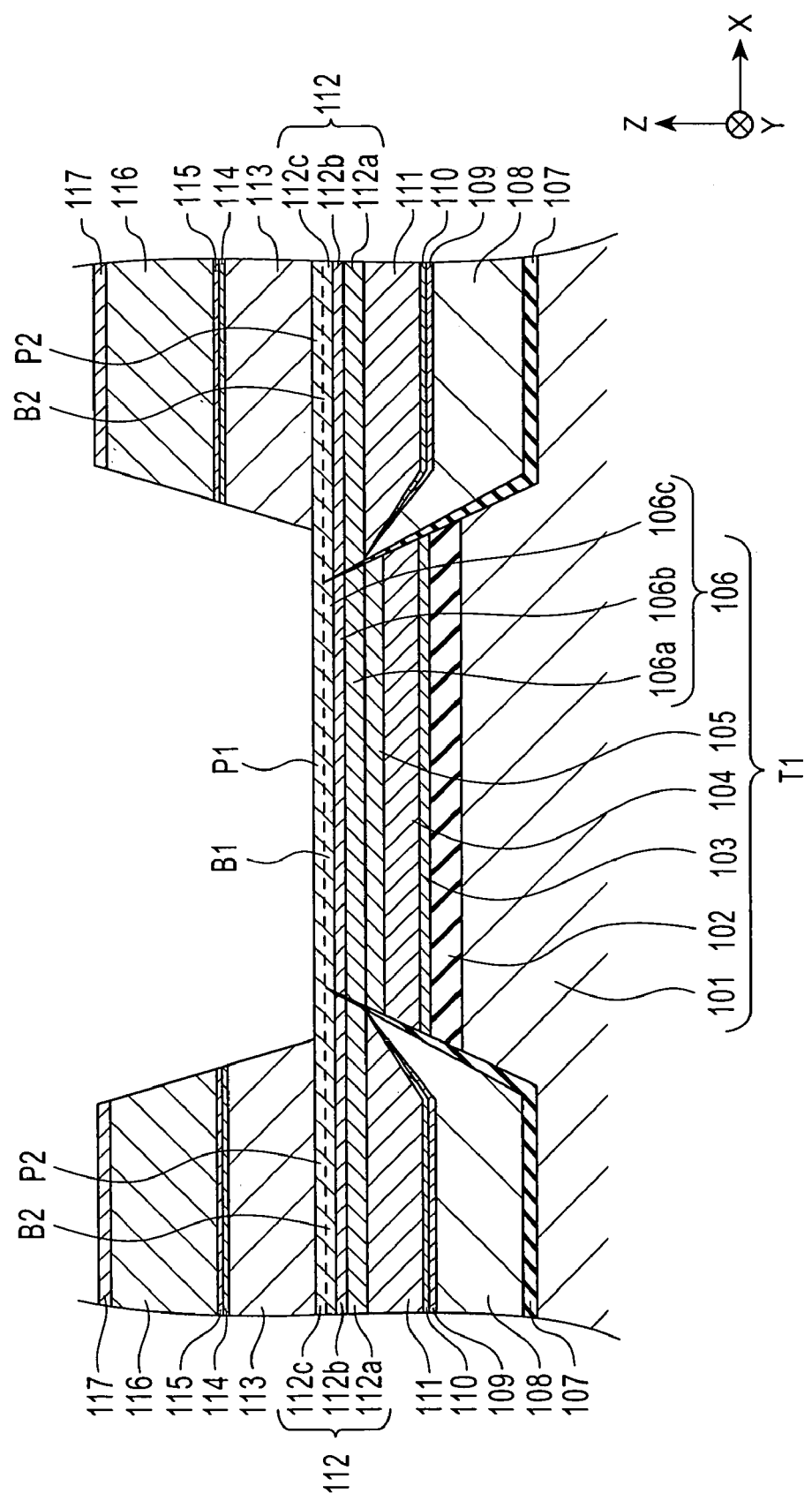
FIG. 16 is a view showing a step following the step shown in FIG. 15.

Subsequently, the solid stopper film 114 thus exposed and the solid second antiferromagnetic film 113 are partly removed by ion milling to form the stopper layers 114 and the second antiferromagnetic layers 113, so that the state shown in FIG. 16 is obtained. The amount of ion milling can be controlled using a SIMS detector. When the third magnetic material sublayer 112c is exposed, the ion milling is immediately stopped. In this ion milling step, the mask layers 160 are also milled away.

As described above, the magnetic sensor 100 can be manufactured.

Hereinafter, a method for manufacturing the magnetic sensor 200 shown in FIG. 3 will be described. Individual steps of the manufacturing method are shown in FIGS. 17 to 21 by partial cross-sectional views of a semi-finished magnetic sensor when viewed from the facing surface facing a recording medium. In FIGS. 17 to 21, the layers provided with the same reference numerals as those in FIG. 3 are each formed of the same material having the same thickness as that described above.

Figure 17:
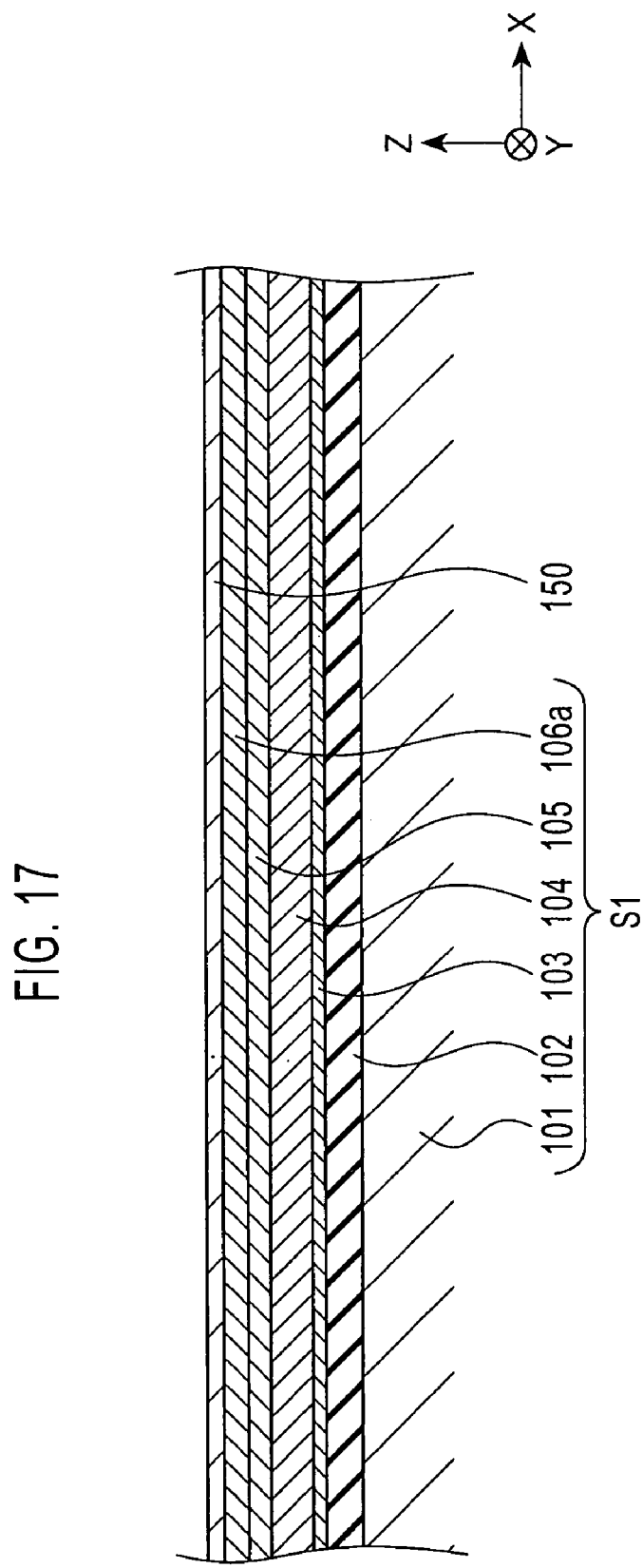
FIG. 17 is a view showing a step of manufacturing the magnetic sensor shown in FIG. 3.

The method for manufacturing the magnetic sensor 200 shown in FIG. 3 is similar to that of the magnetic sponsor 100 shown in FIGS. 10 to 16. Instead of the step shown in FIG. 10 of the manufacturing method of the magnetic sensor 100, as shown in FIG. 17, a laminate body S1 is formed on an entire substrate not shown in the figure, the laminate body S1 being composed of the lower shield layer 101, the lower gap layer 102, the seed layer 103, the free magnetic layer 104, the first non-magnetic material layer 105, and the second magnetic material sublayer 106a forming the first fixed magnetic layer 106 are provided in that order from the bottom, and on this second magnetic material sublayer 106a, the first protective layer 150 made of Ru or the like is formed. The layers from the shield layer 101 to the first protective layer 150 are continuously formed.

Figure 18:
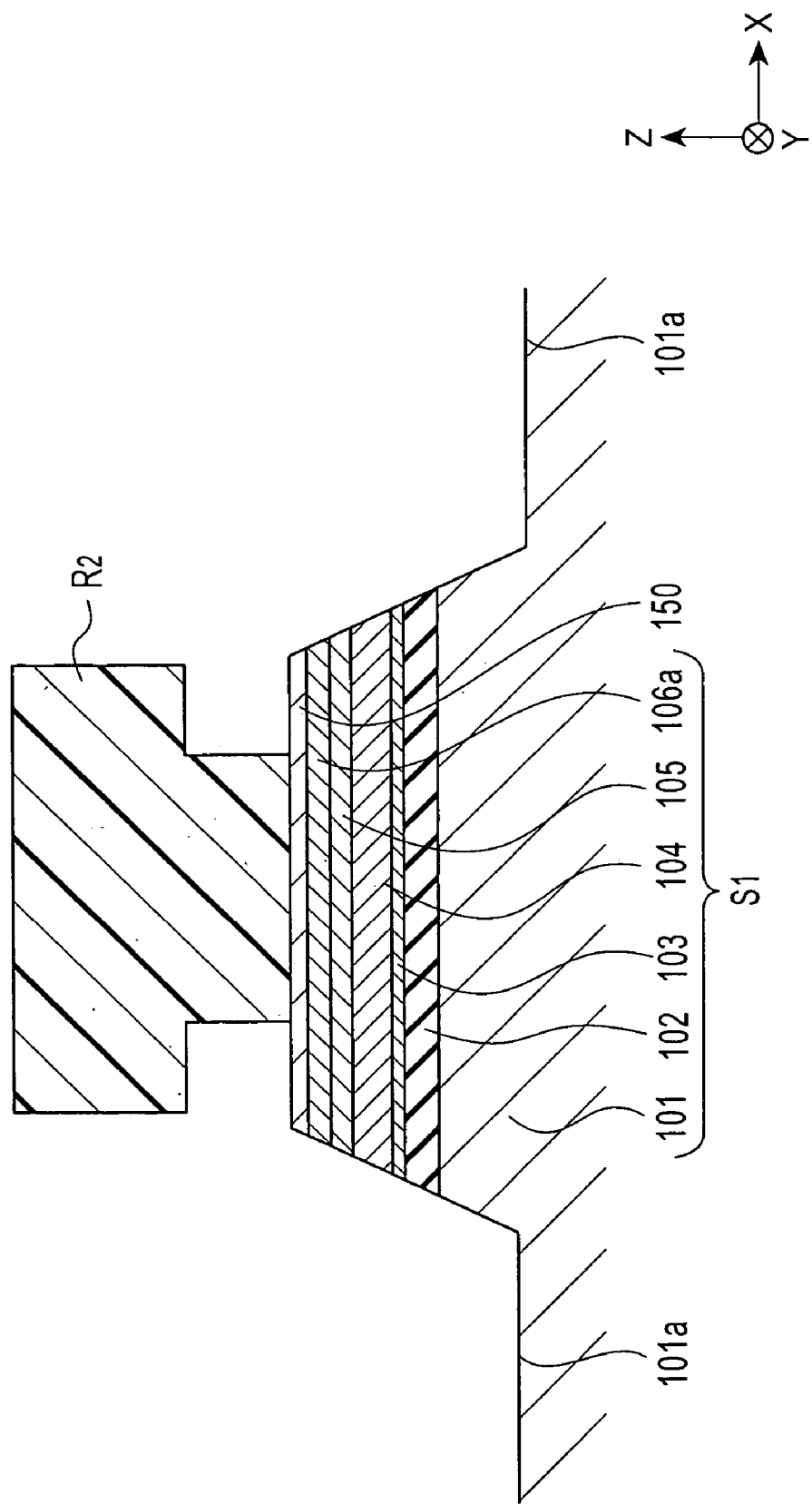
FIG. 18 is a view showing a step following the step shown in FIG. 17.

Next, as shown in FIG. 18, after a resist layer R2 for lift off is formed on the first protective layer 150, the laminate body S1 and the first protective layer 150 are milled into the shape as shown in FIG. 18 by a known method. Simultaneously, the recess portions 101a are formed in the lower shield layer 101 at two sides of the laminate body S1.

Figure 19:
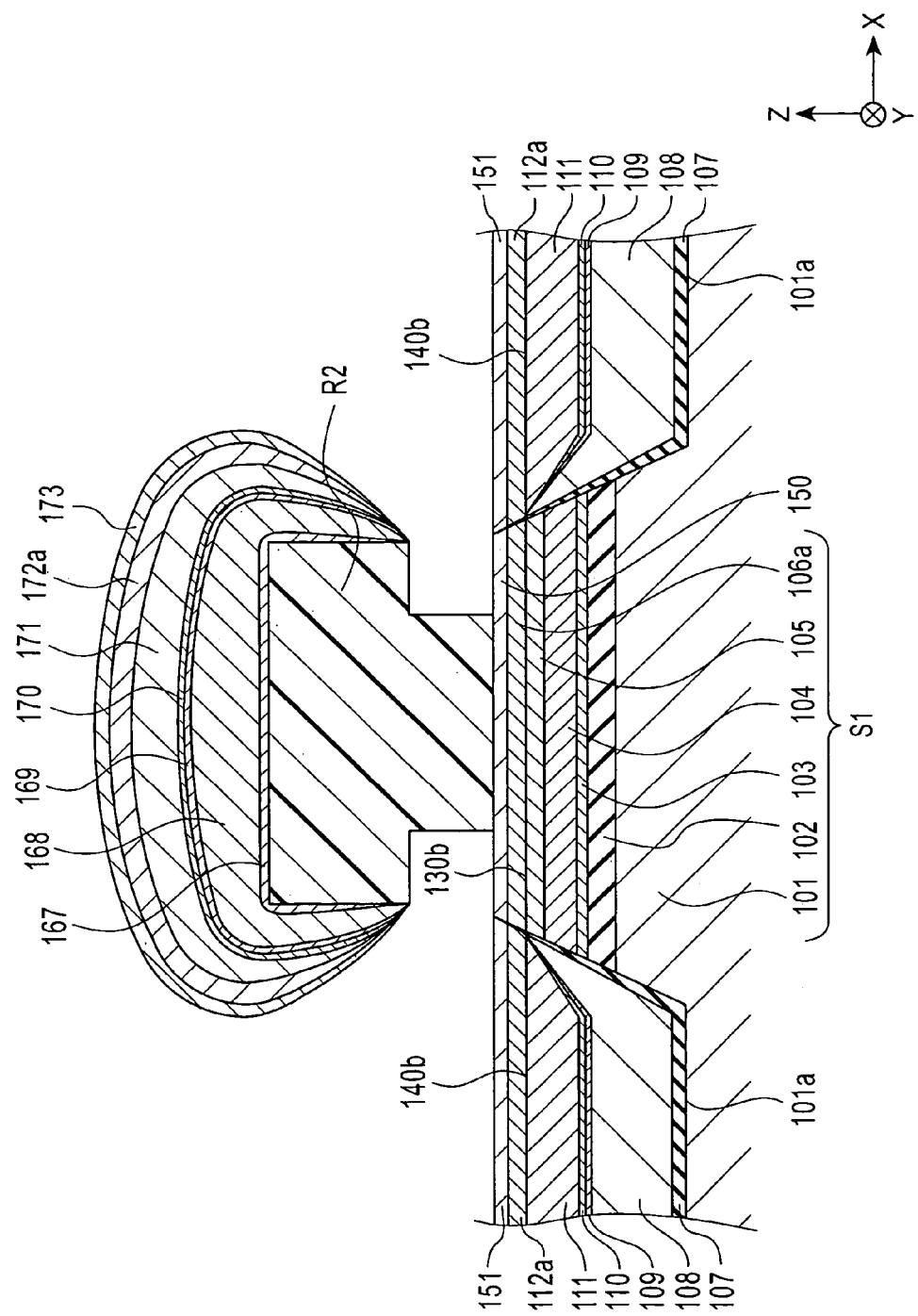
FIG. 19 is a view showing a step following the step shown in FIG. 18.

Next, in the step shown in FIG. 19, while the resist layer R2 is allowed to remain on the first protective layer 150, in the recess portions 101a, the insulating layers 107, the hard magnetic layers 108, the second non-magnetic material layers 109, the seed layers 110, the first antiferromagnetic layers 111, the fourth magnetic material sublayers 112a forming the second fixed magnetic layers 112, and the second protective layers 151 made of Ru or the like are continuously formed by sputtering.

In this step, the lower surfaces 140b of the fourth magnetic material sublayers 112a and the lower surface 130b of the second magnetic material sublayer 106a are preferably formed at the same height.

As sputtering, at least one known method, such as ion beam sputtering, long throw sputtering, or collimation sputtering may be used. In this step, as shown in FIG. 19, also on the resist layer R2, there are provided the layer 167 made of the same material as that for the insulating layers 107, the layer 168 made of the same material as that for the hard magnetic layers 108, the layer 169 made of the same material as that for the second non-magnetic material layers 109, the layer 170 made of the same material as that for the seed layers 110, the layer 171 made of the same material as that for the first antiferromagnetic layers 111, the layer 172a made of the same material as that for the fourth magnetic material sublayer 112a, and the layer 173 made of the same material as that for the second protective layer 151.

In the step shown in FIG. 19, the first antiferromagnetic layers 111 can be formed in the same manufacturing step as that for the hard magnetic layers 108. Hence, in addition to facilitation of the manufacturing, the space W2 between the first antiferromagnetic layers 111 can be accurately formed so as to coincide with the length of the optical track width O-Tw defined by the distance between the hard magnetic layers 108.

Figure 20:
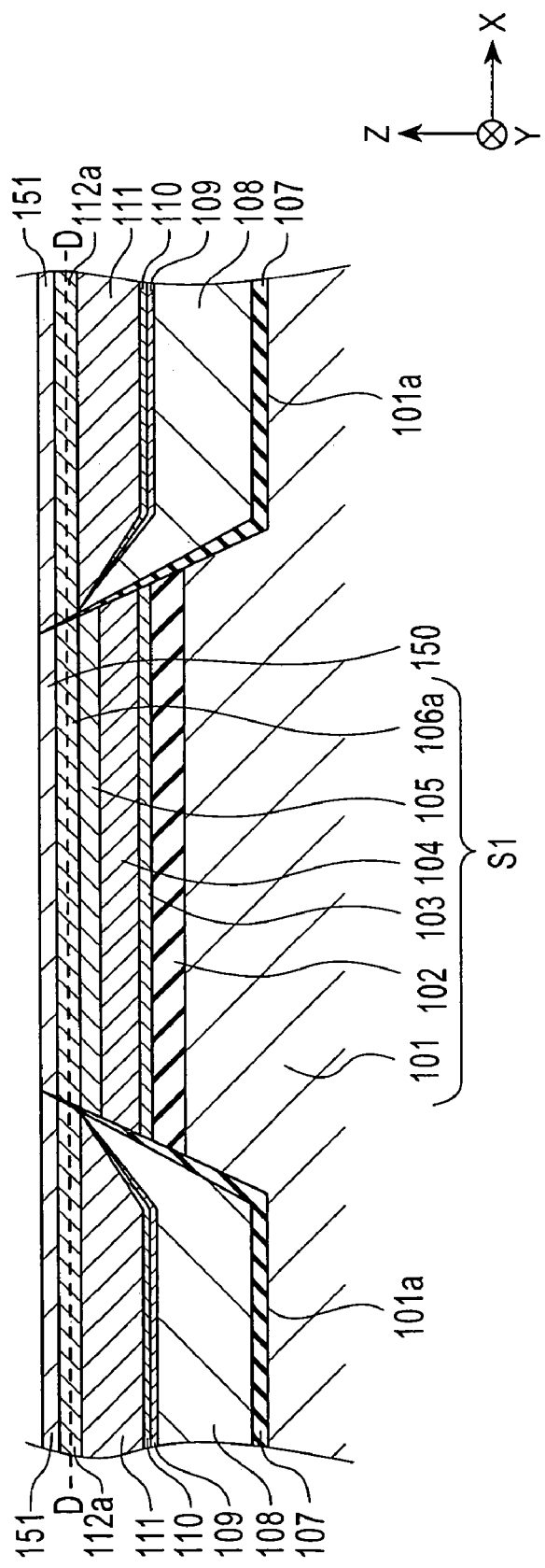
FIG. 20 is a view showing a step following the step shown in FIG. 19.
Figure 21:
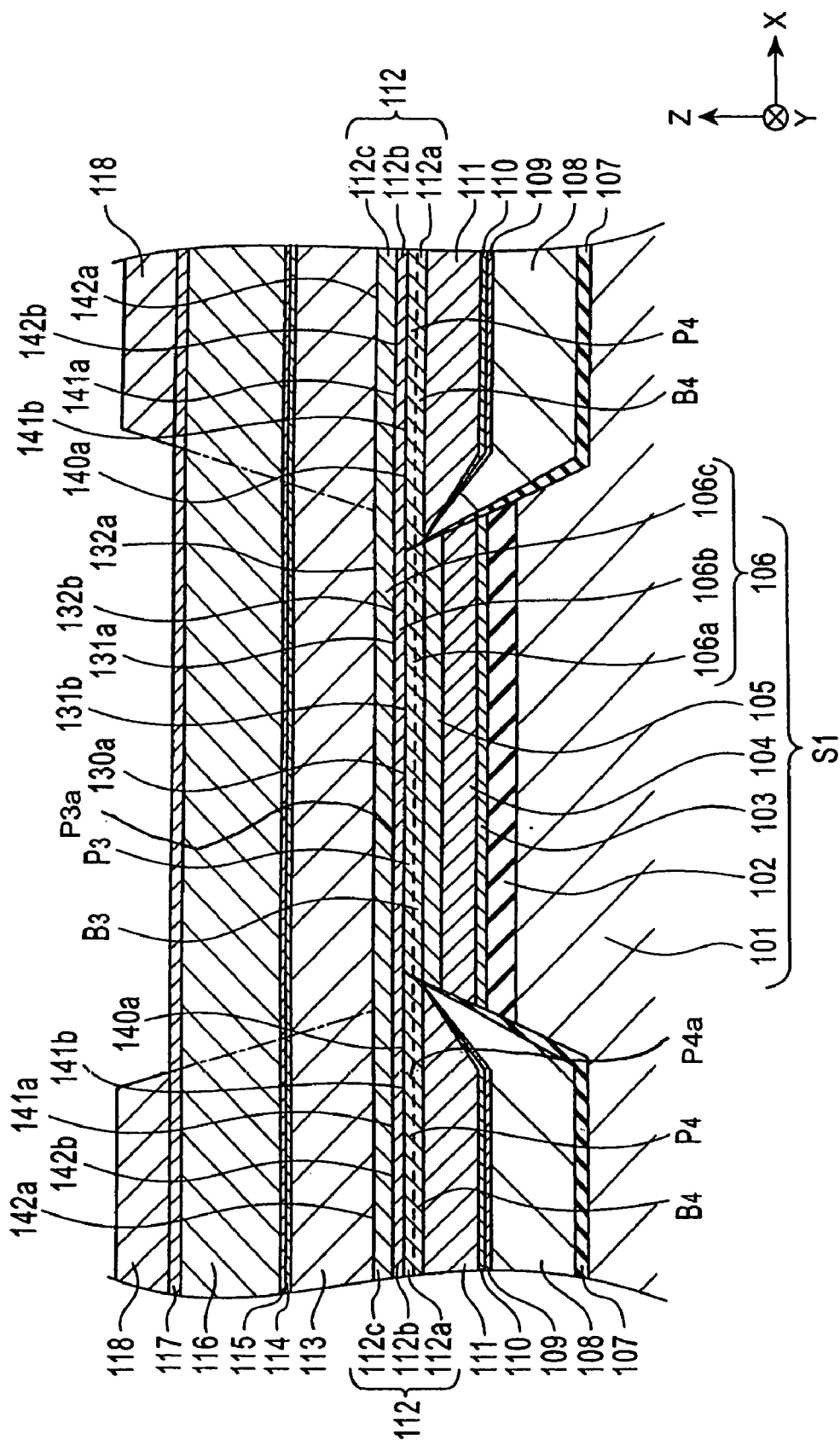
FIG. 21 is a view showing a step following the step shown in FIG. 20.

Next, as shown in FIG. 20, the resist layer R2 is removed. Subsequently, by a known method such as ion beam etching or plasma etching, the first protective layer 150 and the second protective layers 151 are removed under an evacuated state by milling, and in addition, after the second magnetic material sublayer 106a and the fourth magnetic material sublayers 112a are milled to a level indicated by a D-D line shown in the figure, an additional layer using the same material as that for the second magnetic material sublayer 106a and additional layers using the same material as that for the fourth magnetic material sublayers 112a are further formed as shown in FIG. 21 to increase the thicknesses of the layers described above. The steps of the removal of the first protective layer 150 and the second protective layers 151, the milling of the second magnetic material sublayer 106a and the fourth magnetic material sublayers 112a, and the formation of the additional layers on the remaining second magnetic material sublayer 106a and the remaining fourth magnetic material sublayers 112a are continuously performed in an evacuated state.

In FIG. 21, a part (that is, a part remaining after the milling) of the second magnetic material sublayer 106a formed in the step shown in FIG. 18 is indicated by a part B3 (a part at a lower side of a dotted line shown in the figure) and a part of the second magnetic material sublayer 106a which is additionally formed is indicated by a part P3 (a part at an upper side of the dotted line shown in the figure). In addition, a part (that is, a part remaining after the milling) of the fourth magnetic material sublayer 112a formed in the step shown in FIG. 19 is indicated by a part B4 (a part at the lower side of the dotted line shown in the figure) and a part of the fourth magnetic material sublayer 112a which is additionally formed is indicated by a part P4 (a part at the upper side of the dotted line shown in the figure).

Subsequently, as shown in FIG. 21, on an upper surface P3a of the part P3 and upper surfaces P4a of the parts P4, a solid film containing the first non-magnetic intermediate sublayer 106b and second non-magnetic intermediate sublayers 112b, a solid film containing the first magnetic material sublayer 106c and the third magnetic material sublayers 112c, the solid second antiferromagnetic film 113, the solid stopper film 114, the solid protective film 115, the solid electrode film 116, and the solid protective film 117 are continuously formed.

In the steps described above, the upper surfaces 140a of the fourth magnetic material sublayers 112a and the upper surface 130a of the second magnetic material sublayer 106a forming the first fixed magnetic layer 106 are preferably formed at the same height. In addition, the upper surfaces 141a of the second non-magnetic intermediate sublayers 112b and the upper surface 131a of the first non-magnetic intermediate sublayer 106b forming the first fixed magnetic layer 106 are preferably formed at the same height, and the lower surfaces 141b of the second non-magnetic intermediate sublayers 112b and the lower surface 131b of the first non-magnetic intermediate sublayer 106b are preferably formed at the same height. Furthermore, the upper surfaces 142a of the third magnetic material sublayers 112c and the upper surface 132a of the first magnetic material sublayer 106c forming the first fixed magnetic layer 106 are preferably formed at the same height, and the lower surfaces 142b of the third magnetic material sublayers 112c and the lower surface 132b of the first magnetic material sublayer 106c are preferably formed at the same height.

The first protective layer 150 and the second protective layers 151 have a function of protecting the first magnetic material sublayer 106c formed in the step shown in FIG. 17 from being exposed to the air from the step shown in FIG. 17 to that shown in FIG. 20. In the step shown in FIG. 20, the reason the second magnetic material sublayer 106a and the fourth magnetic material sublayers 112a are milled is that by milling the layers described above, the surfaces of the part B3 and the parts B4 are activated so that the part P3 and the parts P4 are integrally formed therewith in the step shown in FIG. 20. In addition, since the steps of the removal of the first protective layer 150 and the second protective layers 151, the milling of the second magnetic material sublayer 106a and the fourth magnetic material sublayers 112a, and the formation of the additional layers described above are continuously performed in an evacuated state, the part B3 and the part P3 can be integrally formed into the second magnetic material sublayer 106a, and the parts B4 and the parts P4 can be integrally formed into the fourth magnetic material sublayers 112a.

As described above, the synthetic ferrimagnetic pinned first fixed magnetic layer 106 is formed which is composed of the second magnetic material sublayer 106a, the first non-magnetic intermediate sublayer 106b, and the first magnetic material sublayer 106c. In addition, the synthetic ferrimagnetic pinned second fixed magnetic layers 112 are formed which are each composed of the fourth magnetic material sublayer 112a, the second non-magnetic intermediate sublayer 112b, and the third magnetic material sublayer 112c.

In FIG. 21, for ease of illustration in the figure, the boundary between the part B3 and the part P3 is indicated by the dotted line; however, since being integrated with each other, the part B3 and the part P3 collectively form the second magnetic material sublayer 106a. As is the case described above, the boundary formed between the part B4 and the part P4 is shown by the dotted line; however, since being integrated with each other, the parts B4 and the parts P4 collectively form the fourth magnetic material sublayers 112a.

Subsequently, by performing annealing in a magnetic field, exchange coupling magnetic fields are generated among the first antiferromagnetic layers 111, the solid second antiferromagnetic film 113, and the second fixed magnetic layers 112, so that the magnetizations of the fourth magnetic material sublayers 112a are fixed in the Y direction in the figure.

Next, as is the step of the process for manufacturing the magnetic sensor 100 shown in FIG. 15, after the solid protective film 117, the solid electrode film 116, and the solid protective film 115 are partly removed by reactive ion etching (RIE) to form the protective layers 117, the electrode layers 116, and the protective layers 115 while the solid stopper film 114 is allowed to remain, the solid stopper film 114 thus exposed and the solid second antiferromagnetic film 113 are partly removed by ion milling to form the stopper layers 114 and the second antiferromagnetic layers 113, thereby forming the magnetic sensor 200 shown in FIG. 3.

Next, a method for manufacturing the magnetic sensor 300 shown in FIG. 5 will be described. Individual steps of the manufacturing method are shown by partial cross-sectional views of a semi-finished magnetic sensor when viewed from the facing surface facing a recording medium. In FIGS. 22 to 26, the layers provided with the same reference numerals as those in FIG. 5 are each formed of the same material having the same thickness as that described above.

Figure 22:
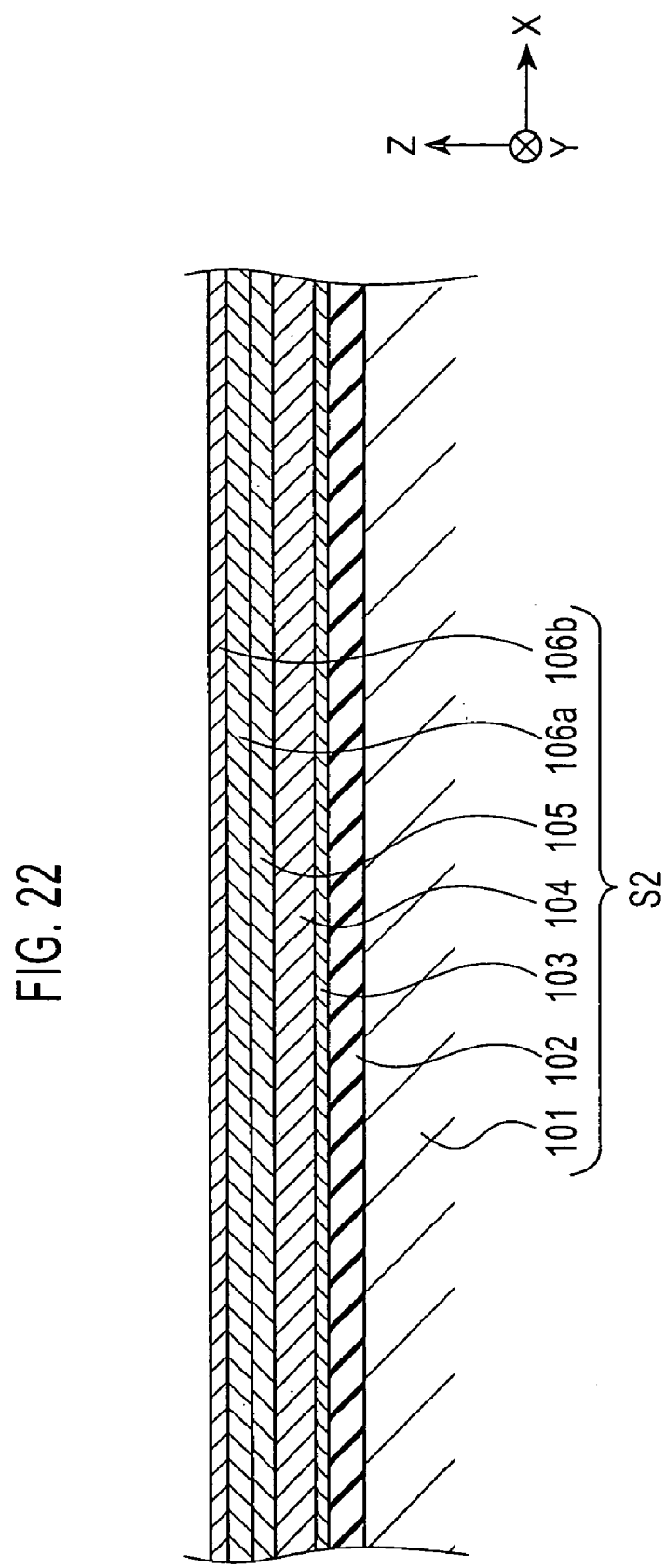
FIG. 22 is a view showing a step of manufacturing the magnetic sensor shown in FIG. 5.

The method for manufacturing the magnetic sensor 300 shown in FIG. 5 is similar to that of the magnetic sensor 100 shown in FIGS. 10 to 16. Instead of the step shown in FIG. 10 of the manufacturing method of the magnetic sensor 100, as shown in FIG. 22, a laminate body S2 is formed on an entire substrate not shown in the figure, the laminate body S2 being composed of the lower shield layer 101, the lower gap layer 102, the seed layer 103, the free magnetic layer 104, the first non-magnetic material layer 105, the second magnetic material sublayer 106a, and the first non-magnetic intermediate sublayer 106b, the last two layers forming the first fixed magnetic layer 106. The aforementioned layers for forming the laminate body S2 are continuously formed.

Figure 23:
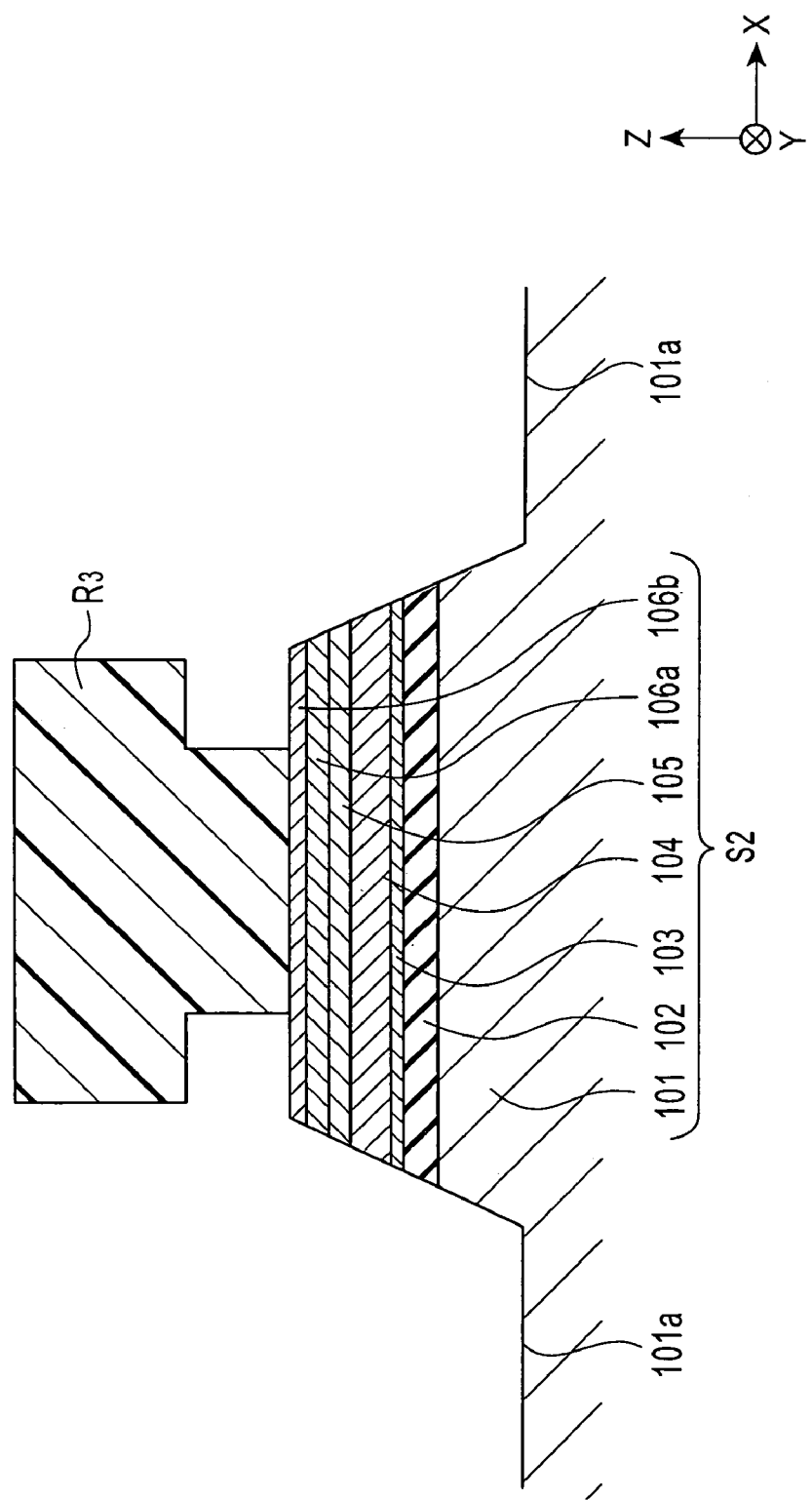
FIG. 23 is a view showing a step following the step shown in FIG. 22.

Next, as shown in FIG. 23, after a resist layer R3 for lift off is formed on the first non-magnetic intermediate sublayer 106b, the laminate body S2 is milled into the shape as shown in FIG. 23 by a known method such as ion milling, and simultaneously, the recess portions 101a are formed in the lower shield layer 101 at two sides of the laminate body S2.

Figure 24:
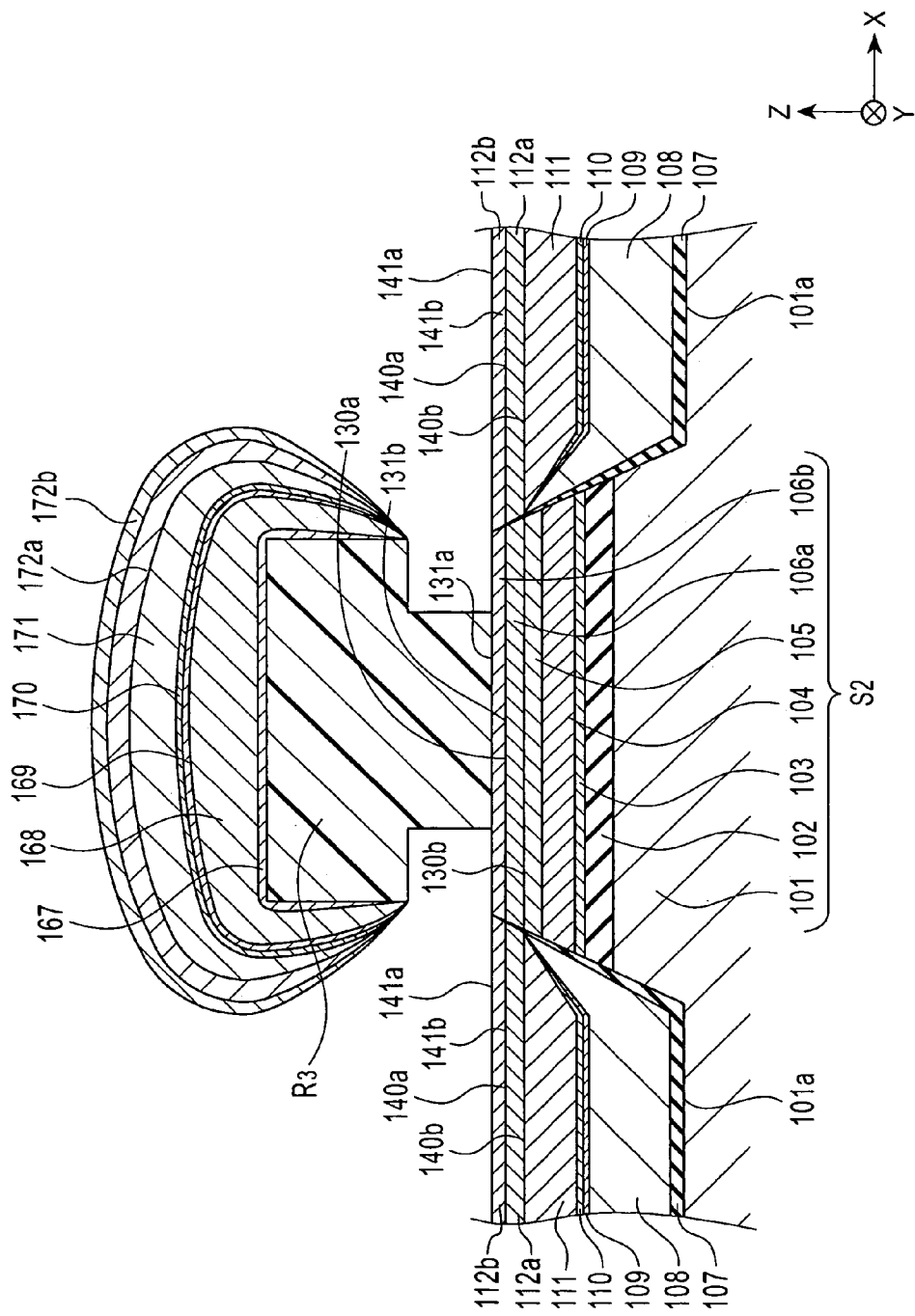
FIG. 24 is a view showing a step following the step shown in FIG. 23.

Next, in the step shown in FIG. 24, while the resist layer R2 is allowed to remain on the first non-magnetic intermediate sublayer 106b, in the recess portions 101a, the insulating layers 107, the hard magnetic layers 108, the second non-magnetic material layers 109, the seed layers 110, the first antiferromagnetic layers 111, the fourth magnetic material sublayers 112a, and the second non-magnetic intermediate sublayers 112b are continuously formed by sputtering, the last two types of layers 112a and 112b forming the second fixed magnetic layers 112.

In the steps described above, the upper surfaces 140a of the fourth magnetic material sublayers 112a and the upper surface 130a of the second magnetic material sublayer 106a are preferably formed at the same height, and the lower surfaces 140b of the fourth magnetic material sublayers 112a and the lower surface 130b of the second magnetic material sublayer 106a are also preferably formed at the same height. In addition, the upper surfaces 141a of the second non-magnetic intermediate sublayers 112b and the upper surface 131a of the first non-magnetic intermediate sublayer 106b are preferably formed at the same height, and the lower surfaces 141b of the second non-magnetic intermediate sublayers 112b and the lower surface 131b of the first non-magnetic intermediate sublayer 106b are also preferably formed at the same height.

As sputtering, at least one known method, such as ion beam sputtering, long throw sputtering, or collimation sputtering may be used. In this step, as shown in FIG. 24, also on the resist layer R3, there are provided the layer 167 made of the same material as that for the insulating layers 107, the layer 168 made of the same material as that for the hard magnetic layers 108, the layer 169 made of the same material as that for the second non-magnetic material layers 109, the layer 170 made of the same material as that for the seed layers 110, the layer 171 made of the same material as that for the first antiferromagnetic layers 111, the layer 172a made of the same material as that for the fourth magnetic material sublayer 112a, and the layer 172b made of the same material as that for the second non-magnetic intermediate sublayers 112b.

In the step shown in FIG. 24, the first antiferromagnetic layers 111 can be formed in the same manufacturing step as that for the hard magnetic layers 108. Hence, in addition to facilitation of the manufacturing, the space W2 between the first antiferromagnetic layers 111 can be accurately formed so as to coincide with the length of the optical track width O-Tw defined by the distance between the hard magnetic layers 108.

Figure 25:
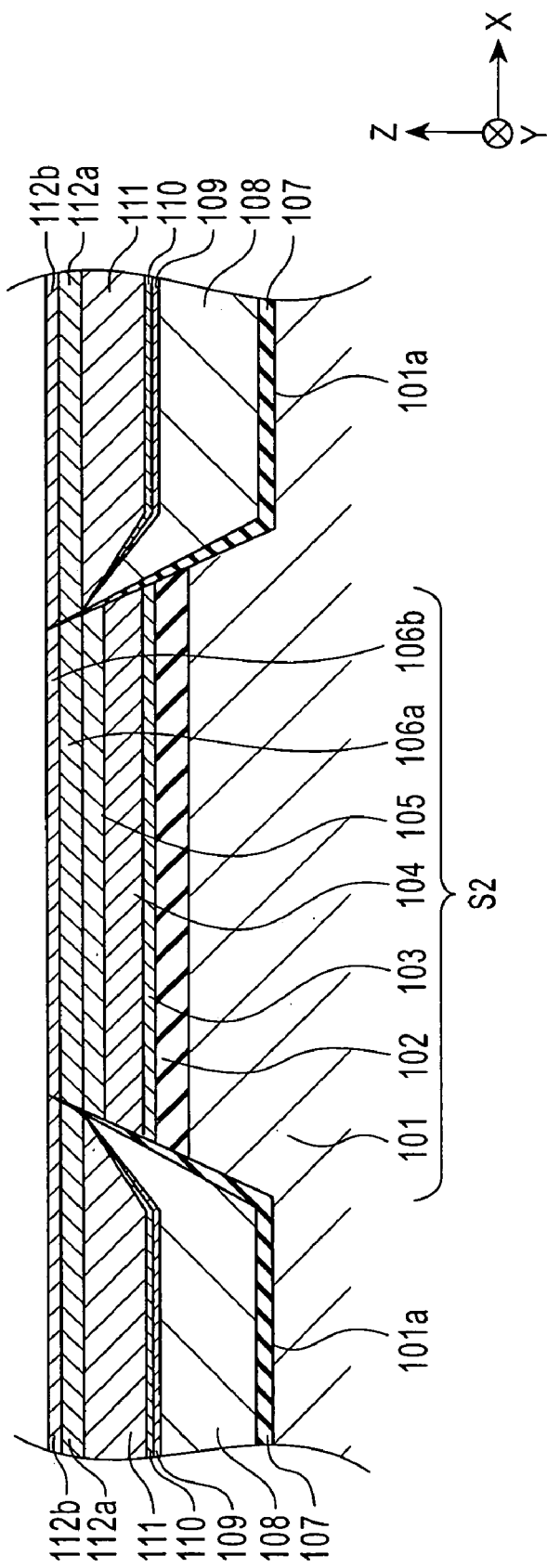
FIG. 25 is a view showing a step following the step shown in FIG. 24.

Next, as shown in FIG. 25, the resist layer R3 is removed. Subsequently, an oxide film formed on the surface of the first non-magnetic intermediate sublayer 106b due to the exposure to the air from the step shown in FIG. 22 to that shown in FIG. 25 and oxide films and organic materials formed on the surfaces of the second non-magnetic intermediate sublayers 112b due to the exposure to the air in the steps shown in FIGS. 24 and 25 are only removed by low-energy ion milling.

The "low-energy ion milling" is ion milling performed under the conditions in which ions in a plasma state are accelerated using an accelerating voltage in the range of from 0 to 75 V. In this case, plasma having an electron kinetic energy of 6 eV or less or plasma having an electron density of $108/cm^3$ or less is preferably used. In addition, as a gas for generating plasma, a gas is preferably used containing atoms which are inert to atoms of the surface of the first non-magnetic intermediate sublayer 106b and which are inert to atoms of the surfaces of the second non-magnetic intermediate sublayers 112b.

When ion milling other than the "low-energy ion milling" described above is performed, since the first non-magnetic intermediate sublayer 106b and the second non-magnetic intermediate sublayers 112b are also milled, additional layers must be formed using the same materials as those described above on the first non-magnetic intermediate sublayer 106b and the second non-magnetic intermediate sublayers 112b to increase the thicknesses thereof, thereby complicating the manufacturing process.

Figure 26:
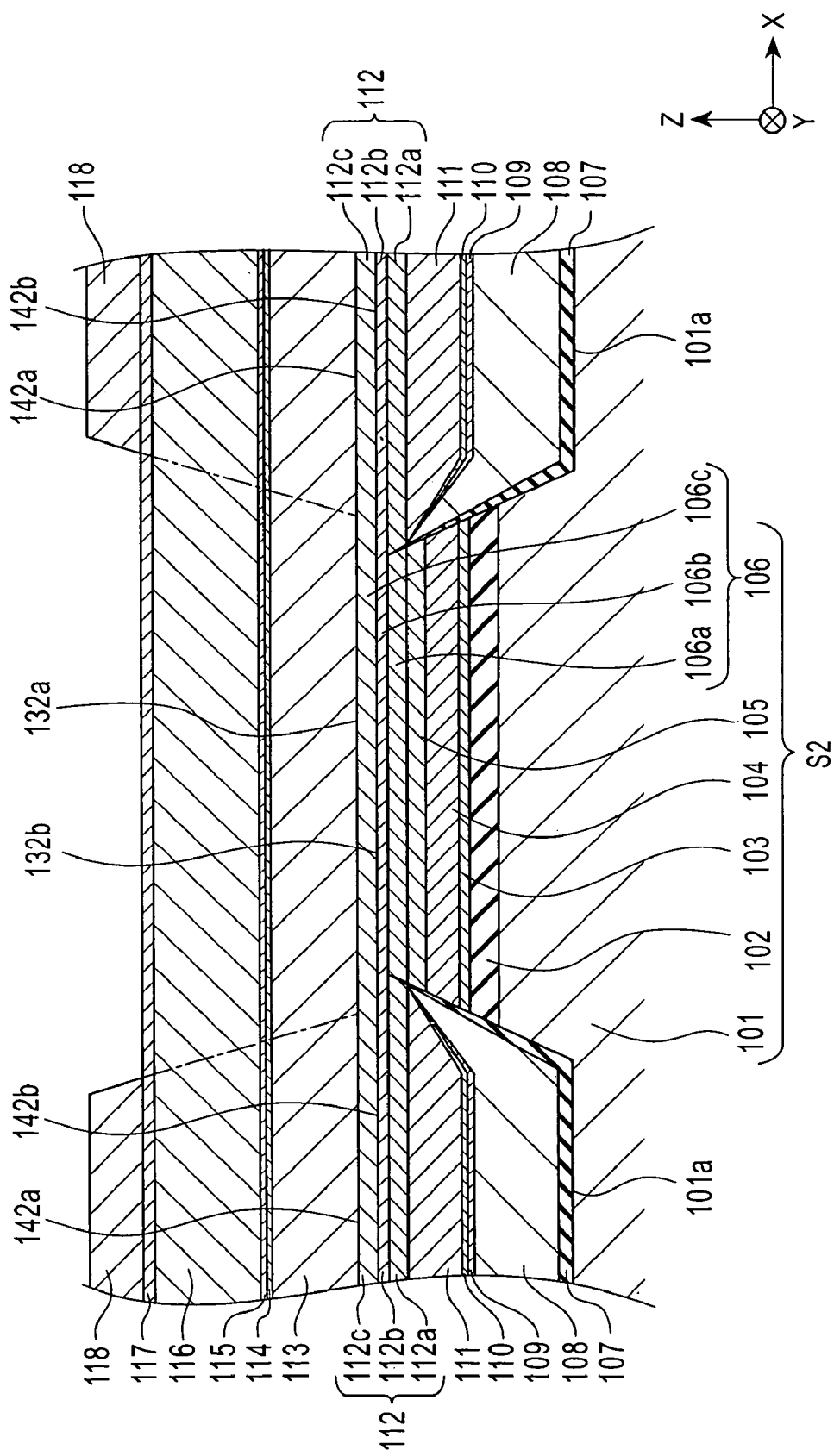
FIG. 26 is a view showing a step following the step shown in FIG. 25.

Next, as shown in FIG. 26, on the first non-magnetic intermediate sublayer 106b and the second non-magnetic intermediate sublayers 112b, the first magnetic material sublayer 106c and the third magnetic material sublayers 112c are formed, respectively. The steps from the treatment of low-energy ion milling for the first non-magnetic intermediate sublayer 106b and the second non-magnetic intermediate sublayers 112b to the formation of the first magnetic material sublayer 106c and the third magnetic material sublayers 112c are continuously performed in an evacuated state.

In this step, the upper surfaces 142a of the third magnetic material sublayers 112c and the upper surface 132a of the first magnetic material sublayer 106c forming the first fixed magnetic layer 106 are preferably formed at the same height, and the lower surfaces 142b of the third magnetic material sublayers 112c and the lower surface 132b of the first magnetic material sublayer 106c are also preferably formed at the same height.

Subsequently, on the upper surfaces of the first magnetic material sublayer 106c and the third magnetic material sublayers 112c, the solid second antiferromagnetic film 113, the solid stopper film 114, the solid protective film 115, the solid electrode film 116, and the solid protective film 117 are continuously formed.

In addition to the functions as the non-magnetic intermediate sublayers for the first fixed magnetic layer 106 and the second fixed magnetic layers 112, since being formed of Ru or the like, the first non-magnetic intermediate sublayer 106b and the second non-magnetic intermediate sublayers 112b serve as a protective layer for protecting the second magnetic material sublayer 106a and the fourth magnetic material sublayers 112a from being exposed to the air from the step shown in FIG. 22 to that shown in FIG. 25. Accordingly, since an additional protective layer for protecting the second magnetic material sublayer 106a and the fourth magnetic material sublayers 112a from being exposed to the air is not necessary, the manufacturing can be easily performed.

In addition, in the step shown in FIG. 25, by milling the oxide layers and the organic materials formed on the surfaces of the first non-magnetic intermediate sublayer 106b and the second non-magnetic intermediate sublayers 112b, the surfaces described above are activated, and hence the first magnetic material sublayer 106c and the third magnetic material sublayers 112c can be easily formed on the surfaces of the first non-magnetic intermediate sublayer 106b and the second non-magnetic intermediate sublayers 112b, respectively in the step shown in FIG. 26.

As described above, the first fixed magnetic layer 106 is formed to have a synthetic ferrimagnetic pinned structure composed of the second magnetic material sublayer 106a, the first non-magnetic intermediate sublayer 106b, and the first magnetic material sublayer 106c. In addition, the second fixed magnetic layers 112 are each formed to have a synthetic ferrimagnetic pinned structure composed of the fourth magnetic material sublayer 112a, the second non-magnetic intermediate sublayer 112b, and the third magnetic material sublayer 112c.

Subsequently, by performing annealing in a magnetic field, exchange coupling magnetic fields are generated among the first antiferromagnetic layers 111, the solid second antiferromagnetic film 113, and the second fixed magnetic layers 112, so that the magnetizations of the fourth magnetic material sublayers 112a are fixed in the Y direction in the figure.

Next, as is the step of the process for manufacturing the magnetic sensor 100 shown in FIG. 15, after the solid protective film 117, the solid electrode film 116, and the solid protective film 115 are partly removed by reactive ion etching (RIE) to form the protective layers 117, the electrode layers 116, and the protective layers 115 while the solid stopper film 114 is allowed to remain, the solid stopper film 114 thus exposed and the solid second antiferromagnetic film 113 are partly removed by ion milling to form the stopper layers 114 and the second antiferromagnetic layers 113, thereby forming the magnetic sensor 300 shown in FIG. 5.

For forming the magnetic sensor 400 shown in FIG. 7, in the step shown in FIG. 12, on the first antiferromagnetic layers 111, the third magnetic material sublayers 112c may only be formed as the second fixed magnetic layers 112.

Next, a method for manufacturing the magnetic sensor 500 shown in FIG. 8 will be described.

FIGS. 27 to 35 show steps of the method for manufacturing the magnetic sensor 500 shown in FIG. 8, and the individual steps thereof are each shown by a partial cross-sectional view of a semi-finished magnetic sensor when viewed from the facing surface facing a recording medium. In FIGS. 27 to 35, the layers provided with the same reference numerals as those in FIGS. 1 and 10 to 16 are each formed under the same manufacturing condition as that described above.

Figure 27:
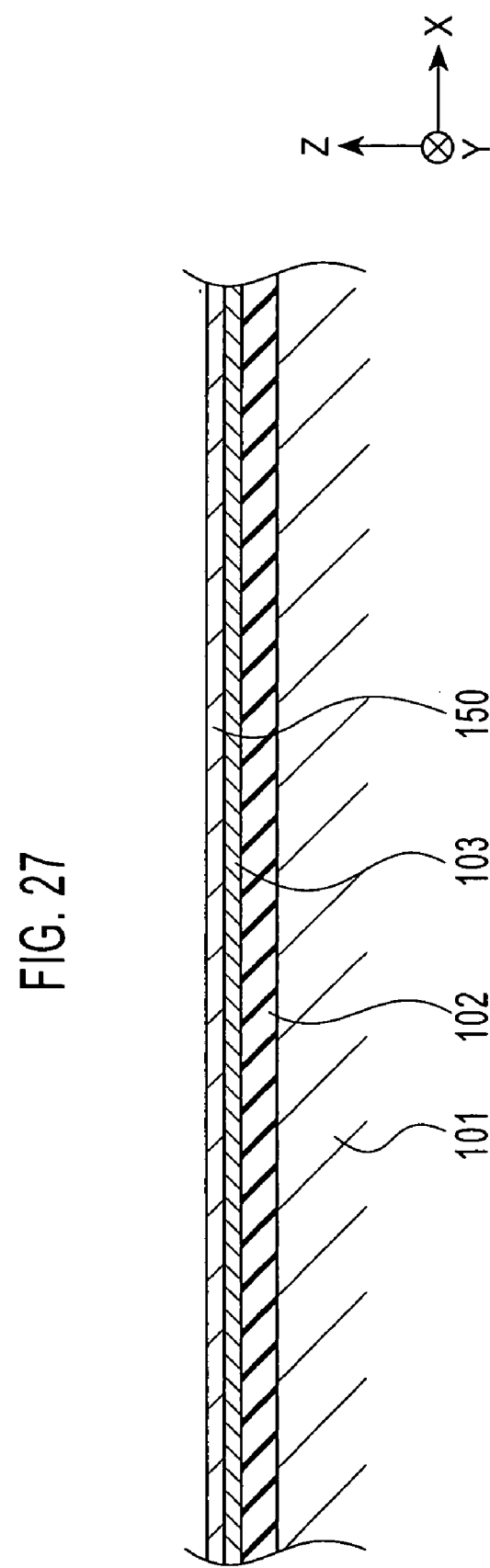
FIG. 27 is a view showing a step of manufacturing the magnetic sensor shown in FIG. 8.

In the step shown in FIG. 27, the lower shield layer 101, the lower gap layer 102, and the seed layer 103 are formed on an entire substrate not shown in the figure, and the first protective layer 150 made of Ru or the like is formed on this seed layer 103.

Figure 28:
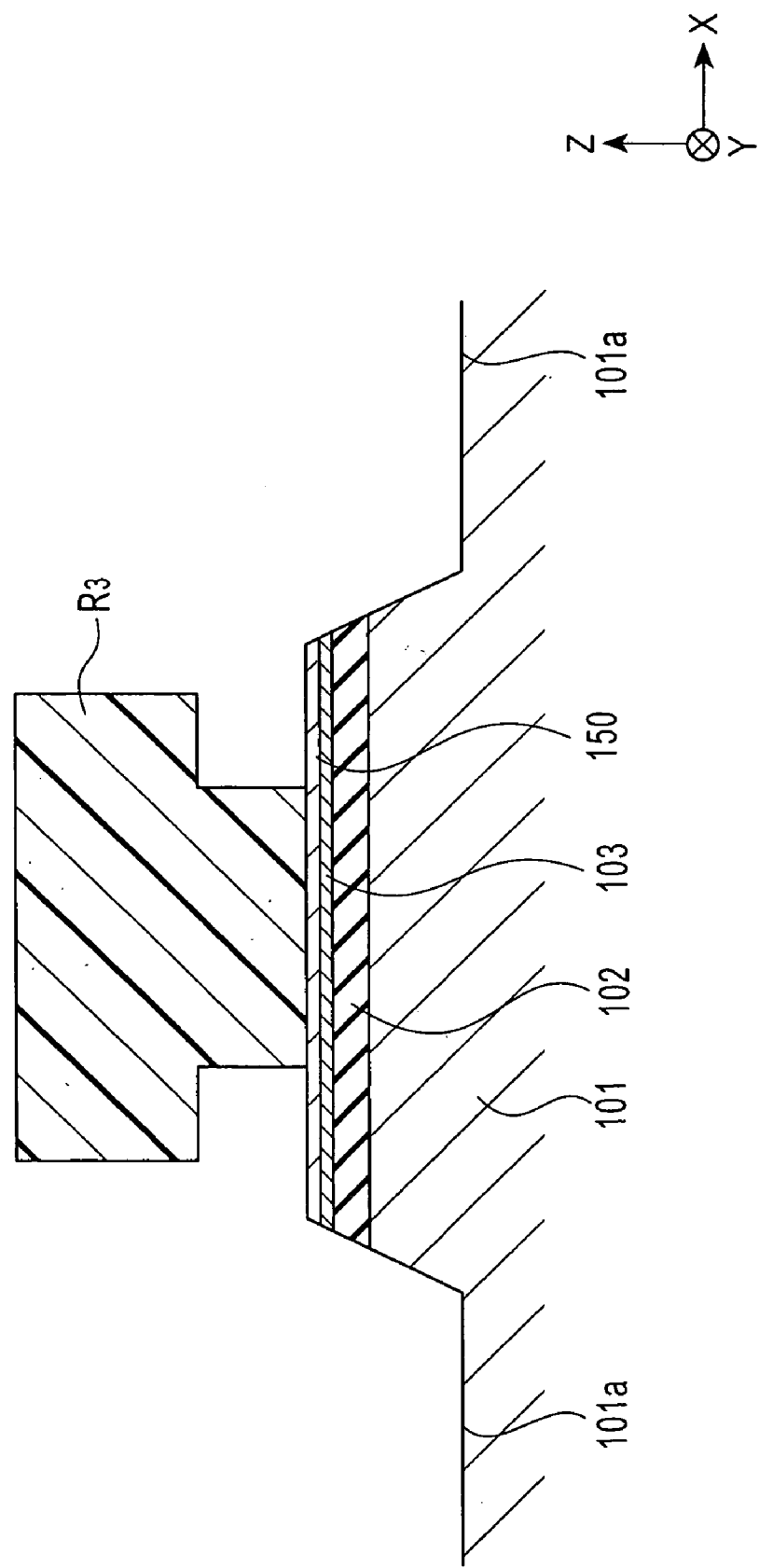
FIG. 28 is a view showing a step following the step shown in FIG. 27.

Next, as shown in FIG. 28, after the resist layer R3 for lift off is formed on the first protective layer 150, by a known method such as ion milling, the lower shield layer 101, the lower gap layer 102, the seed layer 103, and the first protective layer 150 are milled into the shape as shown in FIG. 28, and simultaneously, the recess portions 101a are formed in the lower shield layer 101.

Figure 29:
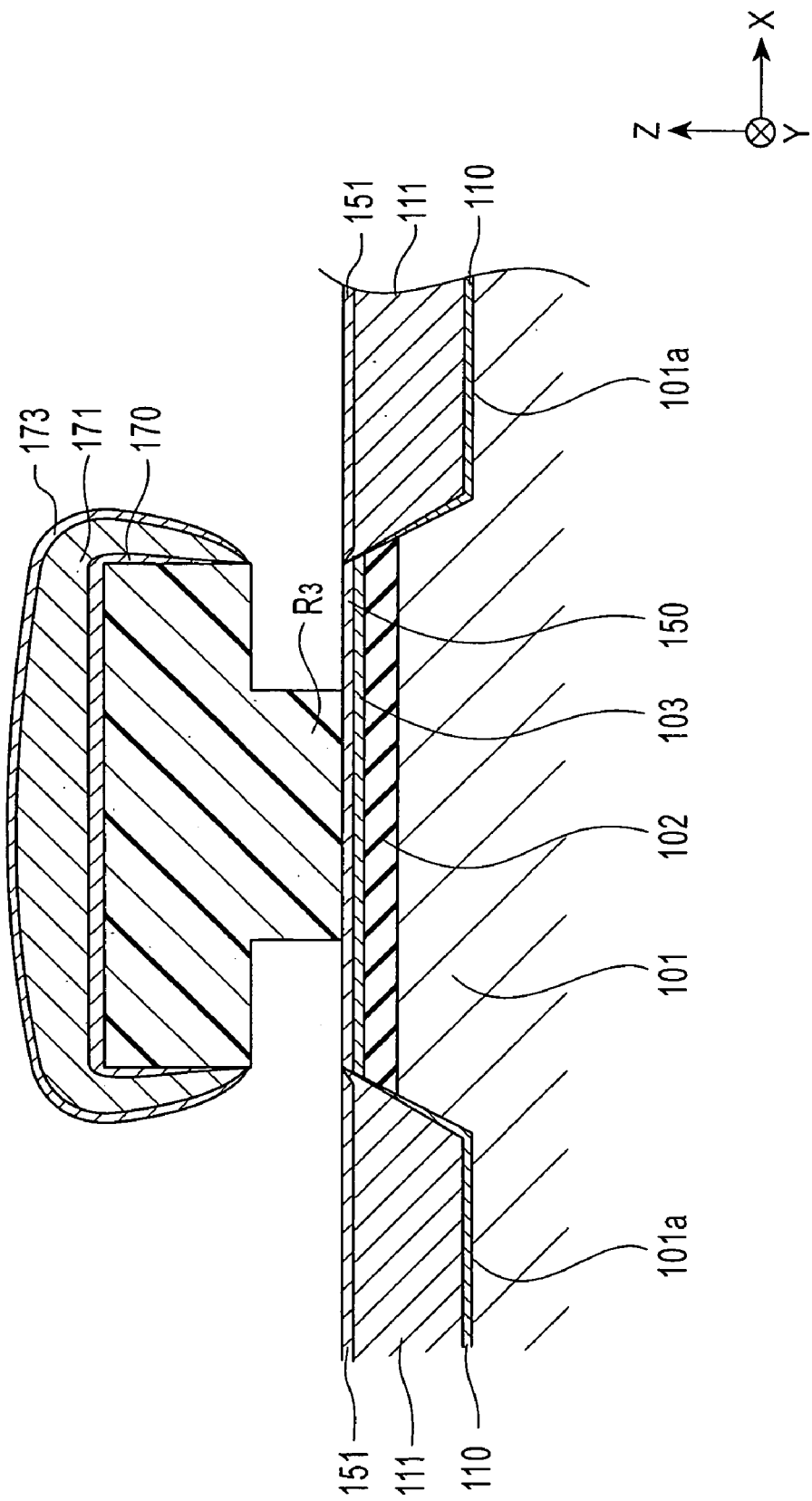
FIG. 29 is a view showing a step following the step shown in FIG. 28.

Next, in the step shown in FIG. 29, while the resist layer R3 is allowed to remain on the first protective layer 150, in the recess portions 101a, the seed layers 110, the first antiferromagnetic layers 111, and the second protective layers 151 made of Ru or the like are continuously formed by sputtering.

In this step, as shown in FIG. 29, on the resist layer R3, the layer 170 made of the same material as that for the seed layers 110, the layer 171 made of the same material as that for the first antiferromagnetic layers 111, and the layer 173 made of the same material as that for the second protective layers 151 are also formed.

Figure 30:
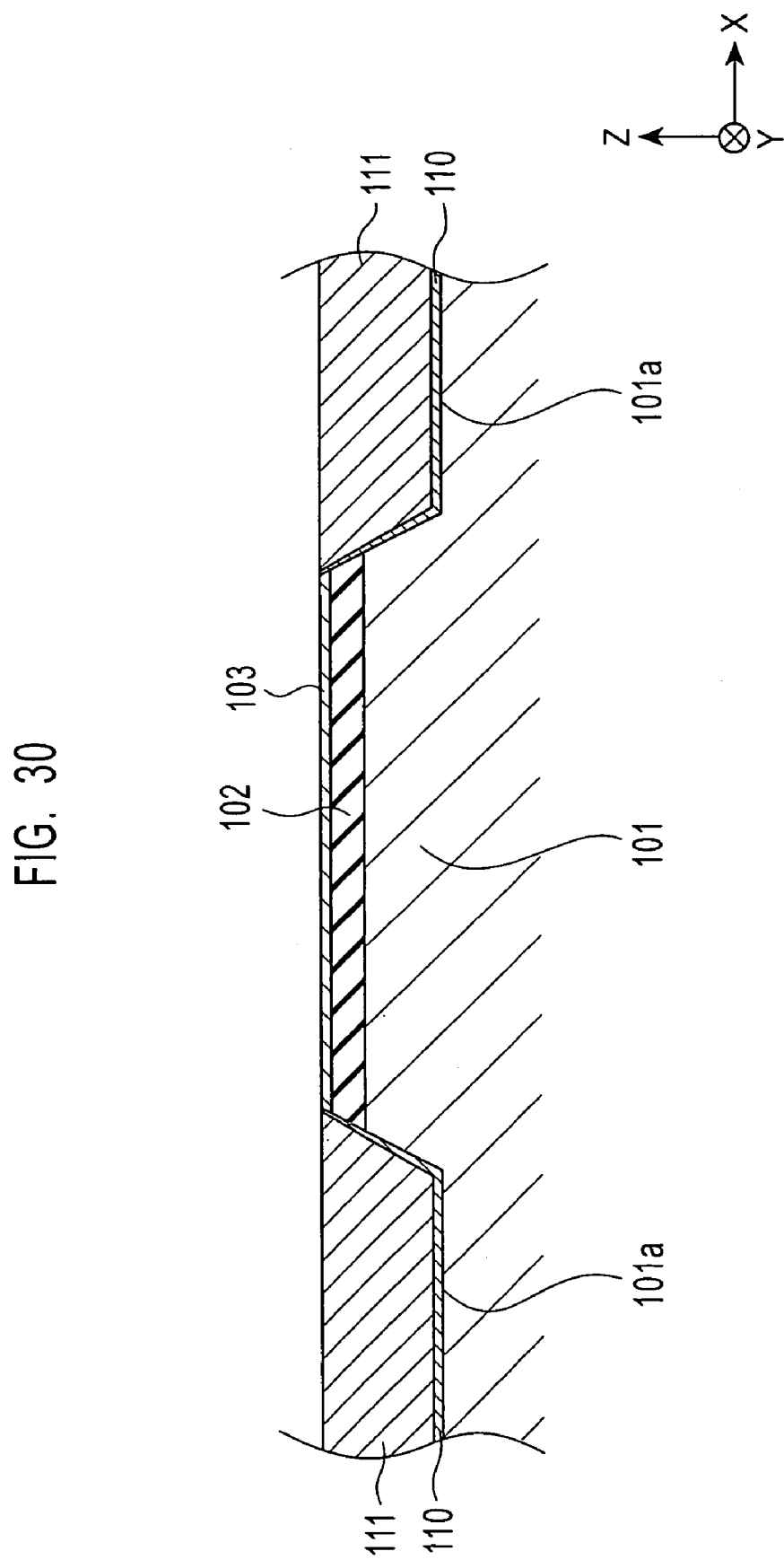
FIG. 30 is a view showing a step following the step shown in FIG. 29.
Figure 31:
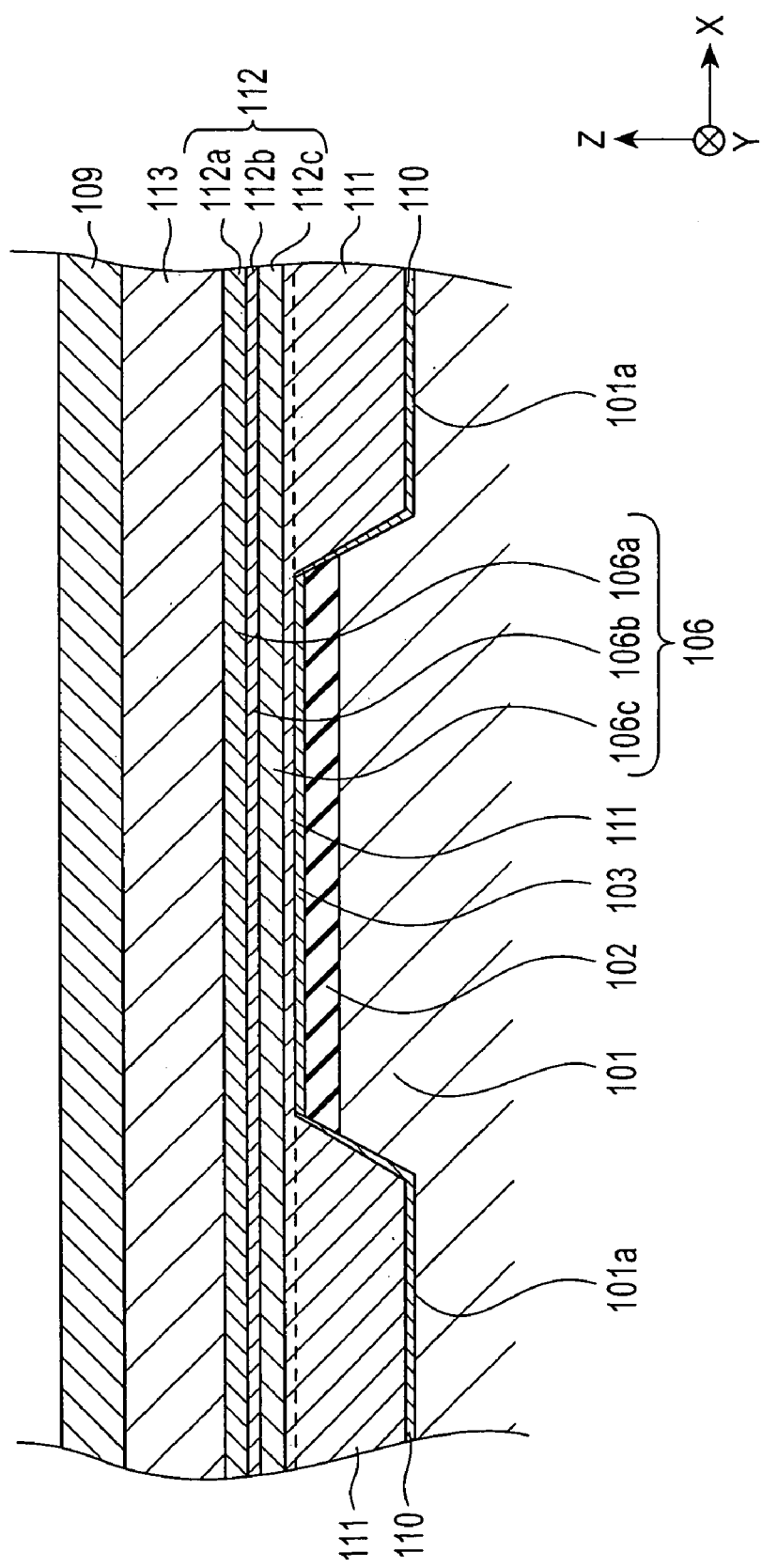
FIG. 31 is a view showing a step following the step shown in FIG. 30.

Next, as shown in FIG. 30, the resist layer R3 is removed. Subsequently, by a known method such as ion beam etching or plasma etching, after the first protective layer 150 and the second protective layers 151 are removed under an evacuated state by milling so that the seed layer 103 and the first antiferromagnetic layers 111 are exposed, an additional layer using the same material as that for the first antiferromagnetic layers 111 is continuously formed on the seed layer 103 and the first antiferromagnetic layers 111 in an evacuated state to form a solid first antiferromagnetic film 111 having an increased thickness. In addition, while the evacuated state is being maintained, the first fixed magnetic layer 106, the second fixed magnetic layers 112, the solid second antiferromagnetic film 113, and a solid second non-magnetic material film 109 are formed, so that the state shown in FIG. 31 is obtained. In FIGS. 31 to 35, the boarder between the first antiferromagnetic layers 111 formed in the step shown in FIG. 29 and the additional layer formed thereon is indicated by a dotted line.

The first fixed magnetic layer 106 is formed to have a synthetic ferrimagnetic pinned structure composed of the first magnetic material sublayer 106c, the first non-magnetic intermediate sublayer 106b, and the second magnetic material sublayer 106a provided in that order from the bottom. In addition, the second fixed magnetic layers 112 are each formed to have a synthetic ferrimagnetic pinned structure composed of the third magnetic material sublayer 112c, the second non-magnetic intermediate sublayer 112b, and the fourth magnetic material sublayer 112a provided in that order from the bottom.

Figure 32:
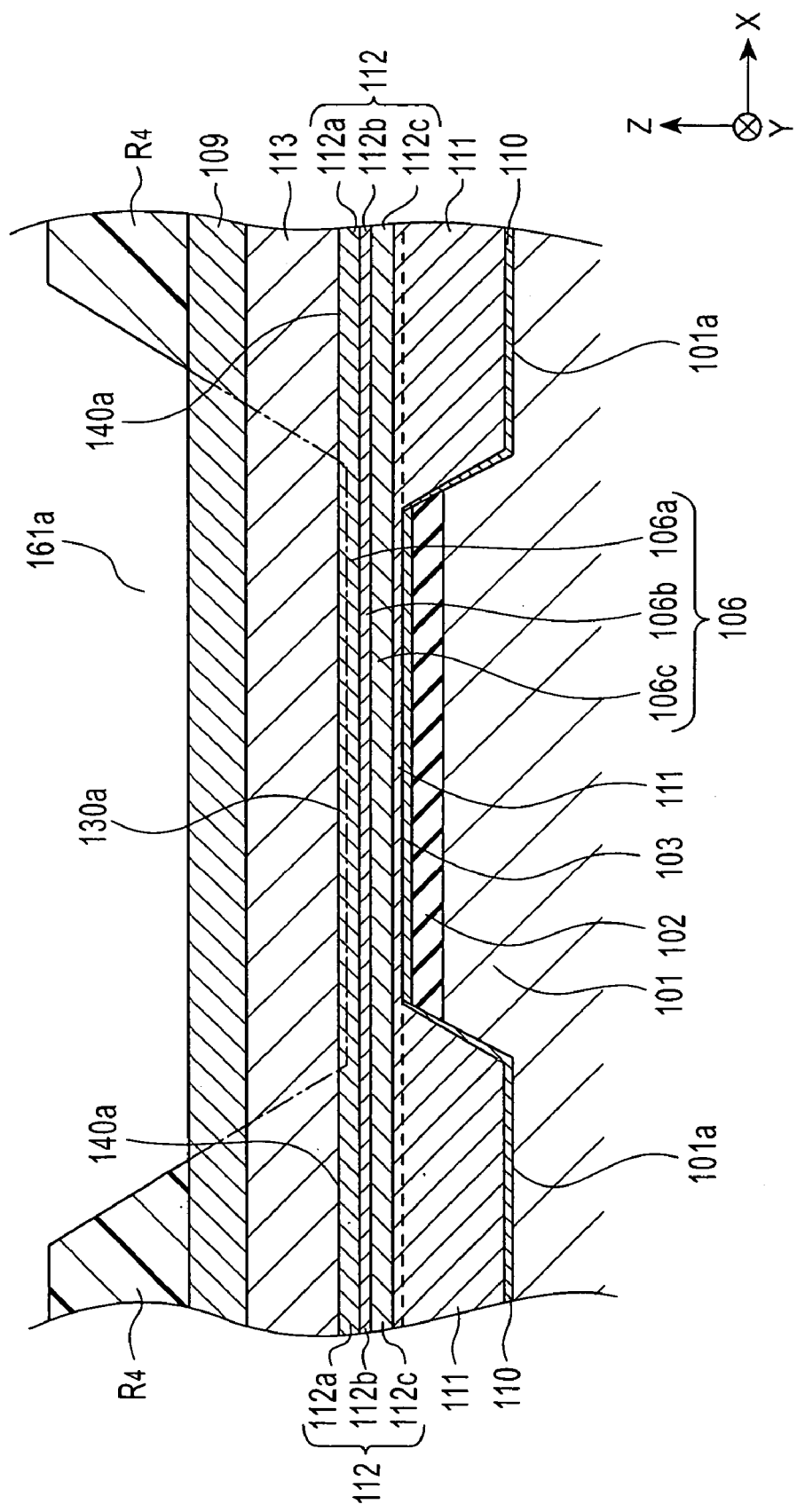
FIG. 32 is a view showing a step following the step shown in FIG. 31.
Figure 33:
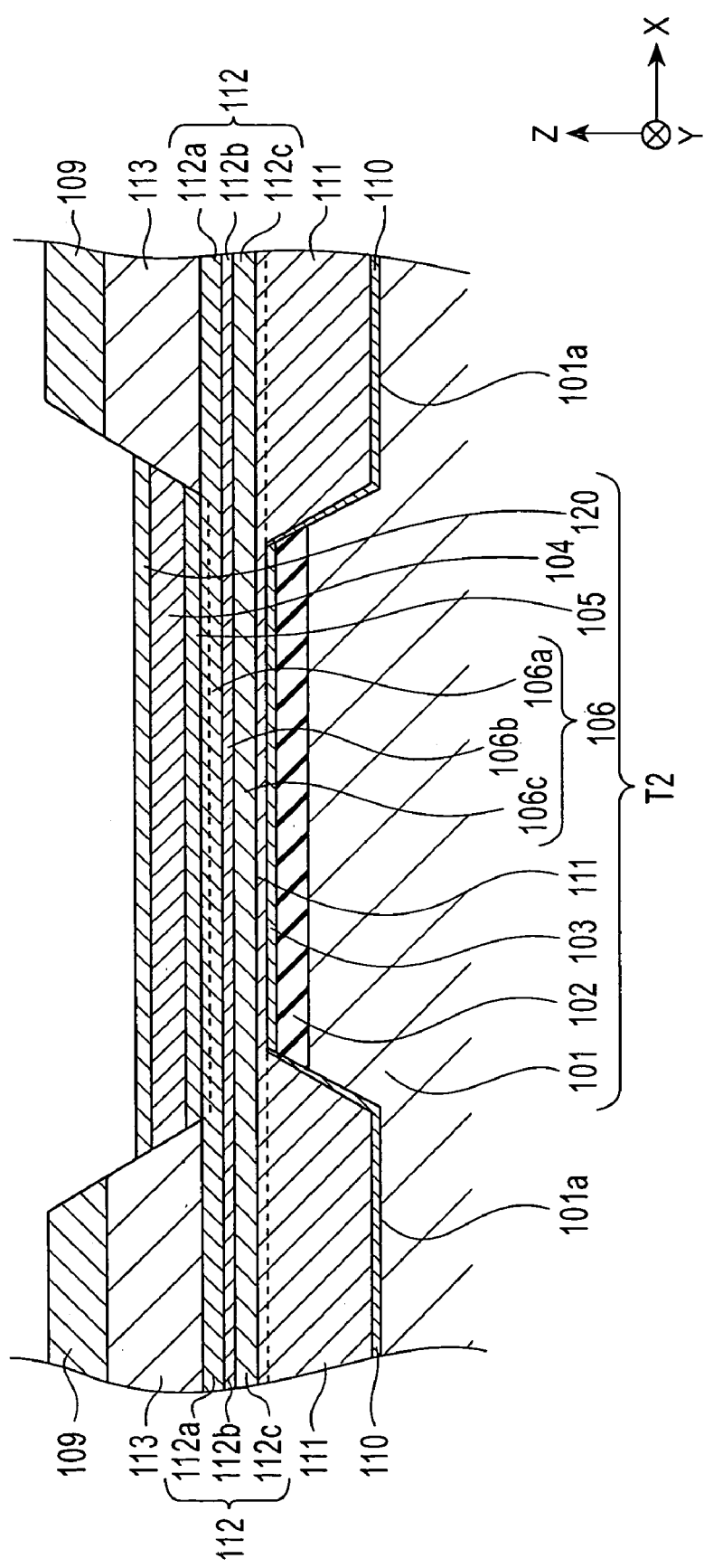
FIG. 33 is a view showing a step following the step shown in FIG. 32.

Next, as shown in FIG. 32, resist layers R4 are formed on the solid second non-magnetic material film 109 with a space therebetween in the optical track width O-Tw direction (X direction in the figure), and as shown by a chain line in the figure, the solid second non-magnetic material film 109 and the solid second antiferromagnetic film 113 are milled which are exposed through a space 161a between the resist layers R4 to form the second non-magnetic material layers 109 and the second antiferromagnetic layers 113. In addition, the second magnetic material sublayer 106a and the fourth magnetic material sublayers 112a are partly milled so as to expose upper surfaces thereof. Subsequently, after additional layers using the same materials as that for the second magnetic material sublayer 106a and the fourth magnetic material sublayers 112a are formed thereon to increase the thicknesses of the second magnetic material sublayer 106a and the fourth magnetic material sublayers 112a, the multilayer film T2 is formed by the following steps which are continuously performed in an evacuated state from the step described above. That is, as shown in FIG. 33, on the entire second magnetic material sublayer 106a and the entire fourth magnetic material sublayers 112a thus formed, the first non-magnetic material layer 105, the free magnetic layer 104, and the third non-magnetic material layer 120 are formed. In the steps described above, the upper surface 130a of the second magnetic material sublayer 106a and the upper surfaces 140a of the fourth magnetic material sublayers 112a are preferably formed at the same height. In addition, in FIGS. 33 to 35, the boundary of the second magnetic material sublayer 106a and the fourth magnetic material sublayers 112a, which are formed in the step shown in FIG. 31, and the additional layers formed using the same material as that for the second magnetic material sublayer 106a and using the same material as that for the fourth magnetic material sublayers 112a is indicated by a dotted line.

Figure 34:
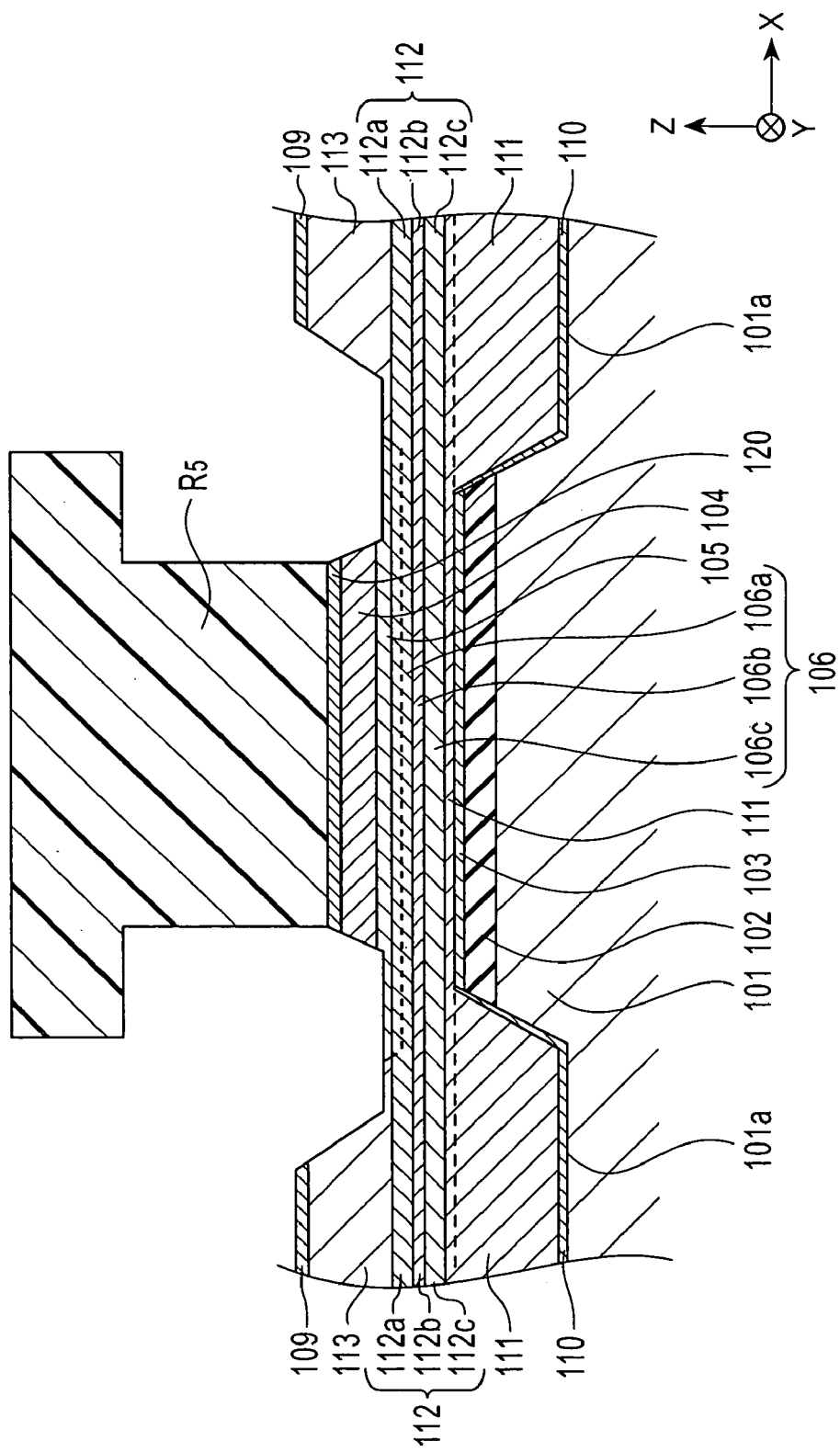
FIG. 34 is a view showing a step following the step shown in FIG. 33.

Next, as shown in FIG. 34, after a resist layer R5 is formed on the third non-magnetic material layer 120, the third non-magnetic material layer 120 and the free magnetic layer 104 are milled, and in addition, the first non-magnetic material layer 105 is also partly milled. In the steps described above, the second non-magnetic material layers 109 are also milled, resulting in decrease in thickness thereof.

Figure 35:
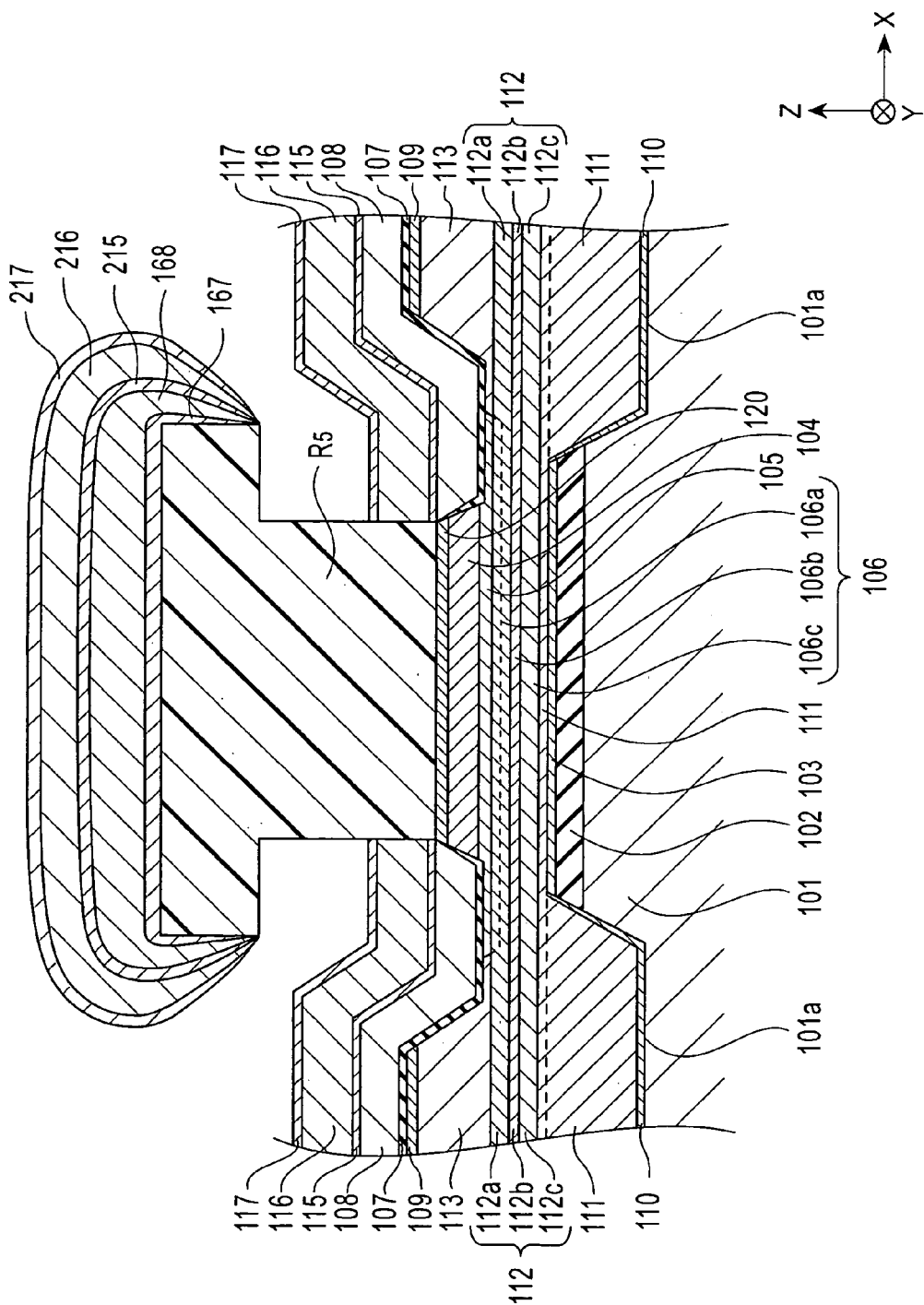
FIG. 35 is a view showing a step following the step shown in FIG. 34.

Next, as shown in FIG. 35, the insulating layers 107, the hard magnetic layers 108, the protective layers 115, the electrode layers 116, and the protective layers 117 are formed. In the steps described above, on the resist layer R5, there are provided the layer 167 made of the same material as that for the insulating layers 107, the layer 168 made of the same material as that for the hard magnetic layers 108, the layer 215 made of the same material as that for the protective layers 115, the layer 216 made of the same material as that for the electrode layers 116, and the layer 217 made of the same material as that for the protective layers 117.

Subsequently, when the resist layer R5 is removed, the magnetic sensor 500 shown in FIG. 8 is obtained.

Figure 36:
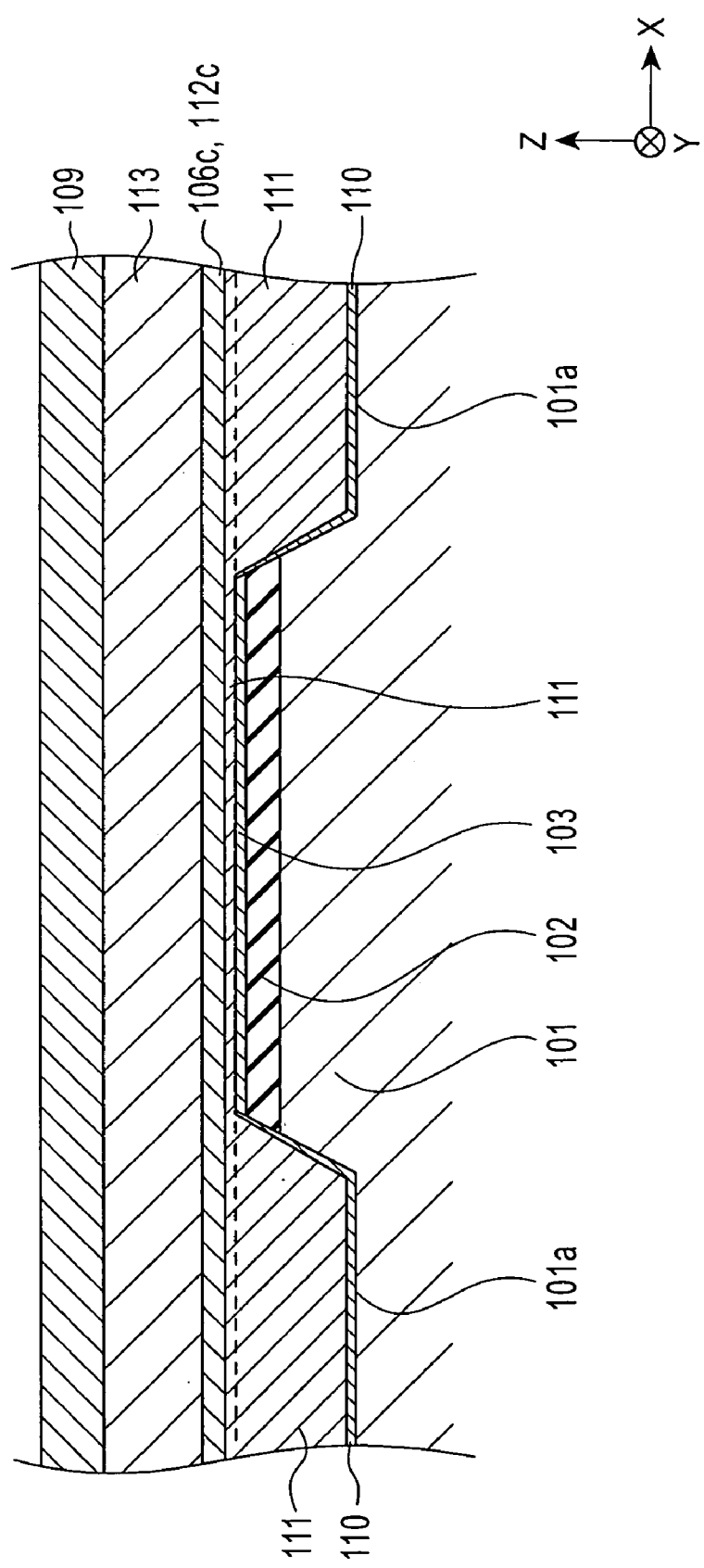
FIG. 36 is a view showing a step of manufacturing the magnetic sensor shown in FIG. 9.
Figure 37:
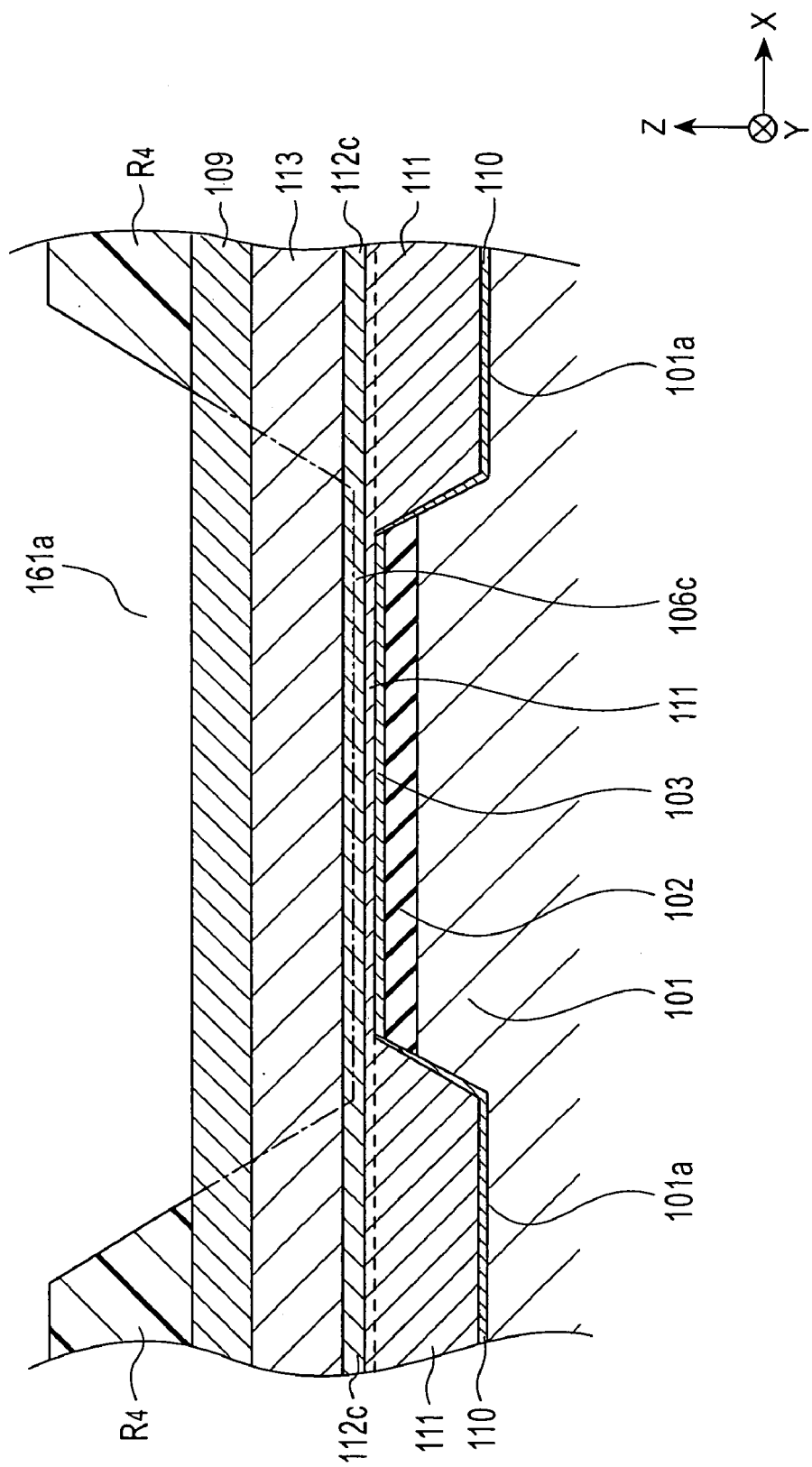
FIG. 37 is a view showing a step following the step shown in FIG. 36.
Figure 38:
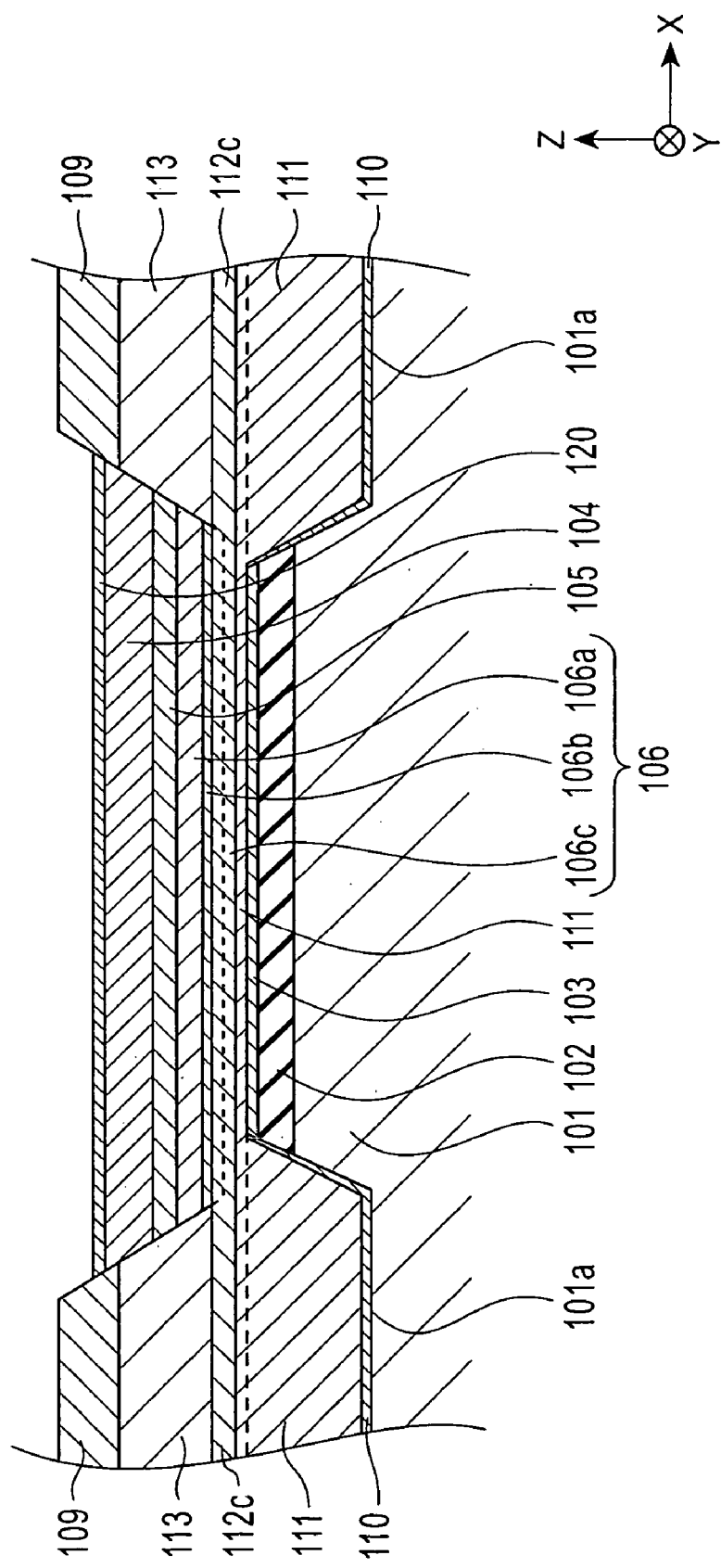
FIG. 38 is a view showing a step following the step shown in FIG. 37.
Figure 39:
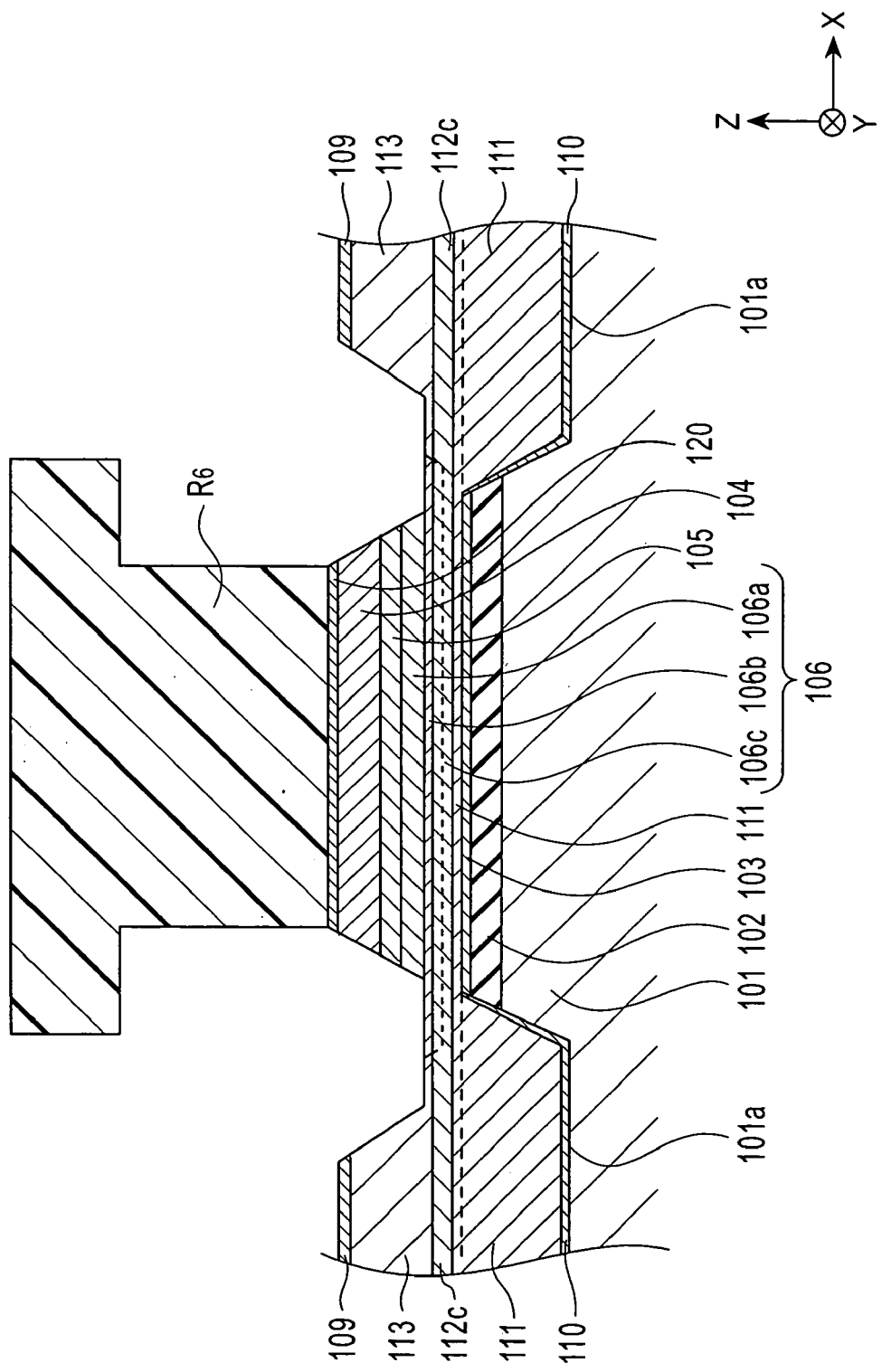
FIG. 39 is a view showing a step following the step shown in FIG. 38.
Figure 40:
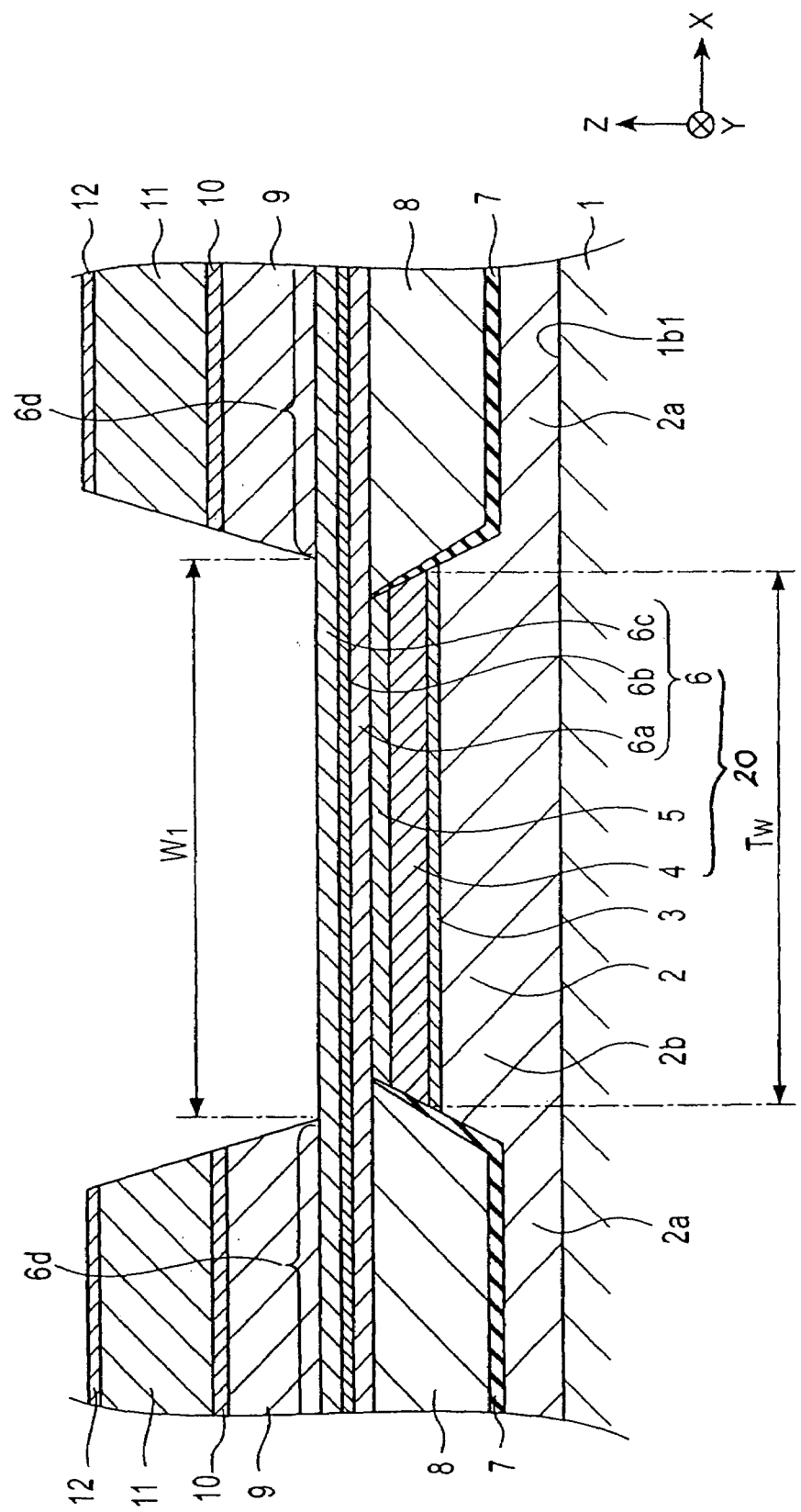
FIG. 40 is a partial cross-sectional view showing a related magnetic sensor when viewed from a facing surface facing a recording medium.

A method for manufacturing the magnetic sensor 600 shown in FIG. 9 includes the steps equivalent to those described in the method for manufacturing the magnetic sensor 500 shown in FIG. 8. For forming the magnetic sensor 600 shown in FIG. 9, the following sequential steps will be carried out. That is, in the step shown in FIG. 31 of the method for manufacturing the magnetic sensor 500 shown in FIG. 8, the fixed magnetic layer 106 and the second fixed magnetic layers 112 are formed only using the first magnetic material sublayer 106c and the third magnetic material sublayers 112c, respectively, as shown in FIG. 36; the resist layers R4 are then formed on the solid second non-magnetic material film 109 with a space therebetween in the optical track width O-Tw direction (X direction in the figure) as shown in FIG. 37; and subsequently, the solid second non-magnetic material film 109 and the solid second antiferromagnetic film 113, which are exposed through the space 161a, are milled, followed by the milling of a part of the first magnetic material sublayer 106c and parts of the third magnetic material sublayers 112c so as to expose upper surfaces thereof as indicated by a chain line in the figure. In the steps described above, the second non-magnetic material layers 109 and the second antiferromagnetic layers 113 are formed from the solid second non-magnetic material film 109 and the solid second antiferromagnetic film 113, respectively, by milling. From the step described above, the following steps are all continuously performed in an evacuated state. That is, as shown in FIG. 38, after an additional layer using the same material as that for the first magnetic material sublayer 106c and additional layers using the same material as that for the third magnetic material sublayers 112c are formed on the remaining first magnetic material sublayer 106c and the remaining third magnetic material sublayers 112c, respectively, the first non-magnetic intermediate sublayer 106b, the second magnetic material sublayer 106a, the first non-magnetic material layer 105, the free magnetic layer 104, and the third non-magnetic material layer 120 are formed. In the steps described above, the upper surface 132a of the first magnetic material sublayer 106c and the upper surfaces 142a of the third magnetic material sublayers 112c are preferably formed at the same height. In FIGS. 38 and 39, the boundary of the first magnetic material sublayer 106c and the third magnetic material sublayers 112c, which are formed in the step shown in FIG. 36, and the additional layers, which are formed on the remaining first magnetic material sublayer 106c and the remaining third magnetic material sublayers 112c, is indicated by a dotted line.

Subsequently, as shown in FIG. 39, after a resist layer R6 is formed on the third non-magnetic material layer 120, the third non-magnetic material layer 120, the free magnetic layer 104, the first non-magnetic material layer 105, the second magnetic material sublayer 106a, and the first non-magnetic intermediate sublayer 106b are milled. In the steps described above, the second non-magnetic material layers 109 are also milled, so that the thicknesses thereof are decreased.

Subsequently, when the step shown in FIG. 35 is performed, the magnetic sensor 600 shown in FIG. 9 can be obtained.

What is claimed is:

1. A magnetic sensor comprising:
   a lower shield layer having a protruding portion;
   a multilayer film having a free magnetic layer, a first non-magnetic material layer, and a first fixed magnetic layer disposed above the protruding portion of the lower shield layer;
   bias layers provided at two sides of the multilayer film in a track width direction with a predetermined space therebetween, the predetermined space determining a track width;
   second fixed magnetic layers extending from the first fixed magnetic layer to the two sides of the multilayer film in the track width direction;
   a pair of first antiferromagnetic layers which are provided with the multilayer film therebetween in the track width direction and which are formed under the second fixed magnetic layers and in direct contact with the second fixed layers; and
   a pair of second antiferromagnetic layers which are provided with a predetermined space therebetween in the track width direction and which are formed on the second fixed magnetic layers and in direct contact with the second fixed layers.

2. The magnetic sensor according to claim 1, wherein the first fixed magnetic layer of the multilayer film and the second fixed magnetic layers collectively form a fixed magnetic layer, and at least a part of each of the second fixed magnetic layers is continuously and integrally formed with the first fixed magnetic layer.

3. The magnetic sensor according to claim 1, wherein at least one of the space between the first antifeltomagnetic layers and the space between the second antiferromagnetic layers is equal to the track width.

4. The magnetic sensor according to claim 3, wherein the space between the first antiferromagnetic layers is equal to the track width.

5. The magnetic sensor according to claim 1, wherein the first fixed magnetic layer comprises a first magnetic material sublayer, a second magnetic material sublayer, and a first non-magnetic intermediate sublayer provided therebetween, the first magnetic material sublayer and the second magnetic material sublayer having different magnetic moments per unit area.

6. The magnetic sensor according to claim 5, wherein the second fixed magnetic layers each comprise a third magnetic material sublayer, a fourth magnetic material sublayer, and a second non-magnetic intermediate sublayer provided therebetween, the third magnetic material sublayer and the fourth magnetic material sublayer having different magnetic moments per unit area.

7. The magnetic sensor according to claim 6, wherein the first magnetic material sublayer and the third magnetic material sublayers are located at the same height.

8. The magnetic sensor according to claim 6, wherein the second magnetic material sublayer and the fourth magnetic material sublayers are located at the same height.

9. The magnetic sensor according to claim 1, wherein the first fixed magnetic layer and the second fixed magnetic layers are located at the same height.

10. The magnetic sensor according to claim 1, wherein the multilayer film having the free magnetic layer, the first non-magnetic material layer, and the first fixed magnetic layer provided in that order from the bottom.

11. The magnetic sensor according to claim 1, wherein the multilayer film having the first fixed magnetic layer, the first non-magnetic material layer, and the free magnetic layer provided in that order from the bottom.

* * * * *

UNITED STATES PATENT AND TRADEMARK OFFICE
CERTIFICATE OF CORRECTION

| | | |
|---|---|---|
| PATENT NO. | : 7,312,959 B2 | Page 1 of 1 |
| APPLICATION NO. | : 10/946323 | |
| DATED | : December 25, 2007 | |
| INVENTOR(S) | : Ryou Nakabayashi et al. | |

It is certified that error appears in the above-identified patent and that said Letters Patent is hereby corrected as shown below:

Column 30, in claim 3, line 2, after "space between the first" delete "antifeltomagnetic" and substitute --antiferromagnetic-- in its place.

Signed and Sealed this

Twenty-seventh Day of May, 2008

JON W. DUDAS
*Director of the United States Patent and Trademark Office*